(12) United States Patent
Lim et al.

(10) Patent No.: US 10,523,423 B2
(45) Date of Patent: Dec. 31, 2019

(54) SHARING ENCRYPTED DOCUMENTS WITHIN AND OUTSIDE AN ORGANIZATION

(71) Applicant: NextLabs, Inc., San Mateo, CA (US)

(72) Inventors: Keng Lim, Atherton, CA (US); Poon Fung, Cupertino, CA (US)

(73) Assignee: NextLabs, Inc., San Mateo, CA (US)

( * ) Notice: Subject to any disclaimer, the term of this patent is extended or adjusted under 35 U.S.C. 154(b) by 205 days.

(21) Appl. No.: 15/673,338

(22) Filed: Aug. 9, 2017

(65) Prior Publication Data
US 2018/0048464 A1 Feb. 15, 2018

Related U.S. Application Data

(60) Provisional application No. 62/373,319, filed on Aug. 10, 2016.

(51) Int. Cl.
| | |
|---|---|
| *H04L 9/08* | (2006.01) |
| *H04L 29/06* | (2006.01) |
| *G06F 21/60* | (2013.01) |
| *G06F 21/62* | (2013.01) |

(52) U.S. Cl.
CPC .............. *H04L 9/08* (2013.01); *H04L 9/0822* (2013.01); *H04L 9/0866* (2013.01); *H04L 9/0894* (2013.01); *H04L 63/0428* (2013.01); *H04L 63/0442* (2013.01); *H04L 63/061* (2013.01); *H04L 63/062* (2013.01); *G06F 21/602* (2013.01); *G06F 21/6218* (2013.01); *H04L 63/12* (2013.01)

(58) Field of Classification Search
CPC ....... H04L 9/08; H04L 9/0822; H04L 9/0866; H04L 9/0894; H04L 63/0428; H04L 63/0442; H04L 63/061; H04L 63/062

USPC .......................................................... 713/170
See application file for complete search history.

(56) References Cited

U.S. PATENT DOCUMENTS

| | | |
|---|---|---|
| 5,787,175 A | 7/1998 | Carter |
| 6,662,299 B1 | 12/2003 | Price, III |
| 7,139,399 B1 | 11/2006 | Zimmermann |
| 7,424,612 B2 | 9/2008 | England et al. |
| 8,010,810 B1 | 8/2011 | Fitzgerald et al. |

(Continued)

FOREIGN PATENT DOCUMENTS

| | | |
|---|---|---|
| GB | 2507191 | 4/2014 |
| WO | WO/2004/046899 | 6/2004 |

OTHER PUBLICATIONS

Ramaswamy Chandramouli, Michaela Iorga, Santosh Chokhani, Cryptographic Key Management Issues & Challenges in Cloud Services, Sep. 2013, pp. 1-35, National Institute of Standards and Technology, U.S. Department of Commerce, United States of America.

(Continued)

*Primary Examiner* — Dant B Shaifer Harriman
(74) *Attorney, Agent, or Firm* — Aka Chan LLP

(57) ABSTRACT

A method and system of creating and managing encryption keys that facilitates sharing of encrypted content. The system may include an information management system with a key management server and a computing device having an encryption service module. The encryption service module detects operations at the computing device and encrypts a document with an encryption key created using user information and a secret.

25 Claims, 38 Drawing Sheets

(56) References Cited

U.S. PATENT DOCUMENTS

| | | |
|---|---|---|
| 2005/0254658 A1 | 11/2005 | Brown et al. |
| 2012/0243687 A1 | 9/2012 | Li et al. |
| 2014/0201850 A1 | 7/2014 | Garcia et al. |
| 2015/0200920 A1* | 7/2015 | Norton ................ H04L 63/0442 713/153 |
| 2015/0295941 A1 | 10/2015 | Lim et al. |
| 2017/0201500 A1* | 7/2017 | Tormasov ........... H04L 63/0428 |
| 2017/0207917 A1* | 7/2017 | Davis .................... H04L 9/3066 |
| 2017/0372540 A1* | 12/2017 | Shirai ..................... E05B 49/00 |
| 2018/0048464 A1* | 2/2018 | Lim ......................... H04L 9/08 |
| 2018/0083935 A1* | 3/2018 | Fang ...................... H04L 51/38 |
| 2018/0139188 A1* | 5/2018 | Iyer ..................... H04L 63/0435 |
| 2018/0198799 A1* | 7/2018 | Parthasarathy ....... H04L 63/123 |
| 2018/0205734 A1* | 7/2018 | Wing .................. H04L 61/1511 |
| 2018/0314813 A1* | 11/2018 | Takemori ................ G06F 21/33 |
| 2018/0340466 A1* | 11/2018 | Li ............................ F02B 33/18 |
| 2019/0027067 A1* | 1/2019 | Ozaki ..................... G06F 21/60 |
| 2019/0073227 A1* | 3/2019 | Zhong ..................... G06F 9/445 |

OTHER PUBLICATIONS

International Search Report, PCT Application PCT/US2017/046175, dated Nov. 13, 2017, 7 pages.

* cited by examiner

```
                                                    ← 1301

┌─────────────────────────────────────────────────────────────┐
│ An encryption service module on a computing device detects   │
│ a file open operation on an encrypted document               │
│                          1302                                │
└─────────────────────────────────────────────────────────────┘
                              │
┌─────────────────────────────────────────────────────────────┐
│ The encryption service module retrieves a document           │
│ identifier and a user identifier from the encrypted document │
│                          1303                                │
└─────────────────────────────────────────────────────────────┘
                              │
┌─────────────────────────────────────────────────────────────┐
│ The encryption service module sends the document identifier  │
│ and the user identifier to a key management server and       │
│ requests a key encryption key to decrypt the encrypted       │
│ document                                                     │
│                          1304                                │
└─────────────────────────────────────────────────────────────┘
                              │
┌─────────────────────────────────────────────────────────────┐
│ The key management server creates a key encryption key with  │
│ the document identifier, the user identifier and one or more │
│ secrets maintained by the key management server              │
│                          1305                                │
└─────────────────────────────────────────────────────────────┘
                              │
┌─────────────────────────────────────────────────────────────┐
│ The key management server returns the key encryption key to  │
│ the encryption service module                                │
│                          1306                                │
└─────────────────────────────────────────────────────────────┘
                              │
┌─────────────────────────────────────────────────────────────┐
│ The encryption service module decrypts an encrypted content  │
│ encryption key in the encrypted document with the key        │
│ encryption key to produce a content encryption key           │
│                          1307                                │
└─────────────────────────────────────────────────────────────┘
                              │
┌─────────────────────────────────────────────────────────────┐
│ The encryption service module decrypts encrypted content in  │
│ the encrypted document with the content encryption key to    │
│ produce unencrypted content                                  │
│                          1308                                │
└─────────────────────────────────────────────────────────────┘
                              │
┌─────────────────────────────────────────────────────────────┐
│              The file open operation ends                    │
│                          1309                                │
└─────────────────────────────────────────────────────────────┘
```

```
An encryption service module on a computing device detects a file
open operation on an encrypted document
1502
```

```
The encryption service module retrieves a document identifier and
a user identifier from the encrypted document
1503
```

```
The encryption service module sends the document identifier and
the user identifier to a key management server and requests a
key encryption key to decrypt the encrypted document
1504
```

```
The key management server creates an encryption key with the
document identifier, the user identifier and one or more secrets
maintained by the key management server
1505
```

```
The key management server returns the encryption key to the
encryption service module
1506
```

```
The encryption service module decrypts encrypted content in the
encrypted document with the encryption key to produce
unencrypted content
1507
```

```
The file open operation ends
1508
```

Figure 15

```
      ┌─────────┐
      │ Figure  │
      │  22A    │
      └────┬────┘
           │
┌──────────┴──────────────┐
│ The first key management│
│ server locates a second │
│ key management server   │
│ with the key management │
│ server identifier       │
│         2212            │
└──────────┬──────────────┘
           │
┌──────────┴──────────────┐
│ The first key management│
│ server forwards the     │
│ document identifier, the│
│ user identifier and the │
│ key management server   │
│ identifier to a second  │
│ key management server   │
│ and requests a key      │
│ encryption key          │
│         2213            │
└──────────┬──────────────┘
           │
┌──────────┴──────────────┐
│ The second key          │
│ management server       │
│ creates a key encryption│
│ key based on the        │
│ document identifier, the│
│ user identifier and a   │
│ second secret maintained│
│ by the second key       │
│ management server       │
│         2214            │
└──────────┬──────────────┘
           │
┌──────────┴──────────────┐
│ The second key          │
│ management server       │
│ returns the key         │
│ encryption key to the   │
│ first key management    │
│ server                  │
│         2215            │
└──────────┬──────────────┘
           │
      ┌────┴────┐
      │ Figure  │
      │  22B    │
      └─────────┘
```

Figure 22C

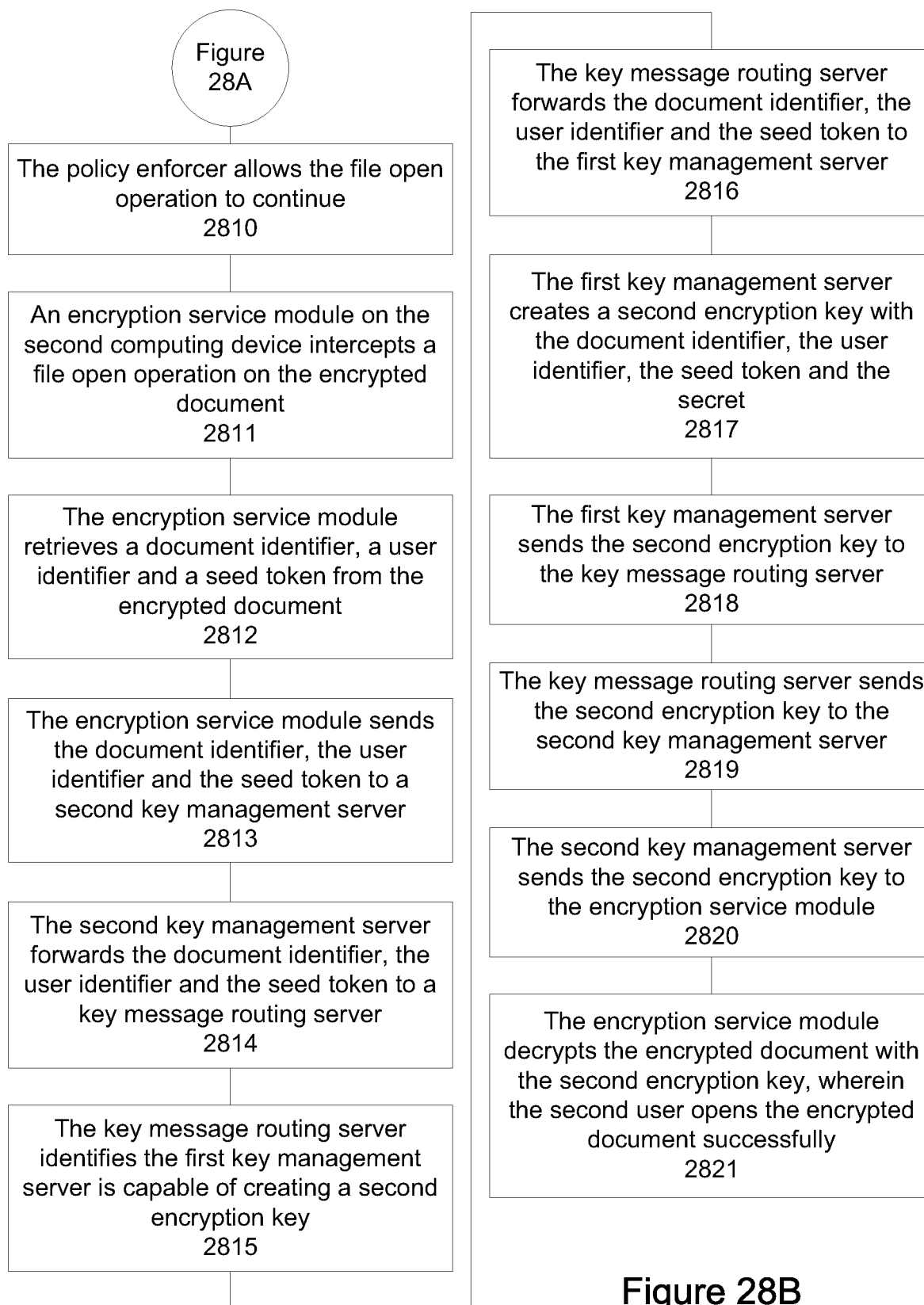

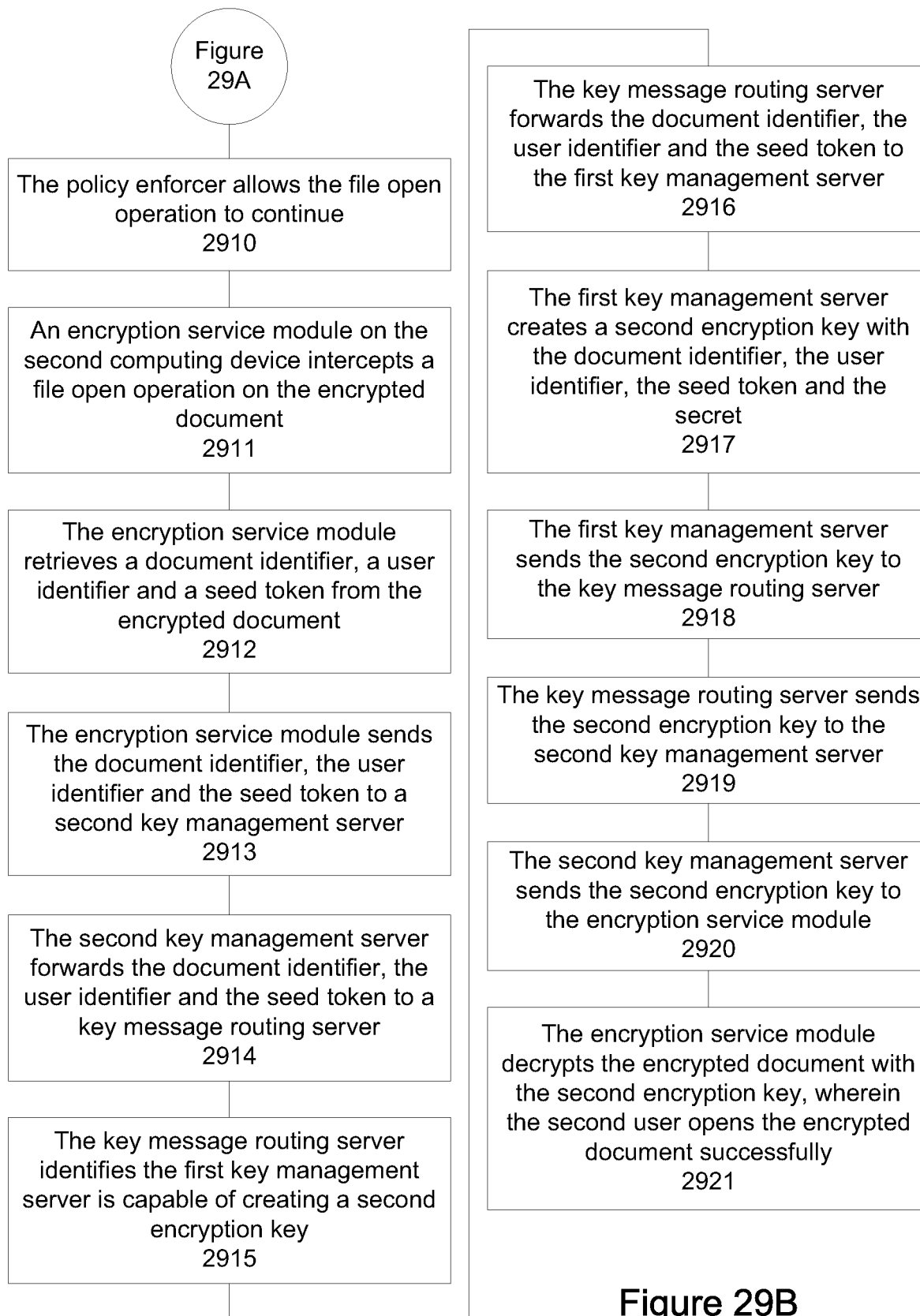

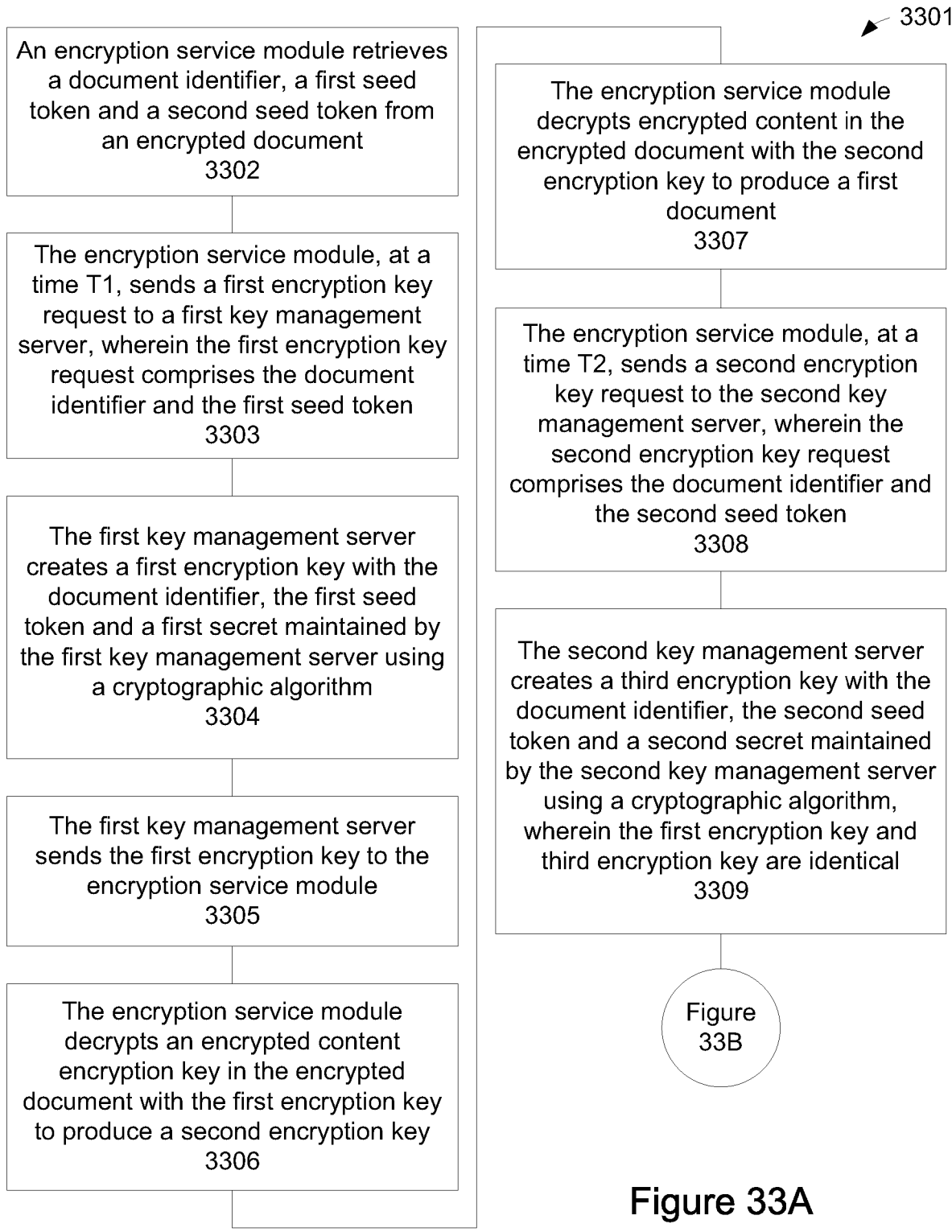

SHARING ENCRYPTED DOCUMENTS WITHIN AND OUTSIDE AN ORGANIZATION

CROSS-REFERENCE TO RELATED APPLICATIONS

This patent application claims the benefit of U.S. patent application 62/373,319, filed Aug. 10, 2016, which is incorporated by reference along with all other references cited in this application.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to data encryption, and more specifically, to create and manage encryption keys to facilitate sharing of encrypted content and encryption key recovery.

Encryption has been utilized to protect information since the dawn of computing. While encryption is used widely today to protect data in motion (e.g., hypertext transfer protocol over transport layer security or HTTPS), its application in protecting data at rest is still limited. One key reason for application of encryption to data at rest is not more widely adopted is complexity in managing and sharing of encryption keys.

One common solution creates one encryption key to encrypt many files. A first problem with this solution is that losing the one encryption key will make many encrypted files vulnerable. A second problem is that sharing the one encryption key with a person often allows the person to access more files than the person should not have access to. To mitigate the damages that may be caused by the first problem, some encryption software introduces a key ring where a new encryption key is created periodically to encrypt new documents and old encryption keys are kept in the key ring to support decryption of encrypted documents. To address the second problem, some encryption software re-encrypts an encrypted document with a shared key before the encrypted document is shared. Most existing encryption solutions address these key problems only partially while introduce substantial complexities.

Another common solution creates a unique encryption key for each file to be encrypted. Having one encryption key per document minimizes damage caused by a compromised encryption key, but it results in a lot of encryption keys to be managed. Since encryption keys need to be stored separately from encrypted documents, it is difficult to tell know how long encryption keys need to be maintained.

In additional to encryption key management issues, controlling access to documents and use of their content are complex and evolving tasks that have different life cycles and requirements from managing encryption keys.

Addressing encryption key management and sharing issues is critical to advance the adoption of encryption to data at rest.

BRIEF SUMMARY OF THE INVENTION

A method and system of creating and managing encryption keys that facilitates sharing of encrypted content. In an implementation, the present invention relates to data encryption, and more specifically, to create and manage encryption keys to facilitate sharing of encrypted content and key recovery.

In an implementation, a method includes: providing an information management system having a key management server and a computing device; providing the computing device having an encryption service module; providing the key management server having a secret, where the secret is not known to the encryption service module; at the computing device at a time T1, saving a document opened in an application program by a user; at the encryption service module, detecting a file save operation on the document; at the encryption service module, collecting user information of the user; at the encryption service module, sending the user information to the key management server; at the key management server, creating a document identifier for the document; at the key management server, creating a first encryption key with the document identifier, the user information and the secret; at the encryption service module, receiving the document identifier and the first encryption key from the key management server; at the encryption service module, creating a second encryption key; and at the encryption service module, encrypting the document with the second encryption key to produce encrypted content.

Further the method includes: at the encryption service module, encrypting the second encryption key with the first encryption key to produce an encrypted second encryption key; at the encryption service module, storing the document identifier, the user information, the encrypted second encryption key and the encrypted content in an encrypted document; at the computing device at a time T2, opening the encrypted document in the application program by the user, where T2 happens some time after T1; at the encryption service module, detecting a file open operation on the encrypted document; at the encryption service module, retrieving the document identifier and the user information in the encrypted document; at the encryption service module, sending the document identifier and the user information to the key management server; at the key management server, creating a third encryption key with the document identifier, the user information and the secret; at the encryption service module, receiving the third encryption key from the key management server; at the encryption service module, decrypting the encrypted second encryption key in the encrypted document with the third encryption key to produce a forth encryption key; and at the encryption service module, decrypting the encrypted content in the encrypted document with the forth encryption key to produce unencrypted content.

In various implementations, the secret is a cryptographic key. The secret is a cryptographic hash. The detecting a file save operation on the document is performed using code injection. The detecting a file save operation on the document occurs in a process of the application program, where the application program invokes the file save operation. The detecting a file save operation on the document occurs in an operating system kernel. The user information includes a user identifier. The user information includes a user identifier and an organization identifier. The document identifier is a universally unique identifier. The first encryption key is a symmetric key.

The first encryption key is a private key of a public private key pair. The first encryption key is not stored on the key management server. The second encryption key is a symmetric key. The detecting a file open operation on the encrypted document is performed using code injection. The detecting a file open operation on the encrypted document occurs in a process of the application program, where the application program invokes the file open operation. The detecting a file open operation on the encrypted document occurs in an operating system kernel. The first encryption key and the third encryption key are identical. The third encryption key is a public key of a public private key pair. The second encryption key and the forth encryption key are identical. The third encryption key does not exist before T2.

In an implementation, a method includes: providing an information management system having a key management server and a computing device; providing the computing device having an encryption service module; providing the key management server having a secret, where the secret is not known to the encryption service module; at the computing device at a time T1, saving a document opened in an application program by a user; at the encryption service module, detecting a file save operation on the document; at the encryption service module, collecting user information of the user; at the encryption service module, creating a document identifier for the document; at the encryption service module, sending the user information and the document identifier to the key management server; at the key management server, creating a first encryption key with the document identifier, the user information and the secret; at the encryption service module, receiving the first encryption key from the key management server; at the encryption service module, creating a second encryption key; and at the encryption service module, encrypting the document with the second encryption key to produce encrypted content.

Further, the method includes: at the encryption service module, encrypting the second encryption key with the first encryption key to produce an encrypted second encryption key; at the encryption service module, storing the document identifier, the user information, the encrypted second encryption key and the encrypted content in an encrypted document; at the computing device at a time T2, opening the encrypted document in the application program by the user, where T2 happens some time after T1; at the encryption service module, detecting a file open operation on the encrypted document; at the encryption service module, retrieving the document identifier and the user information in the encrypted document; at the encryption service module, sending the document identifier and the user information to the key management server; at the key management server, creating a third encryption key with the document identifier, the user information and the secret; at the encryption service module, receiving the third encryption key from the key management server; at the encryption service module, decrypting the encrypted second encryption key in the encrypted document with the third encryption key to produce a forth encryption key; and at the encryption service module, decrypting the encrypted content in the encrypted document with the forth encryption key to produce unencrypted content.

In various implementations, the first encryption key is not stored on the key management server. The second encryption key and the forth encryption key are identical. The third encryption key does not exist before T2.

In an implementation, a method includes: providing an information management system having a key management server, a first computing device and a second computing device; providing the first computing device having a first encryption service module; providing the second computing device having a second encryption service module; providing the key management server having a secret, where the secret is not known to the first encryption service module and the second encryption service module; at the first computing device at a time T1, saving a document opened in a first application program by a first user; at the first encryption service module, detecting a file save operation on the document; at the first encryption service module, collecting user information of the first user; at the first encryption service module, sending the user information to the key management server; at the key management server, creating a document identifier for the document; at the key management server, creating a first encryption key with the document identifier, the user information and the secret; and at the first encryption service module, receiving the document identifier and the first encryption key from the key management server; at the first encryption service module, creating a second encryption key.

Further, the method includes: at the first encryption service module, encrypting the document with the second encryption key to produce encrypted content; at the first encryption service module, encrypting the second encryption key with the first encryption key to produce an encrypted second encryption key; at the first encryption service module, storing the document identifier, the user information, the encrypted second encryption key and the encrypted content in an encrypted document; at the second computing device at a time T2, opening the encrypted document in a second application program by a second user, where T2 happens some time after T1; at the second encryption service module, detecting a file open operation on the encrypted document; at the second encryption service module, retrieving the document identifier and the user information in the encrypted document; at the second encryption service module, sending the document identifier and the user information to the key management server; at the key management server, creating a third encryption key with the document identifier, the user information and the secret; at the second encryption service module, receiving the third encryption key from the key management server; at the second encryption service module, decrypting the encrypted second encryption key in the encrypted document with the third encryption key to produce a forth encryption key; and at the second encryption service module, decrypting the encrypted content in the encrypted document with the forth encryption key to produce unencrypted content.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 13 shows a flow diagram of an encryption service module obtaining an encryption key from a key management server to decrypt an encrypted content encryption key in a file open operation.

FIG. 15 shows a flow diagram of an encryption service module obtaining an encryption key from a key management server to decrypt an encrypted document in a file open operation.

FIGS. 22A-22C show a flow diagram of decrypting an encrypted document with an encryption key request routed between two key management servers in peer-to-peer configuration.

FIGS. 28A-28B show a flow diagram of a first user sharing an encrypted document with a second user via email and an encryption key request message is routed through a key message routing server.

FIGS. 29A-29B show a flow diagram of a first user sharing an encrypted document with a second user via cloud storage and an encryption key request message is routed through a key message routing server.

FIGS. 33A-33B show a flow diagram of two key management servers having different secrets creating encryption keys to decrypt an encrypted document.

DETAILED DESCRIPTION OF THE INVENTION

Figure 1:
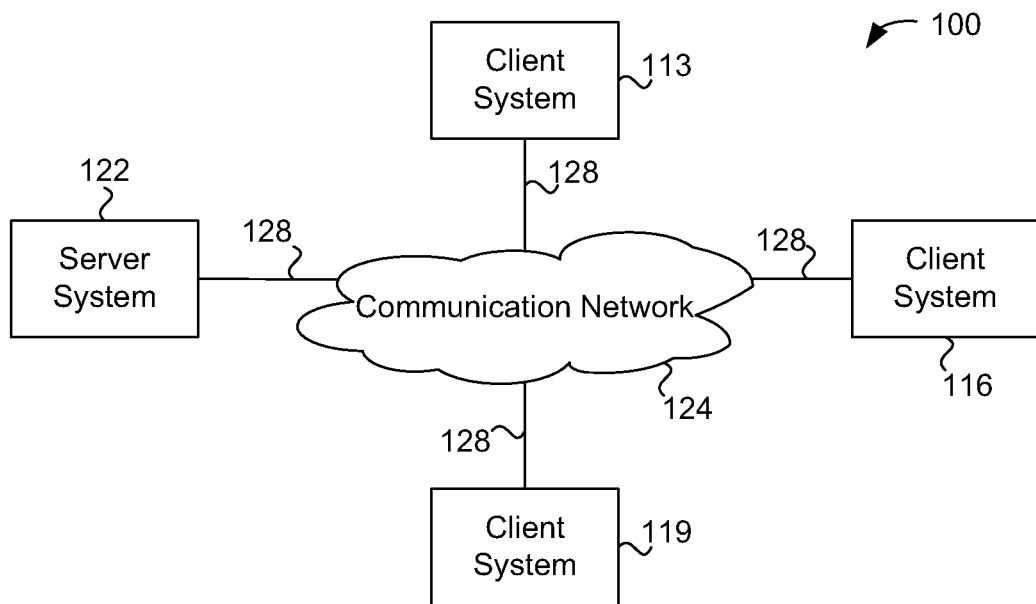
FIG. 1 shows a simplified block diagram of a distributed computer network and clients.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, or others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser by Microsoft Corporation, the Firefox® browser by Mozilla Foundation, the Chrome browser by Google Inc., the Safari browser by Apple Inc., or others.

Figure 2:
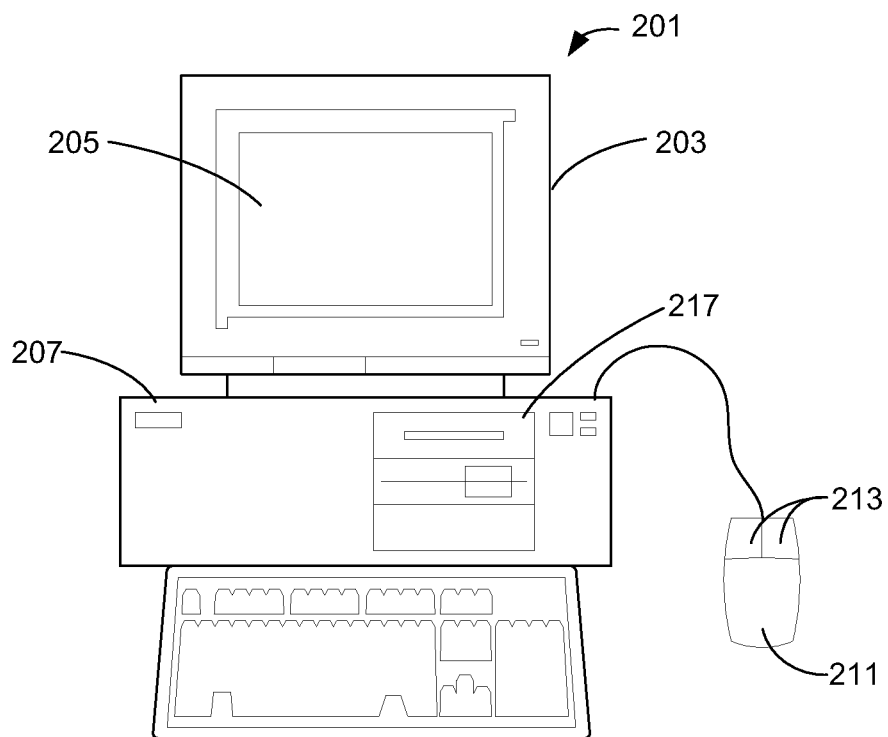
FIG. 2 shows a more detailed diagram of a computer system which may be a client or server.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media may also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
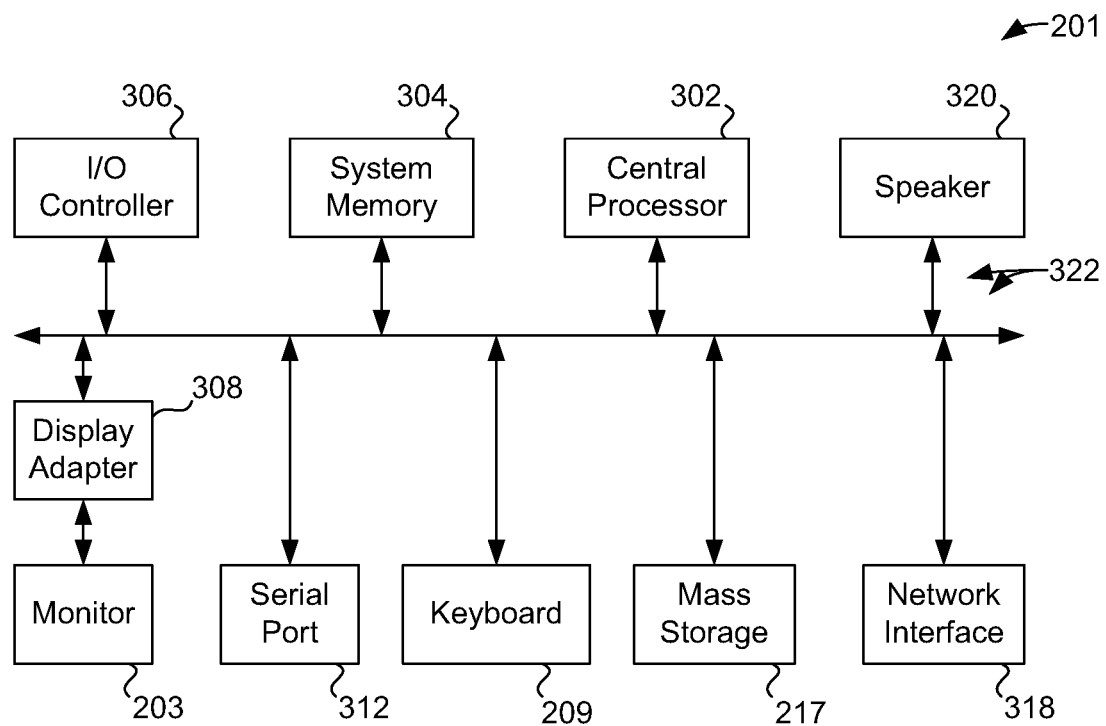
FIG. 3 shows a system block diagram of computer system.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64 X2 Dual-Core, AMD Phenom™, or Microsoft Xbox 360 central processing unit (CPU).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle). An operating system for the system may be one of the Microsoft Windows® family of operating systems (e.g., Windows 95, 98, Me, Windows NT, Windows 2000, Windows XP, Windows Vista, Windows 7, Windows CE, Windows Mobile), Linux, UNIX, Sun OS, Ubuntu, or Macintosh OS X. Other operating systems may be used. Microsoft Windows is a trademark of Microsoft Corporation.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

This patent application incorporates by reference U.S. patent applications 60/755,019, filed Dec. 29, 2005, 60/776, 036, filed Dec. 29, 2005, 60/743,121, filed Jan. 11, 2006, 60/821,050, filed Aug. 1, 2006, 60/870,195, filed Dec. 15, 2006, 61/357,016, filed Jun. 21, 2010, 61/368,408, filed Jul. 28, 2010, 61/471,682, filed Apr. 4, 2011, 62/220,104, filed Sep. 17, 2015, 62/240,391, filed Oct. 11, 2015, 62/344,557, filed Jun. 2, 2016, 62/365,886, filed Jul. 22, 2016, 62/373,319, filed Aug. 10, 2016, Ser. No. 11/383,159, filed May 12, 2006, Ser. No. 11/383,161, filed May 12, 2006, Ser. No. 11/383,164, filed May 12, 2006, Ser. No. 11/615,477, filed Dec. 22, 2006, Ser. No. 13/165,730, filed Jun. 21, 2011, Ser. No. 13/193,588, filed Jul. 28, 2011, Ser. No. 13/439,827, filed Apr. 4, 2012, Ser. No. 15/268,155, filed September 2016, Ser. No. 15/291,653, filed Oct. 12, 2016 and Ser. No. 15/482,655, filed Apr. 7, 2017.

The following discussion teaches methods of creating (or generating) encryption keys for encrypting documents, creating encryption keys for decrypting encrypted documents, and integrating access, use and rights control policies to control access and use of documents and their contents. While access, use or rights control policies provide active protection to documents, encryption provides passive protection when documents are not under the purview of access, use or rights control policies.

A document may be a file system or non-file system object. Examples of file system objects include word processing file, spreadsheet file, portable document format (PDF) file, 2D computer aided design (CAD) data file, 3D CAD data file, or others. Examples of a non-file system objects include e-mail message, attachment of an e-mail message, file in cloud storage, file in an archive (e.g., zip file or Adobe® Portfolio), or others. Examples of cloud storages include Apple iCloud Drive®, Dropbox®, Google Drive®, Microsoft SharePoint®, Microsoft OneDrive® or Amazon Web Services®, or others. A document may encompass objects such as a file, compound document, e-mail message, chat message, web page or any unit of information content stored in volatile or nonvolatile memory.

An encryption key (sometimes referred to as cryptographic key) is an input parameter to a cryptographic algorithm that influences the transformation of unencrypted data to encrypted data in encryption; and encrypted data to unencrypted data in decryption. An encryption key may comprise random data or a large prime number which is hard to guess by a person not authorized to access content encrypted by the encryption key. Unencrypted data (sometimes referred to as plain text in cryptographic literatures) is data input to a cryptographic algorithm in an encryption process; or data output by a cryptographic algorithm in a decryption process. Unencrypted data is typically human readable. Encrypted data (sometimes referred to as cipher text in cryptographic literatures) is data output by a cryptographic algorithm in an encryption process; or data input to a cryptographic algorithm in a decryption process. Encrypted data appears random.

Cryptographic algorithm may be symmetric or asymmetric. Symmetric cryptographic algorithm uses the same encryption key in encryption and decryption. The encryption key used in a symmetric cryptographic algorithm is referred to as a symmetric key. Common symmetric cryptographic algorithms include Advanced Encryption Standard (AES), Twofish, Serpent, Blowfish, CASTS, Grasshopper, RC4, Triple Data Encryption Algorithm (3DES), Skipjack, Safer+/++ or IDEA. Whereas, asymmetric cryptographic algorithm such as public key encryption uses a pair of keys to perform encryption and decryption. In public key encryption, a document encrypted with a private key may be decrypted with a public key where the public and private keys are encryption keys in a public/private key pair. Similarly, a document encrypted with a public key may be decrypted with a private key in a public/private key pair.

An encrypted document is a specific document comprises encrypted content and information necessary to obtain an encryption key to decrypt the encrypted content. An encrypted document may include data such as document attributes, expiration date, export control information, owner, author, search index, policies (or rules) for controlling access or use, creation history, access history, versioning information, lineage, or others. Since an encrypted document is itself a document, it may be handled just like any document. For example, if an encrypted document is a file, it may be read from or written to a file system, attached to an email message, uploaded to or downloaded form a website, or inserted into a chat message. In another example, if an encrypted document is a data object (i.e., a non-file system object), it may be store in a database record, embedded in another data object, embedded in a document, embedded in a message, or others.

An encrypted document may be encrypted with one or more encryption keys. When one encryption key is used to encrypt a document, the encryption key is used to encrypt a document to produce encrypted content. The encrypted content is stored in an encrypted document along with information necessary to obtain the encryption key and any optional data. The encryption key may be a symmetric key or a key in an asymmetric key pair (e.g., a public or private key in a public/private key pair).

When two encryption keys are used to encrypt a document, a key encryption key is used to encrypt a content encryption key to produce an encrypted content encryption key (sometimes referred to as key data) and the content encryption key is used to encrypt a document to produce encrypted content. The encrypted content and the key data are stored in an encrypted document along with information necessary to obtain the key encryption key and any optional data. A key encryption key may be a symmetric key or a key in an asymmetric key pair. A content encryption key is typically a symmetric key.

In an implementation, the present invention stores information necessary to obtain an encryption key for decryption in an encrypted document to facilitate decryption of the encrypted document. Information necessary to obtain an encryption key for decryption comprises one or more key creation factors. Examples of key creation factors include user identifier, document identifier, organization identifier, group identifier, device identifier, key management server identifier, key type indicator (e.g., a flag indicating symmetric, public or private key), seed token or retention data.

In another implementation, some key creation factors are stored outside of an encrypted document. A key management server (described further below) or an encryption service module (described below) has access to the some key creation factors while it creates an encryption key. The some key creation factors include organization identifier, group identifier, key management server identifier, seed token, retention data, or others.

The one or more key creation factors may be applied to create (or generate) an encryption key. Alternatively, a subset of the one or more key creation factors may be applied to create an encryption key. In fact, many combinations of key creation factors are possible. Selection of key creation factors may be based on characteristics manifested by each or combined key creation factors. The characteristics manifested by key creation factors include the followings. An encryption key created based in part on a document identifier is document specific. An encryption key created based in part on a user identifier is user specific. An encryption key created based in part on an organization identifier is organization specific. An encryption key created based in part on a group identifier is group specific. An encryption key created based in part on a device identifier is device specific. An encryption key created based in part on a seed token may allow encryption key recovery, offline encryption key creation or sharing of encrypted documents with two or more key management servers with different one or more secrets.

In an implementation, information necessary to obtain an encryption key comprises a document identifier. In another implementation, information necessary to obtain an encryption key comprises a user identifier. In yet another implementation, information necessary to obtain an encryption key comprises a document identifier and a user identifier. In yet another implementation, information necessary to obtain an encryption key comprises a document identifier, a user identifier and a seed token. In yet another implementation, information necessary to obtain an encryption key comprises a document identifier and an organization identifier. In yet another implementation, information necessary to obtain an encryption key comprises a document identifier, a user identifier and an organization identifier. In yet another implementation, information necessary to obtain an encryption key comprises a document identifier, a user identifier, an organization identifier and a seed token. In yet another implementation, information necessary to obtain an encryption key comprises a document identifier, a user identifier, an organization identifier, a group identifier and a seed token. In yet another implementation, information necessary to obtain an encryption key comprises a device identifier. In yet another implementation, information necessary to obtain an encryption key comprises a device identifier and a seed token. In yet another implementation, information necessary to obtain an encryption key comprises a document identifier and a key management server identifier. In yet another implementation, information necessary to obtain an encryption key comprises a document identifier, a user identifier, a key management server identifier and a seed token. In yet another implementation, information necessary to obtain an encryption key comprises a document identifier, a user identifier, an organization identifier, a key management server identifier and a seed token. In yet another implementation, information necessary to obtain an encryption key comprises a document identifier, a user identifier and retention data. In yet another implementation, information necessary to obtain an encryption key comprises a document identifier, a user identifier, a seed token and retention data.

A document identifier may be an integer, a string, a universally unique identifier (or UUID), a file name, a cryptographic key, a cryptographic hash, an object with one or more data elements, a block of binary data, or others. A cryptographic hash is a value created with a cryptographic hash algorithm (sometimes referred to as cryptographic hash function). Examples of cryptographic hash algorithms include MD4, MD5, SHA-1, SHA-2 and SHA-3. Examples of document identifiers include "7565F325-7FFF-4411-873B-3A489E5C7D51", "2016 sales forecast.xlsx@marketing.mycompany" or "a killer purposal.doc". In additional to identifying a document, a document identifier may include additional information such as time when the document was created; computing device the document was created on; size of the document; original file name of the document; checksum of the document; digital signature of the document; or others.

Typically, a document identifier uniquely identifies a document within an organization or a group. An encryption key created based in part on a document identifier is unique in most situations. While having a unique document identifier for each document is desirable, it is not a prerequisite of the present invention.

A user identifier contains information that identifies a user. A user identifier may be an integer, a string, a universally unique identifier, a user name, a cryptographic key, a cryptographic hash, a digital certificate, an object with one or more data elements, a block of binary data, or others. An example of a user identifier is "marypaulson@mycompany". In addition to identifying a user, a user identifier may include additional information such as organization name, organization identifier, job title, role, access privileges, key management server identifier, or others.

An organization identifier contains information that identifies an organization. An organization identifier may be an integer, a string, a universally unique identifier, an organization name, a cryptographic key, a cryptographic hash, a digital certificate, an object with one or more data elements, a block of binary data, or others. An organization may be a company, department, function unit, group, branch, office, government, branch in a government, trade group, inter-governmental group, or others. Examples of organization identifiers include "XYZ Research Labs", "Weapon design division", "marketing@topsales.com" or "legal.ultradesign.com". In addition to identifying an organization, an organization identifier may include additional information such as contact name, email address or key management server identifier.

A group identifier contains information that identifies a group. Typically, a group represents a collection of people within an organization or across multiple organizations. A group identifier may be an integer, a string, a universally unique identifier, a name, a cryptographic key, a cryptographic hash, a digital certificate, an object with one or more data elements, a block of binary data, or others. Examples of group identifiers include "Project XYZ" or "Clean energy industry workgroup".

A device identifier contains information that identifies a device. A device identifier may be an integer, a string, a universally unique identifier, a device name, a cryptographic key, a cryptographic hash, a digital certificate, a MAC address, an object with one or more data elements, a block of binary data, or others. An example of a device identifier is "safedisk1@mycompany". In addition to identifying a device, a device identifier may include additional information such as model number, serial number, hardware address, manufacture date, or others.

A key management server identifier contains information that identifies a key management server (described further below). A key management server identifier may be an integer, a string, a universally unique identifier, a cryptographic key, a cryptographic hash, a digital certificate, an object with one or more data elements, a block of binary data, or others. An example of a key management server identifier is "kms1@topsecretlab.nextbigthing.com". In addition to identifying a key management server, a key management server identifier may include additional information such as contact name, email address, or others.

A seed token contains information for creating an encryption key. A seed token may be a string, a cryptographic key, cryptographic hash, a digital certificate, a block of binary data, or others. Seed token has many applications including enabling encryption key recovery, offline encryption key creation, or sharing of encrypted documents.

In an implementation, an encryption key is created based in part on one or more seed tokens. The one or more seed tokens are stored in an encrypted document. A first seed token in the encrypted document is used in tandem with a first secret kept on a first computing device to create a first encryption key. A second seed token in the encrypted document is used in tandem with a second secret kept on a second computing device to create a second encryption key. The first and second secrets are different. The first and second encrypted keys are identical.

In an implementation, one or more seed tokens are created when a user account is created in an information management system (described further below). In another implementation, one or more seed tokens are created at the first time when a user requests an encryption key from a key management server.

In an implementation, an encryption key request returns an encryption key and one or more seed tokens. In another implementation, one or more seed tokens are sent to an encryption service module or a managed application program (described further below under FIGS. 6, 7 and 8) on a computing device when a user logs on to the computing device.

Retention data contains information that is used to disallow access to an encrypted document after a particular date or certain criteria is satisfied. Retention data may be used in creating an encryption key. Retention data may specify an expiration date, maximum number of accesses, or others.

Figure 4:
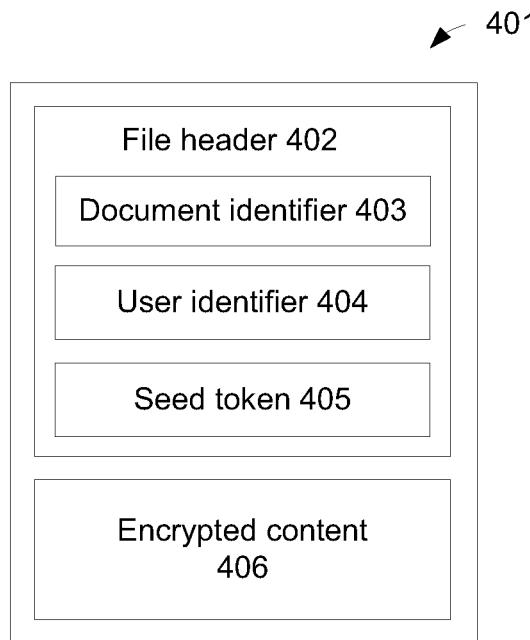
FIG. 4 shows a layout of an encrypted document encrypted with one encryption key.

FIG. 4 shows an example layout of an encrypted document 401 encrypted with one encryption key. The encrypted document includes a file header 402 and encrypted content 406. The file header includes a document identifier 403, a user identifier 404 and a seed token 405. The encrypted document may include additional sections such as document attributes, search index, policies (or rules) for controlling access or use, or others. The file header may include other data such as expiration date, export control information, owner, author, organization identifier, group identifier, device identifier key management server identifier, seed token, retention data, or others.

In an example, the document identifier 403, the user identifier 404 and the seed token 405 together constitute information necessary to obtain an encryption key to decrypt the encrypted document 401. The document identifier, the user identifier and the seed token together allow a key management server or computing device to create (or generate) an encryption key for encryption or decryption. To create the encrypted document 401, the encryption key is used to encrypt a document to produce the encrypted content 406. To read the encrypted document 401, the encryption key is used to decrypt encrypted content 406 to produce unencrypted content (or a document).

Figure 5:
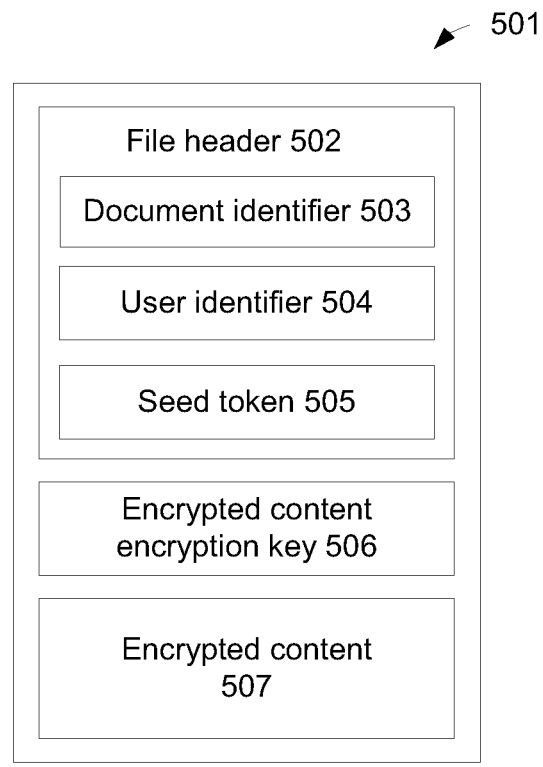
FIG. 5 shows a layout of an encrypted document encrypted with a key encryption key and a content encryption key.

FIG. 5 shows an example layout of an encrypted document 501 encrypted with two encryption keys—a key encryption key and a content encryption key. The encrypted document includes a file header 502, an encrypted content encryption key (sometimes referred to as key data) 506 and encrypted content 507. The file header includes a document identifier 503, a user identifier 504 and a seed token 505. The encrypted document may include additional sections such as document attributes, search index, policies (or rules) for controlling access or use, or others. The file header may include other data such as expiration date, export control information, owner, author, organization identifier, group identifier, device identifier, key management server identifier, seed token, retention data, or others.

In an example, the document identifier 503, the user identifier 504 and the seed token 505 together constitute information necessary to obtain an encryption key to decrypt the encrypted document 501. The document identifier, the user identifier and the seed token together allow a key management server or computing device to create (or generate) a key encryption key for encryption or decryption. To create the encrypted document 501, the key encryption key is used to encrypt a content encryption key to produce the encrypted content encryption key 506. The content encryption key is used to encrypt a document to produce the encrypted content 507. To read the encrypted document 501, the key encryption key is used to decrypt the encrypted content encryption key 506 to produce a content encryption key. The content encryption key is used to decrypt the encrypted content 507 to produce unencrypted content (or a document).

An encryption service module is a code module that implements encryption or decryption function, or both described in the present invention. In an implementation, an encryption service module is invoked by an application program when the application program performs a file operation such as open, read or write. An encryption service module may be an integral part of an application program; or an add-on to an application program process installed using one or more instrumentation techniques. An encryption service module or a part of it may reside in operating system kernel.

In another implementation, an encryption service module may be an integral part of an operating system; or an add-on to an operating system. The encryption service module may be invoked by a file system operation such as fopen( ), open( ), fread( ), fwrite( ), read( ), write( ), FileCopy( ), or others.

Instrumentation may be implemented using application programming interface (API), operating system programming interface, operating system service provider, filter, event handler, device driver, code injection, hooking, or others. Instrumentation may be installed statically on an application program; or dynamically in an application program process. Instrumentation techniques are described in detail in U.S. patent application Ser. No. 11/383,159, filed May 12, 2006 and U.S. patent applications aforementioned and incorporated by reference.

In an embodiment, an encryption service module requests an encryption key from a key management server (described further below). The key management server may create an encryption key that may only be recreated on the same key management server, or an encryption key that may be recreated on another key management server, encryption service module, or managed application program. If the key management server creates an encryption key based in part on one or more secrets maintained by the key management server not known to other computing devices, the encryption key may not be recreated at another key management server. If the key management server creates an encryption key without using a secret that is not known to another key management servers, the encryption key may be recreated at another key management server or encryption service module.

An encryption service module may cache an encryption key in a local key store or secured storage to improve performance or support offline operations.

In an implementation, before encrypting a document, an encryption service module retrieves a user identifier of the current user on a computing device, and sends the user identifier to a key management server to request an encryption key. The key management server returns a document identifier and an encryption key to the encryption service module.

In another implementation, before encrypting a document, an encryption service module retrieves a user identifier of the current user on a computing device, and creates (or generates) a document identifier. The encryption service module sends the user identifier and the document identifier to a key management server to request an encryption key. The key management server returns an encryption key to the encryption service module.

In an embodiment, an encryption service module creates an encryption key locally. The encryption key created locally may also be recreated on a key management server. In an example, when a first user tries to encrypt a document, a first encryption service module on a first computing device creates a first encryption key to encrypt the document to produce encrypted content. The encrypted content and some key creation factors are stored in an encrypted document. When a second user tries to open the encrypted document, a second encryption service module on a second computing device requests a second encryption key from a key management server with the some key creation factors. The second encryption service module uses the second encryption key to decrypt the encrypted document to produce unencrypted content (i.e., a copy of the document).

In an implementation, before encrypting a document, an encryption service module retrieves a user identifier of the current user on a computing device, and creates a document identifier. The encryption service module creates an encryption key based in part on the user identifier and document identifier.

In another implementation, before encrypting a document, an encryption service module retrieves a user identifier of the current user on a computing device and a seed token, and creates a document identifier. The encryption service module uses the user identifier, the document identifier and the seed token to create an encryption key.

Figure 6:
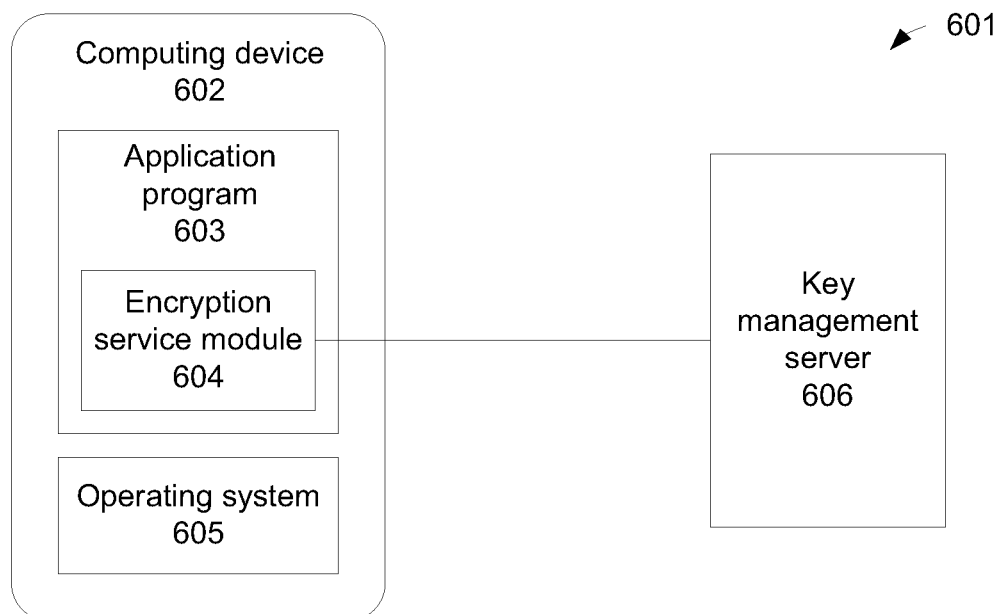
FIG. 6 shows a block diagram of an encryption service module running in an application program process.

FIG. 6 shows a block diagram 601 of an encryption service module 604 running in an application program process. The application program process belongs to an application program 603 running on a computing device 602. An operating system 605 is running on the computing device. The encryption service module may be an integral part of the application program; or an add-on to an application program process installed using one or more instrumentation techniques. The encryption service module is invoked by the application program to encrypt a document or decrypt an encrypted document. Before encrypting a document or decrypting an encrypted document, the encryption service module requests an encryption key from a key management server 606.

In an implementation, the encryption service module creates an encryption key locally to encrypt a document, but requests an encryption key from a key management server to decrypt an encrypted document when the encrypted document is encrypted by a user different from the current user.

Figure 7:
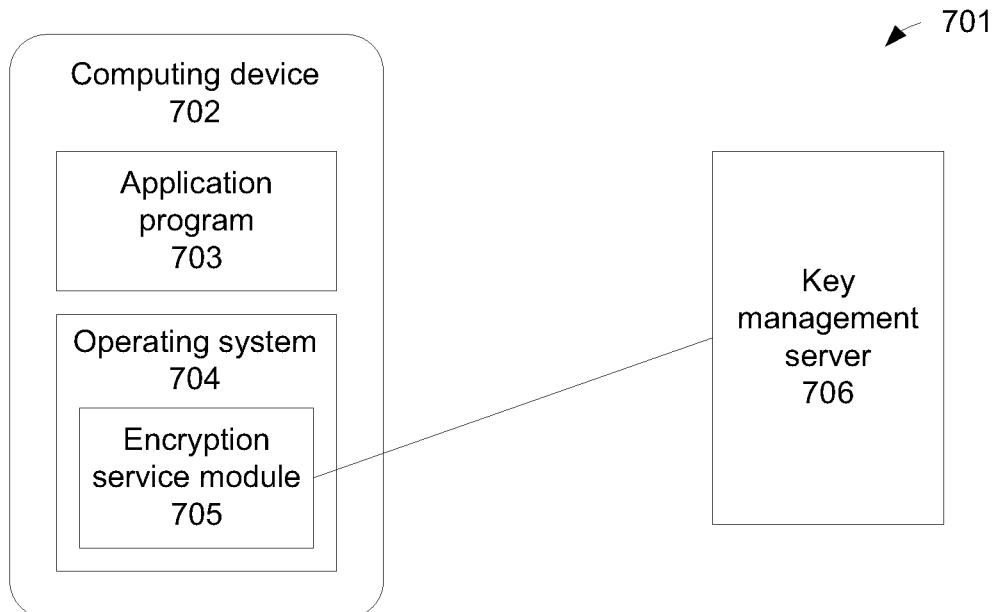
FIG. 7 shows a block diagram of an encryption service module running in an operating system.

FIG. 7 shows a block diagram 701 of an encryption service module 705 running in an operating system 704. The operating system is running on a computing device 702 along with an application program 703. The encryption service module detects (or intercepts or senses) a file operation to perform encryption or decryption. Before the encryption service module encrypts a document or decrypts an encrypted document, the encryption service module requests an encryption key from a key management server 706.

In an implementation, the encryption service module creates an encryption key locally to encrypt a document, but requests an encryption key from a key management server to decrypt an encrypted document when the encrypted document is encrypted by a user different from the current user.

In an implementation, an encryption service module 604 or 705 encrypts a document with one encryption key created by a key management server 606 or 706. The encryption service module requests an encryption key from the key management server and the key management server returns a document identifier and an encryption key to the encryption service module. The encryption service module encrypts the document with the encryption key to produce encrypted content 406. The encryption service module stores the encrypted content, the document identifier 403, a user identifier 404, a seed token 405 and any additional information necessary to obtain an encryption key to decrypt the encrypted content in an encrypted document 401. Alternatively, a document identifier may be created by the encryption service module and sent to the key management server in the encryption key request.

In an implementation, an encryption service module 604 or 705 encrypts a document with one encryption key created locally. The encryption service module creates a document identifier and an encryption key to encrypt the document to produce encrypted content 406. The encryption service module stores the encrypted content, the document identifier 403, a user identifier 404, a seed token 405 and any additional information necessary to obtain an encryption key to decrypt the encrypted content in an encrypted document 401.

In an implementation, an encryption service module 604 or 705 encrypts a document with two encryption keys where a key encryption key is created by a key management server 606 or 706. The encryption service module requests a key encryption key from the key management server and the key management server returns a document identifier and a key encryption key to the encryption service module. A content encryption key is created locally to encrypt the document to produce encrypted content 507. The encryption service module encrypts the content encryption key with key encryption key to produce an encrypted content encryption key 506. The encryption service module stores the encrypted content, the encrypted content encryption key, the document identifier 503, a user identifier 504, a seed token 505 and any additional information necessary to obtain a key encryption key to decrypt the encrypted content encryption key in an encrypted document 501. Alternatively, a document identifier may be created by the encryption service module and sent to the key management server in the encryption key request. Also, a content encryption key may be created by the key management server. The content encryption key may be encrypted at the key management server and encrypted content encryption key is returned to the encryption service module.

In an implementation, an encryption service module 604 or 705 encrypts a document with two encryption keys where a key encryption key, a content encryption key and a document identifier are created locally. The encryption service module encrypts the document with a content encryption key to produce encrypted content 507. The encryption service module encrypts the content encryption key with key encryption key to produce an encrypted content encryption key 506. The encryption service module stores the encrypted content, the encrypted content encryption key, the document identifier 503, a user identifier 504, a seed token 505 and any additional information necessary to obtain a key encryption key to decrypt the encrypted content encryption key in an encrypted document 501.

To decrypt an encrypted document 401 or 501, an encryption service module 604 or 705 retrieves (or extracts) information necessary to obtain an encryption key from the encrypted document. The information necessary to obtain an encryption key may include a document identifier 403 or 503, a user identifier 404 or 504, a seed token 405 or 505, or others.

In an implementation, an encrypted document 401 is encrypted with one encryption key and an encryption service module 604 or 705 decrypts encrypted content 406 with an encryption key obtained from a key management server 606 or 706 to produce unencrypted content (or a document).

In an implementation, an encrypted document 501 is encrypted with two encryption keys and an encryption service module 604 or 705 decrypts an encrypted content encryption key 506 with a key encryption key obtained from a key management server 606 or 706 to produce a content encryption key. The encryption service module decrypts encrypted content 507 with the content encryption key to produce unencrypted content (or a document).

In an implementation, an encrypted document 501 is encrypted with two encryption keys by a particular user and an encryption service module 604 or 705 decrypts an encrypted content encryption key 506 with a key encryption key created by the encryption service module to produce a content encryption key when the particular user attempts to decrypt the encrypted document. The encryption service module decrypts encrypted content 507 with the content encryption key to produce unencrypted content (or a document).

A managed application program may implement functions of an encryption service module described above. As such, a managed application program may directly invoke functions of an encryption service module without the needs to detect a file operation.

Figure 8:
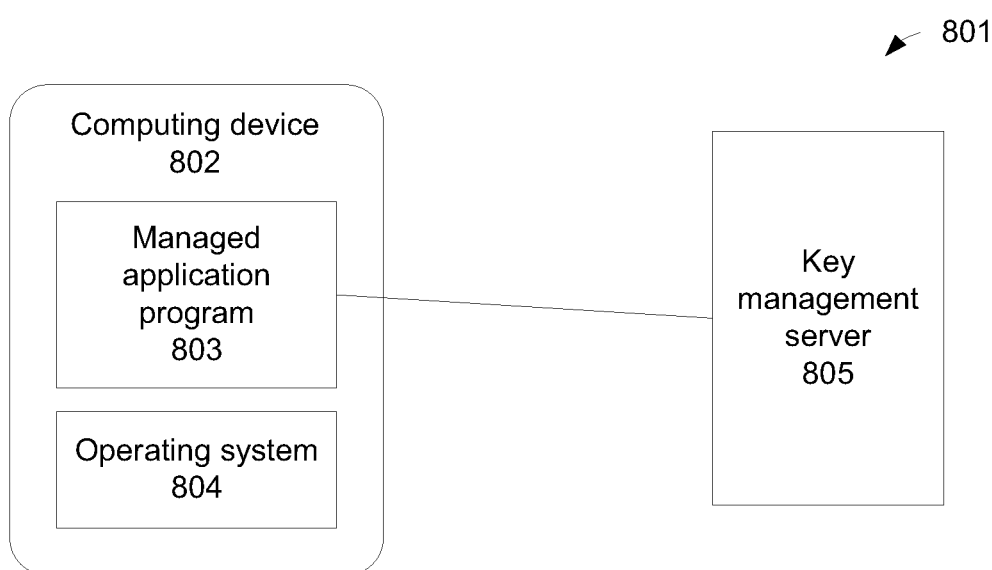
FIG. 8 shows a block diagram of a managed application program communicating with a key management server.

FIG. 8 shows a block diagram 801 of a managed application program 803 communicating with a key management server 805. The managed application program is running on a computing device 802 along with an operating system 804. Encryption and decryption functions are features of the managed application program. Before encrypting a document or decrypting an encrypted document, the managed application program requests an encryption key from the key management server. Alternatively, the managed application program creates an encryption key locally to encrypt a document, but requests an encryption key from a key management server to decrypt an encrypted document that is encrypted by a user different from current user.

A key management server 606, 706 or 805 handles (or services) encryption key requests from one or more encryption service modules 606 or 705 or managed application programs 803. An encryption key request comprises one or more key creation factors include document identifier, user identifier, organization identifier, group identifier, device identifier, key management server identifier, seed token, retention data, or others. When an encryption service module or a managed application program requests an encryption key to encrypt a document, a user identifier in an encryption key request refers to the current user on a computing device making the request. When an encryption service module or a managed application program requests an encryption key to decrypt an encrypted document 401 or 501, a user identifier in an encryption key request is a user identifier 404 or 504 in the encrypted document.

An encryption key request is a request sends to a key management server using any standard or non-standard communication protocols. Examples of standard communication protocols include HTTP, HTTPS, REST, SOAP, TCP/IP, or others. An encryption key request may be a message, remote procedure call, remote method, or others.

A key management server does not store encryption keys it creates (or generates). Encryption keys are created when they are needed for encryption or decryption. A key management server may create encryption keys for symmetric cryptographic algorithm, asymmetric cryptographic algorithm, or both. For encryption or decryption using a symmetric cryptographic algorithm such as AES or 3DES, a key management server creates identical encryption keys for both. For encryption or decryption using asymmetric cryptographic algorithm such as public key encryption, a key management server creates a public/private key pair and returns a public or private key according to an encryption key request.

A key management server may maintain one or more secrets that are not known to other computing devices and create an encryption key based in part on the one or more secrets. An encrypted document encrypted with an encryption key created based in part of the one or more secrets may be decrypted only with an encryption key created by the same key management server. Since an encryption key is not stored on a key management server or in a database for decryption purpose, there is no other means to retrieve the encryption key besides recreating it on the same key management server.

To allow for performance, scalability and reliability, two or more key management server instances may be deployed in a load-balanced, clustered or failover configuration. In each configuration, all key management server instances are treated as one logical key management server, wherein each key management server instance maintains a copy of one or more secrets, wherein each key management server instance is capable of handling an incoming encryption key request and returning a correct encryption key. In another word, a key management server cluster is considered logically one key management server in this document.

A key management server may maintain one or more seed tokens that are used in creating encryption keys. A seed token and a secret may be applied to create a shared secret, and the shared secret is applied to create an encryption key. By applying a shared secret in encryption key creation, the present invention allows encryption keys to be created by one or more key management servers, encryption service modules or managed application programs. The present invention also describes a key recovery scheme (described further below) built using shared secrets in encryption key creation. Many methods for creating shared secrets are available in the literature including Shamir's secret sharing scheme created by Adi Shamir, Blakley's scheme, Mignotte's scheme, Asmuth-Bloom's scheme, Diffie-Hellman key exchange, or others. In addition, shared secrets may be established among key management servers, encryption service modules, managed application programs, users, organizations, groups, devices, combinations of these, or others.

In an example, a first seed token, other key creation factors and a first secret are used to create a first encryption key. The first seed token is constructed in such a way that when a second seed token, the other key creation factors and a second secret are used to create a second encryption key, the first and second encryption keys are identical while the first and second seed tokens are different, and the first and second secrets are different.

The first seed token and the first secret may be maintained by a first key management server. The second seed token and the second secret may be maintained by a second key management server. The first and second key management servers may be organized hierarchically, where the second key management server is the parent of the first key management server. Encryption key requests are served by the first key management server and encryption key recovery functions are provided by the second key management server. Alternatively, the first and second key management servers may be independent of each other, and one serves encryption key requests by default and the other provides encryption key recovery functions.

This technique may be extended to include three or more seed token and secret pairs that may be used to create an identical encryption key.

In another example extending the previous example, a third seed token, the other key creation factors and a third secret may be used to create a third encryption key; where the first, second and third seed tokens are different, the first, second and third secrets are different, but the first, second and third encryption keys are identical. The third seed token and the third secret may be maintained by a third key management server.

In an implementation, the second key management server also implements functions of a key message routing server (described further below).

In an example, to create an encryption key to encrypt a document or decrypt an encrypted document having a document identifier, a first key management server applies a first secret and a first seed token to create a shared secret. The first key management server applies the shared secret, the document identifier and optionally other key creation factors to create a first encryption key. Alternatively, a second key management server applies a second secret and a second seed token to create the shared secret; and applies the shared secret, the document identifier and optionally the other key creation factors to create a second encryption key. The first and second encryption keys are identical.

In another example, to create an encryption key to encrypt a document or decrypt an encrypted document, a first key management server applies a first secret and a first seed token to create a shared secret. The first key management server applies the shared secret and one or more key creation factors to create a first encryption key. Alternatively, a second key management server applies a second secret and a second seed token to create the shared secret. The second key management server applies the shared secret and one or more key creation factors to create a second encryption key. The first and second encryption keys are identical.

In yet another example, to create an encryption key to encrypt a document or decrypt an encrypted document having a document identifier, a key management server applies a first secret and a first seed token to create a shared secret. The key management server applies the shared secret, the document identifier and optionally other key creation factors to create a first encryption key. Alternatively, an encryption service module applies a second secret and a second seed token to create the shared secret. The second key management server applies the shared secret, the document identifier and optionally the other key creation factors to create a second encryption key. The first and second encryption keys are identical.

A key management server maintains one or more secrets that is applied to create encryption keys. A secret may be applied to create a shared secret which is applied to create an encryption key. A secret may be applied directly to create an encryption key. When an encryption key is created with a shared secret, one or more key management servers, encryption service modules or managed application programs are able to create the same encryption key. When an encryption key is created with a secret known only to a particular key management server, other key management severs will not be able to create the encryption key. This type of encryption key is referred to as singular encryption key. If a document is encrypted with a singular encryption key, creating an encryption key to decrypt the encrypted document requires routing an encryption key request to the particular key management server.

In an implementation, a seed token encodes key attributes such as date, time, device information, location, document classification, policies, any combination thereof, or others. Since a seed token is used in encryption key creation, tampering with the key attributes results in an encryption key that fails to decrypt an encrypted document whereby protecting key creation factors from being tampered.

In an implementation, a key management server may temporary or permanently decline to service an encryption key request associates with a particular document identifier, user identifier, device identifier, or others. When an encryption key request is denied, a key management server does not create an encryption key for an encryption key request. A key management server may store document identifiers of encrypted documents, user identifiers, device identifiers, or others that it may restrict access to in persistent storage. Alternatively, a key management server may create policies based on document identifiers, user identifiers, device identifiers, or others to implement desired access control to encrypted documents.

In an example, access restriction may be applied when a first user accidentally sends an encrypted document to a second user, subsequent encryption key requests on the encrypted document by the second user will be blocked by a key management server. In another example, a computing device with a device identifier belonging to an organization is lost, subsequent encryption key requests form the device identifier will be blocked by a key management server.

A key management server handles an encryption key request by creating an encryption key with one or more key creation factors and one or more secrets maintained by the key management server. Key creation factors may be found in an encryption key request; created by a key management server; retrieved by a key management server; or requested from an external source. Examples of key creation factors include document identifier, user identifier, organization identifier, group identifier, device identifier, seed token, passphrase (i.e., a long text string), passcode (e.g., a password that changes periodically or a code sent to a mobile phone), personal identification number (PIN), biometrics, security token (e.g., RSA SecurID® token), retention data, or others.

A key management server maintains one or more secrets to facilitate encryption key creation. Typically, a secret is a sequence of random bits created using a cryptographic algorithm. A secret should be difficult to discover using brute-force techniques by an unauthorized party. Examples of secrets include cryptographic key, cryptographic hash, very large prime number, sequence of random bits, long text string, or others. A cryptographic hash is a value created with a cryptographic hash algorithm (sometimes referred to as cryptographic hash function). Examples of cryptographic hash algorithms include MD4, MD5, SHA-1, SHA-2 or SHA-3. A key management server may periodically update the one or more secrets to minimize damage in case the one or more secrets are compromised. An encryption key created by a key management server based in part on the one or more secrets may not be recreated by a key management server not knowing the one or more secrets.

To support offline creation of encryption keys when a computing device does not have access to a key management server, an encryption key may be created by an encryption service module 604 or 705 or a managed application program 803. An encryption key created by an encryption service module or a managed application program does not use the one or more secrets maintained by a key management server.

In an implementation, an encryption key is created based in part on one or more key creation factors comprising a document identifier.

In an implementation, an encryption key is created based in part on one or more key creation factors comprising a document identifier and a seed token.

In an implementation, an encryption key is created based in part on one or more key creation factors comprising a user identifier.

In an implementation, an encryption key is created based in part on one or more key creation factors comprising a user identifier and a seed token.

In an implementation, an encryption key is created based in part on one or more key creation factors comprising a document identifier and a user identifier.

In an implementation, an encryption key is created based in part on one or more key creation factors comprising a document identifier, a user identifier and a seed token.

In an implementation, an encryption key is created based in part on one or more key creation factors comprising a document identifier, a user identifier, a seed token and retention data. If retention data in an encrypted document is tampered, an encryption key created based in part on the tampered data will not decrypt the encrypted document.

In an implementation, an encryption key is created based in part on one or more key creation factors comprising a document identifier, a user identifier and an organization identifier.

In an implementation, an encryption key is created based in part on one or more key creation factors comprising a document identifier, a user identifier, an organization identifier and a seed token.

In an implementation, an encryption key is created based in part on one or more key creation factors comprising a document identifier, a user identifier, an organization identifier and a group identifier.

In an implementation, an encryption key is created based in part on one or more key creation factors comprising a document identifier, a user identifier, a group identifier and a seed token.

In an implementation, a key management server, an encryption service module or a managed application program applies one or more cryptographic algorithms to transform the one or more key creation factors into a sequence of pseudo random bits. The sequence of pseudo random bits may be applied to a symmetric cryptographic algorithm to create an encryption key. Alternatively, the sequence of pseudo random bits may be applied to a public key encryption algorithm to create a public/private key pair. A public or private key in the public/private key pair is elected an encryption key.

In another implementation, a key management server applies one or more cryptographic algorithms to transform the one or more key creation factors and one or more secrets maintained by the key management server into a sequence of pseudo random bits. The sequence of pseudo random bits may be applied to a symmetric cryptographic algorithm to create an encryption key. Alternatively, the sequence of pseudo random bits may be applied to a public key encryption algorithm to create a public/private key pair. A public or private key in the public/private key pair is elected an encryption key.

Encryption is implemented in different organizations for various reasons. When maintaining absolute secrecy is the top priority, an organization may employ a key management server that maintains one or more secrets unknown to other computing devices and create an encryption key base in part on the one or more secrets. Since the present invention does not store an encryption key for decryption purpose, to decrypt an encrypted document, an encryption key is recreated by a key management server. Traditional issues associated with managing encryption keys do not apply to the present invention because encryption keys are not stored.

In an implementation, a key management server applies one secret to create an encryption key. In another implementation, a key management server applies two or more secrets to create an encryption key.

When keeping a balance between maintaining secrecy and productivity is important, an organization may employ encryption with built-in encryption key recovery features. In an implementation, encryption key recovery is achieved through redundancy. A first key management server having one or more secrets are configured to serve encryption key requests from encryption service modules or managed application programs. A second key management server having the one or more secrets are configured to provide encryption key recovery functions. Both the first and second key management servers are capable of creating an encryption key to decrypt an encrypted document, but they are assigned different roles in an information management system.

In another implementation, encryption key recovery capability is built into an encryption key creation process. A key management server creates an encryption key based in part on a shared secret. The shared secret may be established by two or more key management servers, encryption service modules, managed application programs, users, groups, or others. Typically, a first key management server is configured to handle regular encryption key requests. A second key management server is configured to provide encryption key recovery capabilities.

The present invention presents a technique in creating encryption keys to encrypt a document or decrypt an encrypted document based in part on different combinations of key creation factors to address different business requirements. For example, if being able to recover encryption keys is important, an encryption key creation algorithm may include two or more key management servers each with its own secrets and seed tokens to support creation of a shared secret. If it is important for both key management server and encryption service module to create encryption keys, an encryption key creation algorithm may include a secret maintained by key management server and a first seed token; or a secret and a second seed token associated with a user. If having encryption keys specific to a user is important, an encryption key creation algorithm includes a user identifier. If having a unique encryption key for each document is important, an encryption key creation algorithm includes a document identifier. If it is important to limit encryption key creation to one key management server, an encryption key creation algorithm includes one or more secrets known by the one key management server but not other computing devices.

Retention of encrypted document may be enforced at a key management server, in addition to enforced at a policy enforcer (described further below). An encrypted document may store retention data in its file header. Alternatively, retention data may be stored on a key management server or in a database. A key management server examines retention data of an encrypted document if retention data exists before it creates an encryption key for decryption. If retention data consists of an expiration date, an encryption key is created only if the expiration date occurs in the future. Retention data may also specify number of times an encrypted document may be opened.

To prevent retention data from being tampered when it is stored in an encrypted document, an encryption key creation algorithm may include retention data when it creates an encryption key. A key management server examines retention data if it exists to determine if the encrypted document has expired. If the encrypted document has expired, the key management server does not return an encryption key to an encryption key request. If retention data in an encrypted document is tampered, an encryption key created by a key management server will not decrypt the encrypted document successfully.

The present invention is different from common digital rights management (DRM) solutions in many ways. First, it does not create an encryption key (or license in DRM colloquial) for each use who is granted access to an encrypted document. While a document may be shared with many users, the document is encrypted only once and has one encryption key. Second, encryption keys are not stored for decryption purpose. Third, when a key creation factor includes a user identifier, it is the user identifier of the user who encrypts a document being included and used to create an encryption key. Not a user who will be given access to an encrypted document as with DRM license. Forth, access or use control to an encrypted document is handled by a policy enforcer (described further below) separate from key management and encryption.

To encrypt a document or decrypt an encrypted document, an encryption service module 604 or 705 or a managed application program 803 requests an encryption key from a key management server 606, 706 or 805. If one or more encryption service modules or managed application programs used by two or more users are capable of requesting encryption keys from a particular key management server, the two or more users may share an encrypted document and have the encrypted document decrypted by the one or more encryption service modules or managed application programs.

An encrypted document created by a first user with a first encryption service module or managed application program may be decrypted by the first user with the first encryption service module or managed application program if the first encryption service module or managed application program requests encryption keys for encryption and decryption from the same key management server or one or more key management servers that maintain the same one or more secrets. If the first user shares the encrypted document with a second user, the second user may decrypt the encrypted document with a second encryption service module or managed application program if the first encryption service module, the second encryption service module or managed application program request encryption keys for encryption and decryption from the same key management server or one or more key management servers that maintain the same one or more secrets.

A first user may share an encrypted document with a second user by sending the encrypted document as an attachment in an email message; sending the encrypted document with a messaging application; uploading the encrypted document to a cloud storage or website; uploading the encrypted document to a file server; copying the encrypted document to a removable storage; or more. Examples of messaging applications include Apple Messages®, Facebook WhatsApp®, Facebook Messenger®, Microsoft Skype®, Tencent WeChat™, or others. Examples of cloud storages include Apple iCloud Drive®, Dropbox®, Google Drive®, Microsoft SharePoint®, Microsoft OneDrive®, Amazon Web Services®, or others. Examples of uploading the encrypted document to a file server include transferring the encrypted document using file transfer protocol (FTP), secure copy program (SCP), TeamViewer® file transfer, or others. Examples of removable storages include Flash drive, external hard disk, CD-ROM, DVD, tape, or others.

In an example, a first encryption service module and a second encryption service module request encryption keys from a particular key management server. A first user encrypts a document with the first encryption service module using a first encryption key requested from the particular key management server to produce an encrypted document. The encrypted document may be decrypted by a second user with the second encryption service module using a second encryption key requested from the particular key management server to produce unencrypted content (i.e., a copy of the document). The first and second encryption keys are the same when symmetric cryptographic algorithm is applied. The first and second encryption keys may be different when asymmetric cryptographic algorithm is applied.

Figure 9:
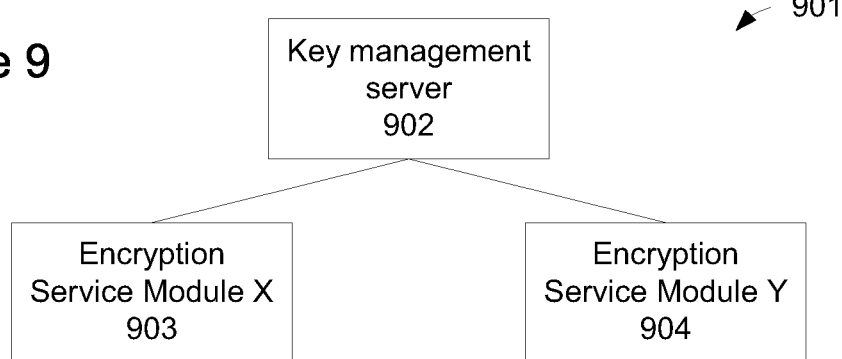
FIG. 9 shows a block diagram of a key management server handling encryption key requests from two encryption service modules.

Referring to FIG. 9, a block diagram 901 showing a key management server 902 handling (or servicing) encryption key requests from two encryption service modules—Encryption Service Module X 903 and Encryption Service Module Y 904. Encryption Service Module X and Encryption Service Module Y request encryption keys from the key management server and use the encryption keys for encryption and decryption. Encryption Service Module Y may successfully decrypt an encrypted document created by Encryption Service Module X and Encryption Service Module X may successfully decrypt an encrypted document created by Encryption Service Module Y, because encryption keys used by the encryption service modules to encrypt or decrypt documents are created by the key management server based in part on the same one or more secrets maintained by the key management server.

In another example, a key management server handles encryption key requests from a first encryption service module and a second encryption service module. At a time T1, a first user attempts to encrypt a document with the first encryption service module. The first encryption service module sends a first encryption key request to the key management server to request a first encryption key. The key management server creates a first encryption key with one or more key creation factors in the first encryption key request and one or more secrets maintained by the key management server. The key management server returns the first encryption key to the first encryption service module. The first encryption service module creates an encrypted document with the first encryption key and the document. The first encryption service module also stores information necessary to obtain an encryption key to decrypt the encrypted document in the encrypted document.

At a time T2 that happens after the encrypted document is created, the first user attempts to open the encrypted document with the first encryption service module. The first encryption service module sends a second encryption key request to the key management server providing information necessary to obtain an encryption key to decrypt the encrypted document retrieved from the encrypted document to request a second encryption key. The key management server creates a second encryption key with the information necessary to obtain an encryption key to decrypt the encrypted document in the second encryption key request and the one or more secrets maintained by the key management server. The key management server returns the second encryption key to the first encryption service module. The first encryption service module decrypts the encrypted document with the second encryption key to produce unencrypted content.

At a time T3 that happens after the encrypted document is created, a second user attempts to open the encrypted document with the second encryption service module. The second encryption service module sends a third encryption key request to the key management server providing information necessary to obtain an encryption key to decrypt the encrypted document retrieved from the encrypted document to request a third encryption key. The key management server creates a third encryption key with the information necessary to obtain an encryption key to decrypt the encrypted document in the third encryption key request and the one or more secrets maintained by the key management server. The key management server returns the third encryption key to the second encryption service module. The second encryption service module decrypts the encrypted document with the third encryption key to produce unencrypted content.

If a symmetric cryptographic algorithm is applied to encrypt the document, the first, second and third encryption keys created by the key management server are identical. If an asymmetric cryptographic algorithm is applied to encrypt the document and the first encryption key is a private key in a public/private key pair, the second encryption key is a public key in the public/private key pair. The second and third encryption keys are identical.

In an implementation, a first key management server and a second key management server maintain the same one or more secrets. The one or more secrets may be provided to the key management servers through configuration or shared via a secured communication mechanism. Since the same one or more secrets are used by the first key management server and the second key management server to create encryption keys, an encryption key request submitted to the first key management server or the second key management server produce the same encryption key. Having two or more key management servers maintaining the same one or more secrets are necessary in a load balanced or clustered configuration that is common in a high performance, scalable and reliable system.

To allow an encrypted document to be shared between two users in two different organizations, an encryption service module 604 or 705 or a managed application program 803 used by a user to decrypt the encrypted document needs a means to request an encryption key from a key management server that is capable of creating an encryption key to decrypt the encrypted document. When an encryption key is created based in part on one or more secrets maintained by a key management server, it is necessary to direct an encryption key request to a key management server that possesses the appropriate one or more secrets maintained by a key management server so that the key management server may create an encryption key to decrypt an encrypted document.

When a key management server receives an encryption key request, it handles the encryption key request if it is capable of handling the encryption key request. If the key management server is not capable of handling the encryption key request, it forwards the encryption key request to another key management server that is capable of handling the encryption key request. A key management server may forward an encryption key request through peer-to-peer communication, hierarchical routing, or any message delivery mechanism that delivers an encryption key request to a target key management server. A key management server may identify a target key management server using information in an encryption key request such as a key management server identifier, user identifier, organization identifier, group identifier, document identifier, or others. For example, a key management server may maintain or have access to information associating a user identifier to a key management server and use the user identifier in an encryption key request to lookup a key management server.

A peer-to-peer configuration comprises two or more key management servers. In a peer-to-peer configuration, two key management servers communicate with each other directly. A key management server only communicates with another key management server it trusts. A key management server maintains a directory of trusted key management servers it communicates with to facilitate routing of encryption key requests or securely exchanging secrets. Peer-to-peer configuration works best when the number of key management servers involved is small and static (i.e., change is infrequent).

In an example, a first key management server and a second key management server communicate with each other via peer-to-peer communication. The first key management server maintains a first one or more secrets and the second key management server maintains a second one or more secrets. The first and second one or more secrets are different.

When a user attempts to decrypt an encrypted document with an encryption service module, the encryption service module sends an encryption key request to the first key management server providing information necessary to obtain an encryption key to decrypt the encrypted document in the encryption key request. The first key management server examines the information necessary to obtain an encryption key to decrypt the encrypted document in the encryption key request and determines that the encryption key request may be handled by the second key management server. The first key management server forwards the encryption key request to the second key management server via peer-to-peer communication.

The second key management server creates an encryption key with the information necessary to obtain an encryption key to decrypt the encrypted document in the encryption key request and the second one or more secrets. The second key management server returns the encryption key to the first key management server. Upon receiving the encryption key from the second key management server, the first key management server returns the encryption key to the encryption service module. The encryption service module decrypts the encrypted document with the encryption key to produce decrypted content.

Figure 10:
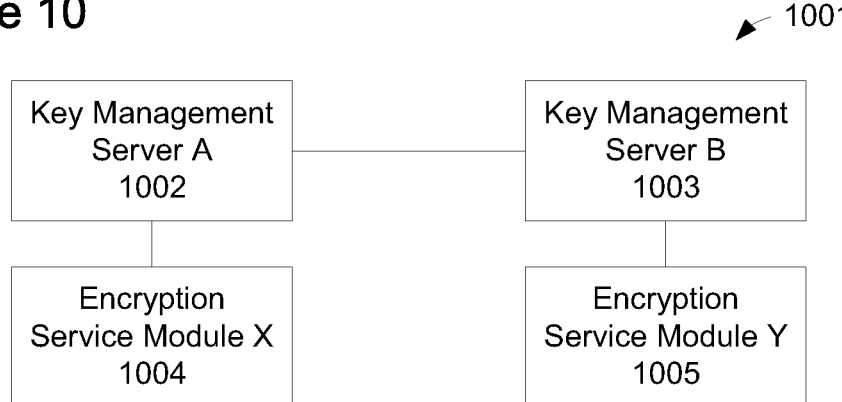
FIG. 10 shows a block diagram of two key management servers in peer-to-peer configuration.

FIG. 10 shows a block diagram 1001 of two key management servers in peer-to-peer configuration. Key Management Server A 1002 and Key Management Server B 1003 are configured to accepted encryption key requests from each other. Encryption Service Module X 1004 on a first computing device requests encryption keys from Key Management Server A, whereas Encryption Service Module Y 1005 on a second computing device requests encryption keys from Key Management Server B.

When Encryption Service Module X sends an encryption key request to Key Management Server A and the encryption key request needs to be handled by Key Management Server B, Key Management Server A forwards the encryption key request to Key Management Server B via peer-to-peer communication. Key Management Server B creates an encryption key and returns it to Key Management Server A. Upon receiving the encryption key from Key Management Server B, Key Management Server A returns the encryption key to Encryption Service Module X.

Similarly, when Encryption Service Module Y sends an encryption key request to Key Management Server B and the encryption key request needs to be handled by Key Management Server A, Key Management Server B forwards the encryption key request to Key Management Server A via peer-to-peer communication. Key Management Server A creates an encryption key and returns it to Key Management Server B. Upon receiving the encryption key from Key Management Server A, Key Management Server B returns the encryption key to Encryption Service Module Y.

Figure 11:
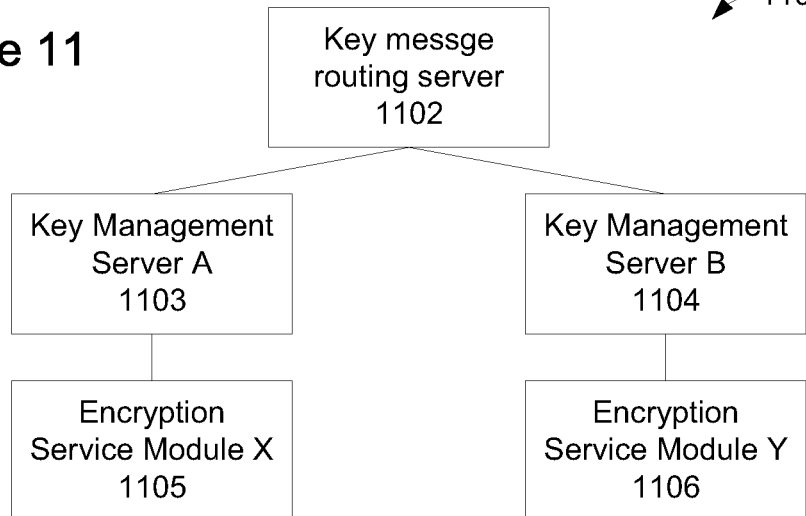
FIG. 11 shows a block diagram of a key message routing server and two key management servers in hierarchical configuration.

Hierarchical routing configuration centralize message routing in a key message routing server. In a hierarchical configuration, a key management server communicates with a key message routing server. Communication between two key management servers is routed through the key message routing server. A key message routing server facilitate message exchange between two or more key management servers. More importantly, by allowing an encryption key request sent to a first key management server to be handled by a second key management server, a key message routing server enables sharing of encrypted documents between two users in different organizations or groups. Key message routing server and key management servers are typically organized hierarchically as shown in FIG. 11.

A key management server forwards an encryption key request to a key message routing server when the key management server is not able to handle an encryption key request or an encryption key request is not addressed to (or intended for) the key management server. A key message routing server identifies a target key management server using information in an encryption key request such as a key management server identifier, user identifier, organization identifier, group identifier, document identifier, or others. For example, a key message routing server may maintain or have access to mapping of user identifiers to key management servers and use the user identifier in an encryption key request to lookup a key management server.

A key message routing server accepts only encryption key requests form a key management server it trusts and a key message routing server maintains a directory of trusted key management servers it may communicate with to facilitate routing of encryption key requests. Hierarchical routing configuration works well even if the number of key management servers involved is large and dynamic (i.e., frequent key management servers joining and leaving). Nextlabs SkyDRM™ is an example implementation of a key message routing server that supports sharing of encrypted documents across organizations.

In an example, a first key management server and a second key management server are capable of communicating with each other through a key message routing server. The first key management server maintains a first one or more secrets and the second key management server maintains a second one or more secrets. The first and second one or more secrets are different.

When a user attempts to decrypt an encrypted document with an encryption service module, the encryption service module sends an encryption key request to the first key management server providing information necessary to obtain an encryption key to decrypt an encrypted document in the encryption key request. The first key management server examines the information necessary to obtain an encryption key to decrypt the encrypted document in the encryption key request and determines that the encryption key request may be handled by the second key management server. The first key management server forwards the encryption key request to the key message routing server. The key message routing server examines (or inspects) the encryption key request and forwards the encryption key request to the second key management server.

The second key management server creates an encryption key with the information necessary to obtain an encryption key to decrypt the encrypted document in the encryption key request and the second one or more secrets maintained by the second key management server. The second key management server returns the encryption key to the key message routing server. The key message routing server returns the encryption key to the first key management server. Upon receiving the encryption key from the key message routing server, the first key management server returns the encryption key to the encryption service module. The encryption service module decrypts the encrypted document with the encryption key to produce unencrypted content.

FIG. 11 shows a block diagram 1101 of a key message routing server 1102 and two key management servers in hierarchical configuration. The key message routing server routes encryption key requests between Key Management Server A 1103 and Key Management Server B 1104. Key Management Server A and Key Management Server B are configured to accepted encryption key requests from the key message routing server. Encryption Service Module X 1105 on a first computing device requests encryption keys from Key Management Server A, whereas Encryption Service Module Y 1106 on a second computing device requests encryption keys from Key Management Server B.

When Key Management Server A receives an encryption key request from Encryption Service Module X not addressed to (or intend for) Key Management Server A, Key Management Server A forwards the encryption key request to the key message routing server. The key message routing server examines (or inspects) the encryption key request and identifies the encryption key request is addressed to Key Management Server B. The key message routing server forwards the encryption key request to Key Management Server B.

Key Management Server B creates an encryption key and returns it to the key message routing server. The key message routing server returns the encryption key to Key Management Server A. Upon receiving the encryption key from the key message routing server, Key Management Server A returns the encryption key to Encryption Service Module X.

Similarly, when Key Management Server B receives an encryption key request from Encryption Service Module Y not addressed to (or intend for) Key Management Server B, Key Management Server B forwards the encryption key request to the key message routing server. The key message routing server examines (or inspects) the encryption key request and identifies the encryption key request is addressed to Key Management Server A. The key message routing server forwards the encryption key request to Key Management Server A.

Key Management Server A creates an encryption key and returns it to the key message routing server. The key message routing server returns the encryption key to Key Management Server B. Upon receiving the encryption key from the key message routing server, Key Management Server B returns the encryption key to Encryption Service Module Y.

More complex encryption key request routing may be implemented according to the present invention. For example, a first key management server may communicate with a second key management server by forwarding an encryption key request through one or more key management servers and one or more key message routing servers. In an implementation, a first key message routing server and a second key message routing server communicate via peer-to-peer communication. In another implementation, three or more key message routing servers are organized hierarchically. In yet another implementation, two or more key management servers are organized hierarchically, where a parent key management server handles an encryption key request a child key management server is unable to handle.

In an example, an encryption service module 604 or 705 on a computing device requests an encryption key from a key management server 606 or 706 to encrypt a document where the encryption key is applied to encrypt a content encryption key. A user saves a document "c:\financials\2016q3 financial report.docx" opened in an application program Microsoft Word® on a laptop computer. The laptop computer has an encryption service module installed. The encryption service module uses two encryption keys to encrypt a document—a key encryption key and a content encryption key. A key encryption key is requested from the key management server and a content encryption key is created by the encryption service module. A key encryption key is applied to encrypt the content encryption key, whereas a content encryption key is applied to encrypt the document.

When the encryption service module detects a file save operation in the application program, it checks if a key encryption key is available on the computing device (e.g., in a cache). If a key encryption key is not available, the encryption service module requests a key encryption key from the key management server. The encryption service module creates a content encryption key and encrypts the document with the content encryption key to produce encrypted content. The encryption service module encrypts the content encryption key with a key encryption key to produce an encrypted content encryption key. The encryption service module stores a document identifier, a user identifier, the encrypted content encryption key, the encrypted content, optionally one or more seed tokens and optionally other information of the document in an encrypted document.

In an implementation, the encryption service module sends a user identifier to the key management server when it requests an encryption key. The key management server creates a document identifier and an encryption key and returns them to the encryption service module.

In an implementation, the encryption service module creates a document identifier and sends the document identifier and a user identifier to the key management server when it requests an encryption key. The key management server creates an encryption key and returns it to the encryption service module.

In an implementation, the encryption service module creates a document identifier and a content encryption key, and sends the document identifier, the content encryption key and a user identifier to the key management server when it requests an encryption key. The key management server creates an encryption key and encrypts the content encryption key with the encryption key to produce an encrypted content encryption key. The key management server returns the encrypted content encryption key to the encryption service module.

Figure 12:
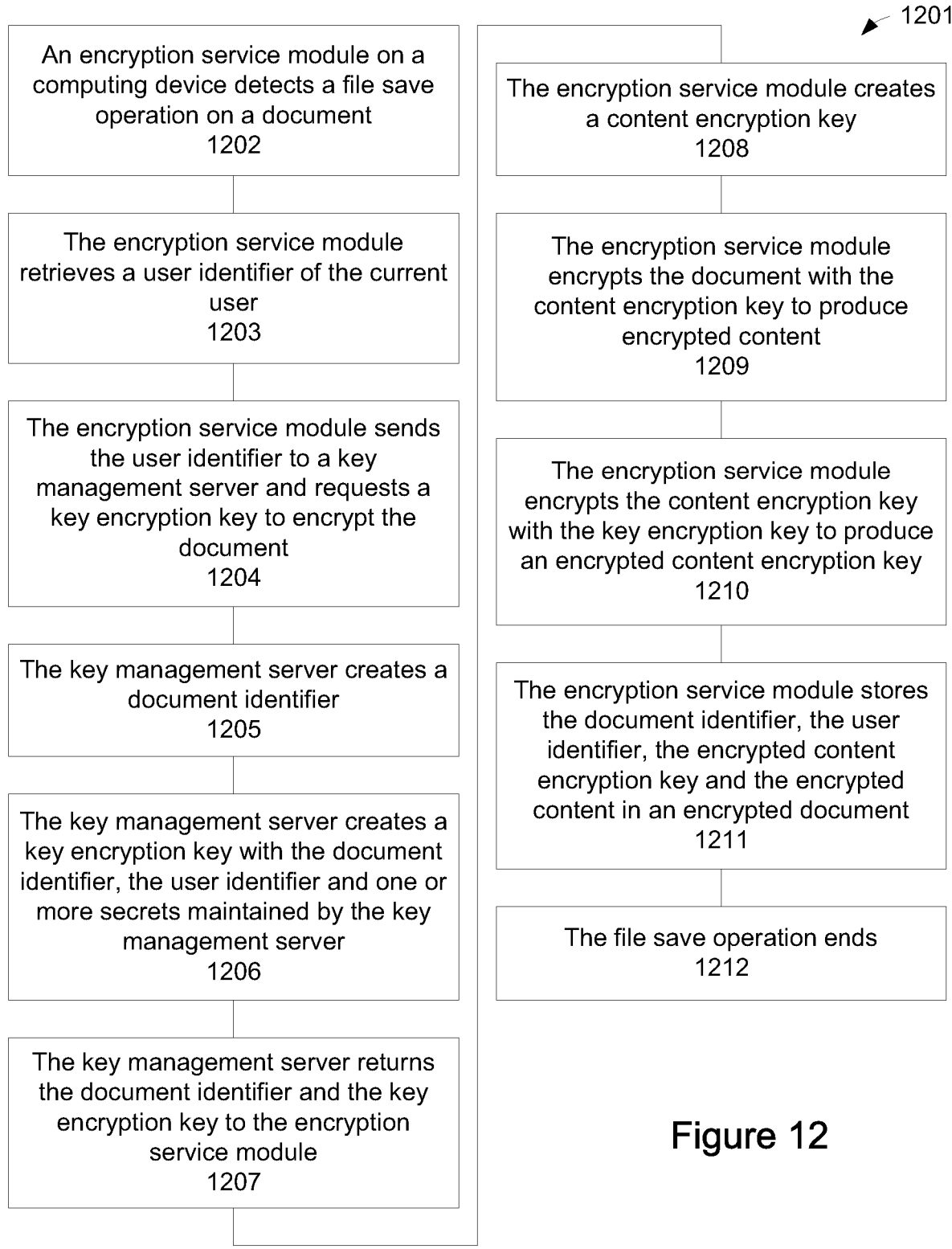
FIG. 12 shows a flow diagram of an encryption service module obtaining an encryption key from a key management server to encrypt a content encryption key in a file save operation.

Referring to FIG. 12, a flow diagram 1201 shows an encryption service module obtains a key encryption key from a key management server to encrypt a content encryption key in a file save operation. In step 1202, the encryption service module on a computing device detects a file save operation on a document. The encryption service module checks if a key encryption key is available on the computing device. If a key encryption key is available, encryption is carried out with the key encryption key and steps 1203 to 1207 will not occur.

In step 1203, the encryption service module retrieves a user identifier of the current user. In step 1204, the encryption service module sends the user identifier to the key management server and requests a key encryption key to encrypt the document.

In step 1205, the key management server receives the request from the encryption service module and creates a document identifier. The document identifier is a UUID. In step 1206, the key management server creates a key encryption key with the document identifier, the user identifier and one or more secrets maintained by the key management server. The key encryption key is created using one or more cryptographic techniques. The key encryption key is a symmetric key. In step 1207, the key management server returns the document identifier and the key encryption key to the encryption service module.

In step 1208, the encryption service module creates a content encryption key. The content encryption key is a symmetric key. In step 1209, the encryption service module encrypts the document with the content encryption key to produce encrypted content. In step 1210, the encryption service module encrypts the content encryption key with the key encryption key to produce an encrypted content encryption key. In step 1211, the encryption service module stores the document identifier, the user identifier, the encrypted content encryption key, the encrypted content, optionally one or more seed tokens and optionally other information of the document in an encrypted document 501. The one or more seed tokens may be obtained from the key management server or stored in the encryption service module.

In step 1212, the file save operation ends. An encrypted document "c:\financials\2016q3 financial report.nxl" is created successfully.

Alternatively, FIG. 12 may be modified such that the document identifier is created by the encryption service module instead of the key management server. In a modified FIG. 12, steps 1202 and 1206 to 1212 are unchanged. Steps 1203 to 1205 are replaced with the following modified steps. In modified step 1203, the encryption service module retrieves a user identifier of the current user and creates a document identifier. The document identifier is a UUID. In modified step 1204, the encryption service module sends the user identifier and the document identifier to the key management server and requests a key encryption key to encrypt the document. In modified step 1205, the key management server receives the request from the encryption service module. The request includes the user identifier and the document identifier.

In an example, an encryption service module 604 or 705 on a computing device requests an encryption key from a key management server 606 or 706 to decrypt an encrypted document 501 where the encryption key is applied to decrypt an encrypted content encryption key 506. This example is a continuation to the encryption example of FIG. 12 described above. A user opens an encrypted document "c:\financials\2016q3 financial report.nxl" in an application program Microsoft Word® on a laptop computer. The laptop computer has an encryption service module installed. The encrypted document is encrypted using two encryption keys—a key encryption key and a content encryption key.

When the encryption service module detects a file open operation on an encrypted document in the application program, it retrieves a document identifier, a user identifier, optionally one or more seed tokens and optionally other information from the encrypted document. The encryption service module checks if a key encryption key associated with the document identifier and the user identifier is available on the computing device (e.g., in a cache). If a key encryption key is not available, the encryption service module requests a key encryption key from a key management server. The encryption service module sends the document identifier, the user identifier, optionally the one or more seed tokens and optionally the other information to the key management server. The key management server creates a key encryption key and returns it to the encryption service module.

The encryption service module decrypts an encrypted content encryption key in the encrypted document with the key encryption key to produce a content encryption key. The encryption service module decrypts encrypted content in the encrypted document with the content encryption key to produce unencrypted content.

Referring to FIG. 13, a flow diagram 1301 shows an encryption service module obtains a key encryption key from a key management server to decrypt an encrypted content encryption key in a file open operation. In step 1302, an encryption service module on a computing device detects a file open operation on an encrypted document. In step 1303, the encryption service module retrieves a document identifier, a user identifier, optionally one or more seed tokens and optionally other information from the encrypted document. The encryption service module checks if a key encryption key associated with the document identifier and the user identifier is available on the computing device. If a key encryption key is available, decryption is carried out with the key encryption key and steps 1304 to 1306 will not occur.

In step 1304, the encryption service module sends the document identifier, the user identifier, optionally the one or more seed tokens and optionally the other information to the key management server and requests a key encryption key to decrypt the encrypted document.

In step 1305, the key management server receives the requests and creates a key encryption key with the document identifier, the user identifier, optionally the one or more seed tokens, optionally the other information and one or more secrets maintained by the key management server. The key encryption key is created using one or more cryptographic techniques. The key encryption key is a symmetric key. In step 1306, the key management server returns the key encryption key to the encryption service module.

In step 1307, the encryption service module decrypts an encrypted content encryption key in the encrypted document with the key encryption key to produce a content encryption key. In step 1308, the encryption service module decrypts encrypted content in the encrypted document with the content encryption key to produce unencrypted content.

In step 1309, the file open operation ends. The application program is able to access the unencrypted content.

In an example, an encryption service module 604 or 705 on a computing device requests an encryption key from a key management server 606 or 706 to encrypt a document where the encryption key is applied to encrypt the document (i.e., content of the document). A user saves a document "c:\financials\2016q3 financial report.docx" opened in an application program Microsoft Word® on a laptop computer. The laptop computer has an encryption service module installed. The encryption service module uses one encryption key to encrypt the document.

When the encryption service module detects a file save operation in the application program, it checks if an encryption key is available on the computing device (e.g., in a cache). If an encryption key is not available, the encryption service module requests an encryption key from the key management server. The encryption service module encrypts the document with the encryption key to produce encrypted content. The encryption service module stores a document identifier, a user identifier, the encrypted content, optionally one or more seed tokens and optionally other information related to the document in an encrypted document.

In an implementation, the encryption service module sends a user identifier to the key management server when it requests an encryption key. The key management server creates a document identifier and an encryption key and returns them to the encryption service module.

In an implementation, the encryption service module creates a document identifier and sends the document identifier and a user identifier to the key management server when it requests an encryption key. The key management server creates an encryption key and returns it to the encryption service module.

Figure 14:
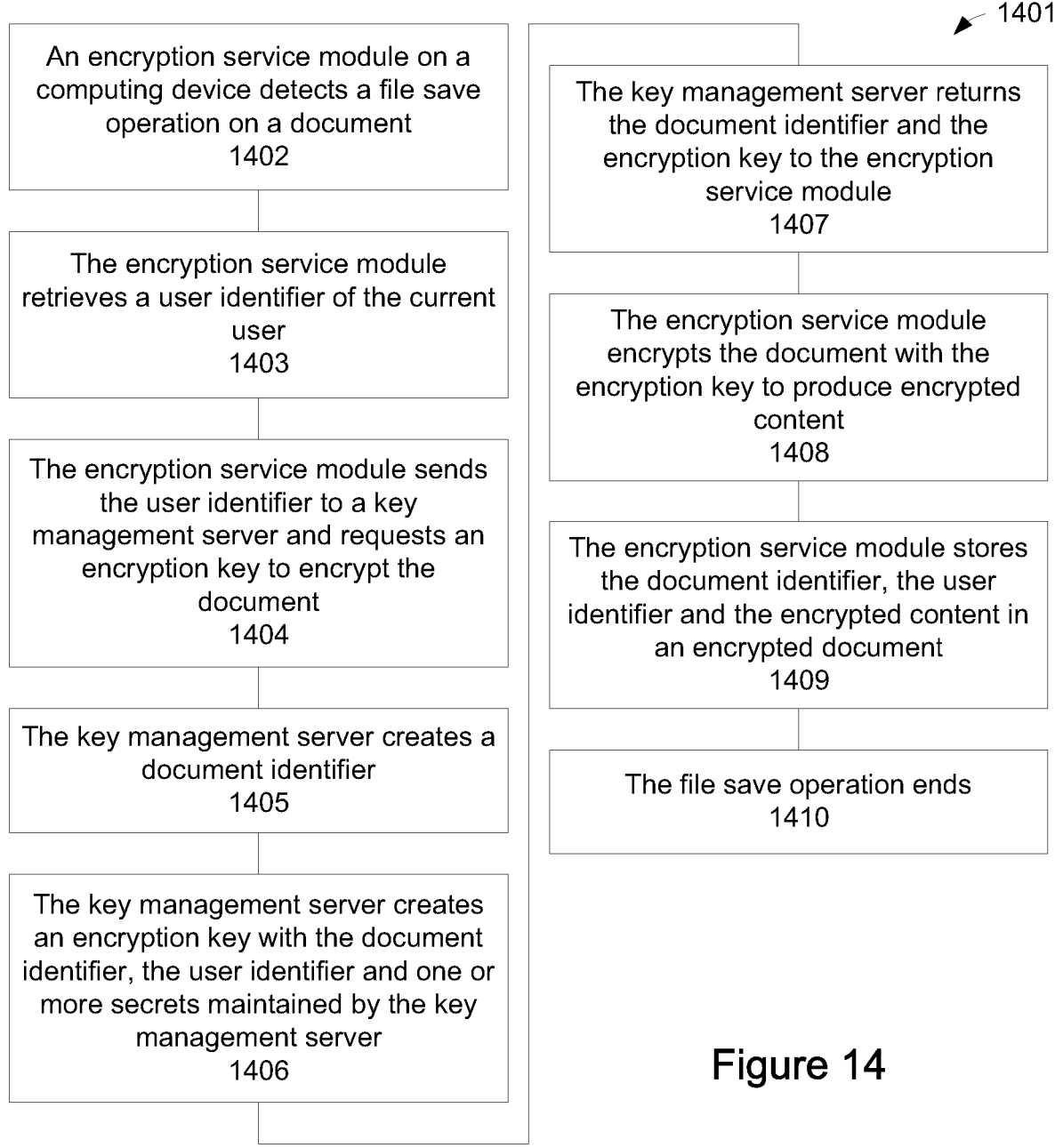
FIG. 14 shows a flow diagram of an encryption service module obtaining an encryption key from a key management server to encrypt a document in a file save operation.

Referring to FIG. 14, a flow diagram 1401 shows an encryption service module obtains an encryption key from a key management server to encrypt a document in a file save operation. In step 1402, the encryption service module on a computing device detects a file save operation on a document. The encryption service module checks if an encryption key is available on the computing device. If an encryption key is available, encryption is carried out with the encryption key and steps 1403 to 1407 will not occur.

In step 1403, the encryption service module retrieves a user identifier of the current user. In step 1404, the encryption service module sends the user identifier to the key management server and requests an encryption key to encrypt the document.

In step 1405, the key management server receives the request from the encryption service module and creates a document identifier. The document identifier is a UUID. In step 1406, the key management server creates an encryption key with the document identifier, the user identifier and one or more secrets maintained by the key management server. The encryption key is created using one or more cryptographic techniques. The encryption key is a symmetric key. In step 1407, the key management server returns the document identifier and the encryption key to the encryption service module.

In step 1408, the encryption service module encrypts the document with the encryption key to produce encrypted content. In step 1409, the encryption service module stores the document identifier, the user identifier, the encrypted content, optionally one or more seed tokens and optionally other information of the document in an encrypted document 401. The one or more seed tokens may be obtained from the key management server or stored in the encryption service module.

In step 1410, the file save operation ends. An encrypted document "c:\financials\2016q3 financial report.nxl" is created successfully.

Alternatively, FIG. 14 may be modified such that the document identifier is created by the encryption service module instead of the key management server. In a modified FIG. 14, steps 1402 and 1406 to 1410 are unchanged. Steps 1403 to 1405 are replaced with the following modified steps. In modified step 1403, the encryption service module retrieves a user identifier of the current user and creates a document identifier. The document identifier is a UUID. In modified step 1404, the encryption service module sends the user identifier and the document identifier to the key management server and requests an encryption key to encrypt the document. In modified step 1405, the key management server receives the request from the encryption service module. The request includes the user identifier and the document identifier.

In an example, an encryption service module 604 or 705 on a computing device requests an encryption key from a key management server 606 or 706 to decrypt an encrypted document 401 where the encryption key is applied to decrypt encrypted content 406. This example is a continuation to the encryption example of FIG. 14 described above. A user opens an encrypted document "c:\financials\2016q3 financial report.nxl" in an application program Microsoft Word® on a laptop computer. The laptop computer has an encryption service module installed. The encrypted document is encrypted using one encryption key.

When the encryption service module detects a file open operation on an encrypted document in the application program, it retrieves a document identifier, a user identifier, optionally one or more seed tokens and optionally other information from the encrypted document. The encryption service module checks if an encryption key associated with the document identifier and the user identifier is available on the computing device (e.g., in a cache). If an encryption key is not available, the encryption service module requests an encryption key from the key management server. The encryption service module sends the document identifier, the user identifier, optionally the one or more seed tokens and optionally the other information to the key management server. The key management server creates an encryption key and returns it to the encryption service module.

The encryption service module decrypts encrypted content in the encrypted document with the encryption key to produce unencrypted content.

Referring to FIG. 15, a flow diagram 1501 shows an encryption service module obtains an encryption key from a key management server to decrypt encrypted content in a file open operation. In step 1502, an encryption service module on a computing device detects a file open operation on an encrypted document. In step 1503, the encryption service module retrieves a document identifier, a user identifier, optionally one or more seed tokens and optionally other information from the encrypted document. The encryption service module checks if an encryption key associated with the document identifier and the user identifier is available on the computing device. If an encryption key is available, decryption is carried out with the encryption key and steps 1504 to 1506 will not occur.

In step 1504, the encryption service module sends the document identifier, the user identifier, optionally the one or more seed tokens and optionally the other information to the key management server and requests an encryption key to decrypt the encrypted content.

In step 1505, the key management server receives the request and creates an encryption key with the document identifier, the user identifier, optionally the one or more seed tokens, optionally the other information and one or more secrets maintained by the key management server. The encryption key is created using one or more cryptographic techniques. The encryption key is a symmetric key. In step 1506, the key management server returns the encryption key to the encryption service module.

In step 1507, the encryption service module decrypts encrypted content in the encrypted document with the encryption key to produce unencrypted content.

In step 1509, the file open operation ends. The application program is able to access the unencrypted content.

In an embodiment, an encryption key is created by a key management server or an encryption service module to encrypt a document or decrypt an encrypted document. By allowing an encryption service module to create an encryption key, the present invention allows encryption and decryption to be available while a computing device is not connected to a key management server (e.g., when a laptop computer is offline).

In an example, a first user on a first computing device encrypts a first document with a first encryption key created locally by a first encryption service module 604 or 705 running on the first computing device to produce an encrypted document. Sometime after the encrypted document is produced, a second user on a second computing device having access to the encrypted document decrypts the encrypted document with a second encryption key created by a key management server 606, 706 or 805 and a second encryption service module 604 or 705 running on the second computing device to produce a second document. The first and second encryption keys are identical. The first and second documents are identical.

Figures 16A, 16B:
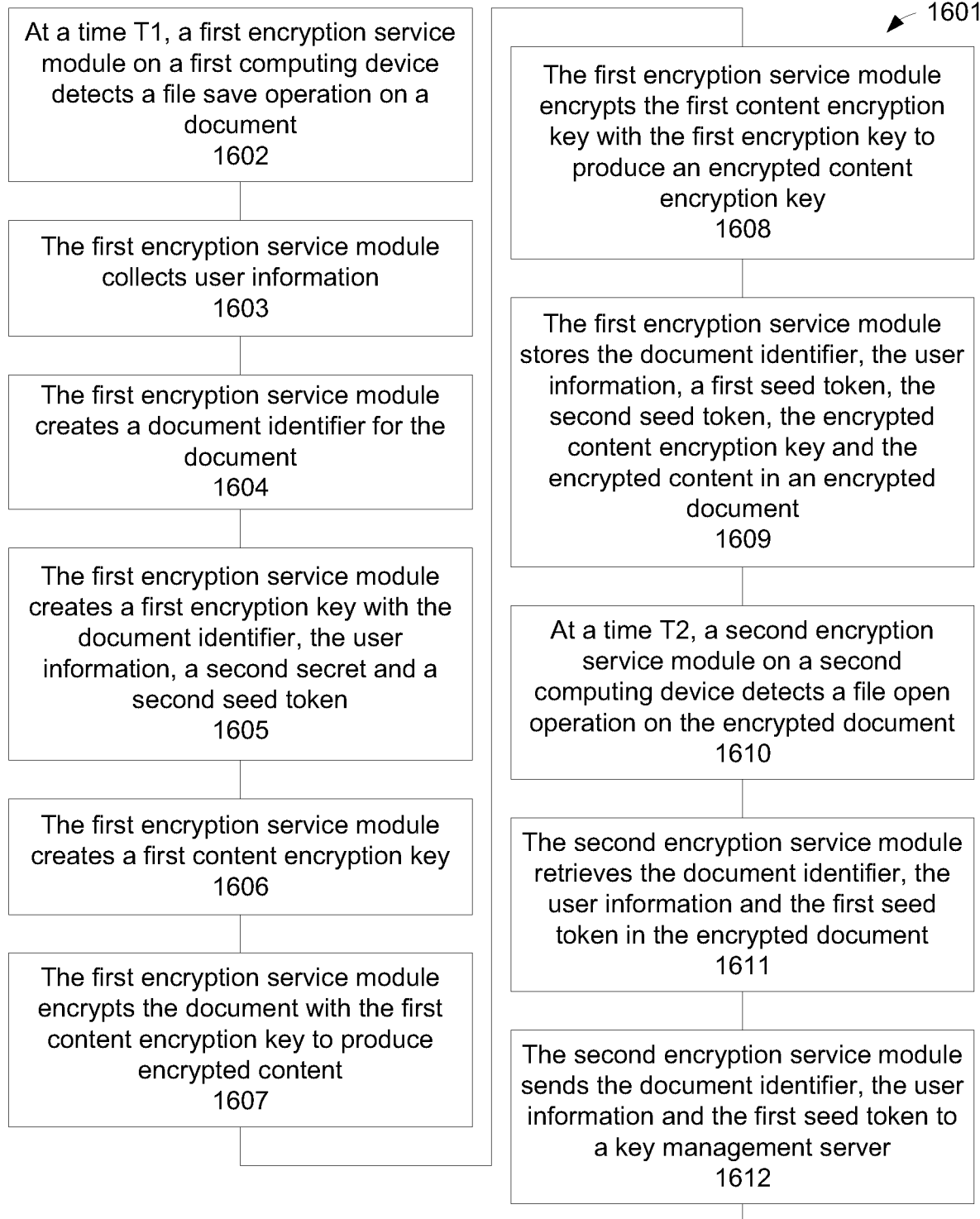
FIGS. 16A-16B show a flow diagram of a first encryption service module encrypting a document with a first encryption key created locally and a second encryption service module decrypting the encrypted document with a second encryption key obtained from a key management server.
Figure 16B:
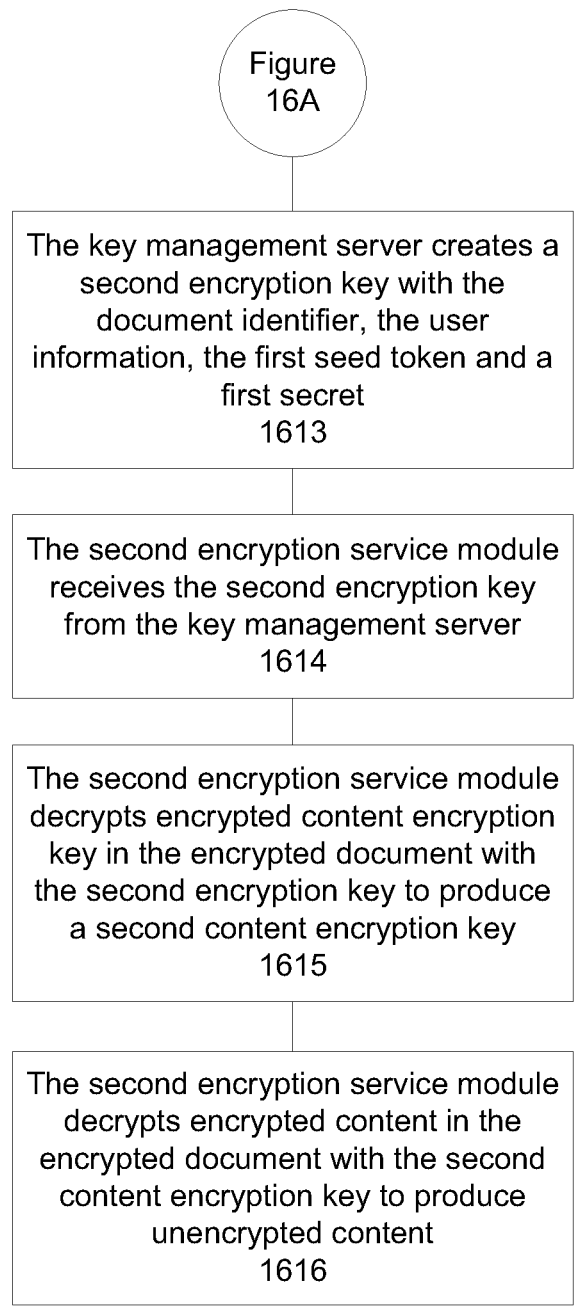

Referring to FIGS. 16A-16B, a flow diagram 1601 shows a first encryption service module encrypts a document with a first encryption key created locally and a second encryption service module decrypts the encrypted document with a second encryption key obtained from a key management server. The key management server maintains a first secret and a first seed token. The first encryption service module is running on a first computing device and the first encryption service module maintains a second secret and a second seed token. In an implementation where a seed token is not applied to create an encryption key, the key management server may maintain a first secret but not a first seed token. The encryption service module may maintain a second secret but not a second seed token.

In step 1602, at a time T1, the first encryption service module on a first computing device detects a file save operation on the document. In step 1603, the first encryption service module collects user information. The user information comprises at least a user identifier. In step 1604, the first encryption service module creates a document identifier for the document. In step 1605, the first encryption service module creates a first encryption key with the document identifier, the user information, optionally the second seed token, optionally other key creation factors and the second secret. In step 1606, the first encryption service module creates a first content encryption key.

In step 1607, the first encryption service module encrypts the document with the first content encryption key to produce encrypted content. In step 1608, the first encryption service module encrypts the first content encryption key with the first encryption key to produce an encrypted content encryption key. In step 1609, the first encryption service module stores the document identifier, the user information, optionally the first seed token, optionally the second seed token, optionally the other key creation factors, the encrypted content encryption key and the encrypted content in an encrypted document.

In step 1610, at a time T2, a second encryption service module on a second computing device detects a file open operation on the encrypted document. T2 happens sometime after the encrypted document is created (or produced). In step 1611, the second encryption service module retrieves the document identifier, the user information, optionally the first seed token and optionally the other key creation factors in the encrypted document. In step 1612, the second encryption service module sends the document identifier, the user information, optionally the first seed token and optionally the other key creation factors to the key management server.

In step 1613, the key management server creates a second encryption key with the document identifier, the user information, optionally the first seed token, optionally the other key creation factors and the first secret.

In step 1614, the second encryption service module receives the second encryption key from the key management server. In step 1615, the second encryption service module decrypts encrypted content encryption key in the encrypted document with the second encryption key to produce a second content encryption key. In step 1616, the second encryption service module decrypts encrypted content in the encrypted document with the second content encryption key to produce unencrypted content.

In an example, if the first user and the second user are the same and the second encryption service module maintains the second secret and optionally the second seed token, the second encryption service module may create the second encryption key locally without sending an encryption key request to the key management server.

In an example, a user on a computing device encrypts a first document with a first encryption key created locally by an encryption service module 605 or 704 to produce an encrypted document. Sometime after the creation of the encrypted document, the user opens the encrypted document. The encryption service module decrypts the encrypted document with a second encryption key created locally by the encryption service module to produce a second document. The first and second encryption keys are identical. The first and second documents are identical. The encryption service module does not store the first encryption key for decryption purpose. The second encryption key is created to decrypt the encrypted document and it does not exist before the encrypted document is created.

Figure 17A:
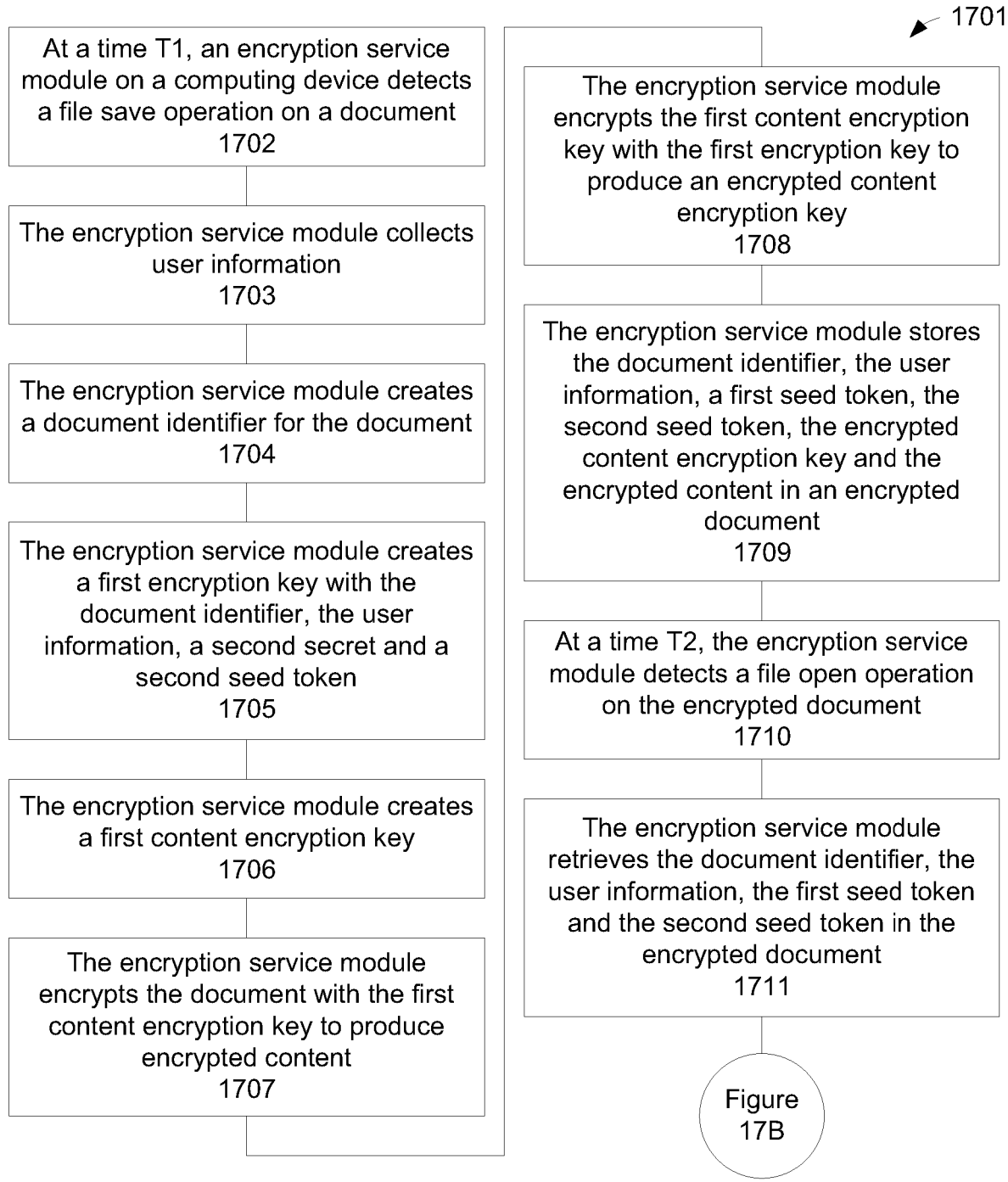
FIGS. 17A-17B show a flow diagram of an encryption service module encrypting a document with a first encryption key created locally and decrypting the encrypted document with a second encryption key created locally.
Figure 17B:
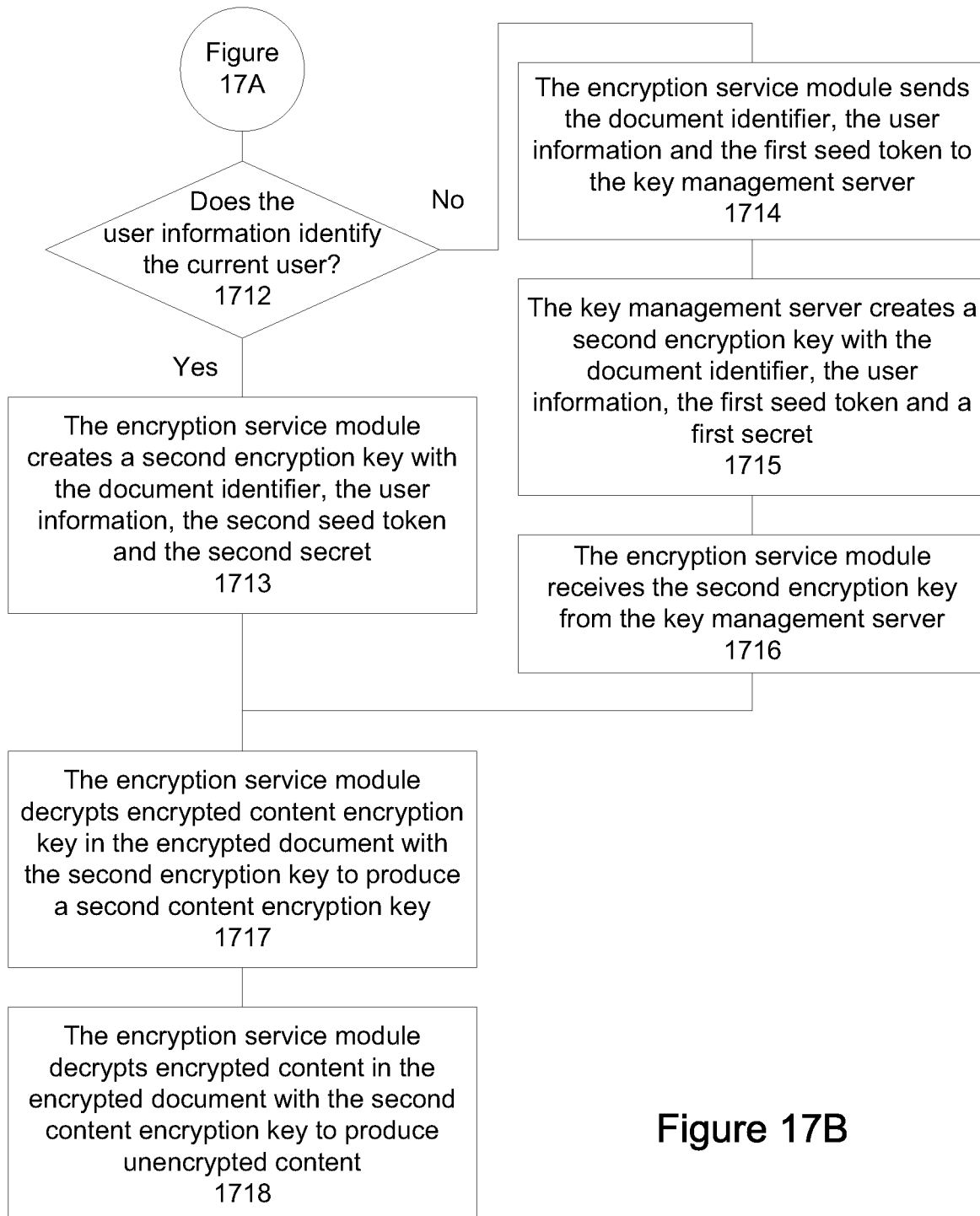

Referring to FIGS. 17A-17B, a flow diagram 1701 shows an encryption service module encrypts a document with a first encryption key created locally and decrypts the encrypted document with a second encryption key also created locally. The encryption service module is running on a computing device and the encryption service module maintains a secret and a seed token.

In step 1702, at a time T1, an encryption service module on a computing device detects a file save operation on a document. In step 1703, the encryption service module collects user information. The user information comprises at least a user identifier. In step 1704, the encryption service module creates a document identifier for the document. In step 1705, the encryption service module creates a first encryption key with the document identifier, the user information, a second seed token, optionally other key creation factors and a second secret. In step 1706, the encryption service module creates a first content encryption key. The first content encryption key is a symmetric key.

In step 1707, the encryption service module encrypts the document with the first content encryption key to produce encrypted content. In step 1708, the encryption service module encrypts the first content encryption key with the first encryption key to produce an encrypted content encryption key. In step 1709, the encryption service module stores the document identifier, the user information, a first seed token, the second seed token, optionally the other key creation factors, the encrypted content encryption key and the encrypted content in an encrypted document.

In step 1710, at a time T2, the encryption service module detects a file open operation on the encrypted document. T2 happens sometime after the encrypted document is created. In step 1711, the encryption service module retrieves the document identifier, the user information, the first seed token, the second seed token and optionally the other key creation factors in the encrypted document. In step 1712, the encryption service module determines if the user information identifies the current user. If the user information identifies the current user, processing continues in step 1713. If the user information does not identify the current user, processing continues in step 1714.

In step 1713, the encryption service module creates a second encryption key with the document identifier, the user information, the second seed token, optionally the other key creation factors and the second secret. The second encryption key is created locally. Processing continues in step 1717.

In step 1714, the encryption service module sends the document identifier, the user information, the first seed token and optionally the other key creation factors to the key management server. In step 1715, the key management server creates a second encryption key with the document identifier, the user information, the first seed token, optionally the other key creation factors and a first secret. The first and second encryption keys are identical. In step 1716, the encryption service module receives the second encryption key from the key management server.

In step 1717, the encryption service module decrypts encrypted content encryption key in the encrypted document with the second encryption key to produce a second content encryption key. The first and second content encryption keys are identical. In step 1718, the encryption service module decrypts encrypted content in the encrypted document with the second content encryption key to produce unencrypted content.

In an example, a first user in an organization creates an encrypted document and shares the encrypted document with a second user in the organization. The first user encrypts a document with a first encryption service module and a first encryption key obtained from a key management server to produce the encrypted document. Sharing may be done via email (e.g., attaching an encrypted document to an email message), saving an encrypted document on a file server, uploading an encrypted document to a website, copying an encrypted document to a removable device, or more. When the second user attempts to decrypt the encrypted document with a second encryption service module, the second encryption service module requests a second encryption key from the key management server to decrypt the encrypted document. The key management server returns a second encryption key to the second encryption service module. The second encryption service module decrypts the encrypted document with the second encryption key to produce unencrypted content.

Figure 18:
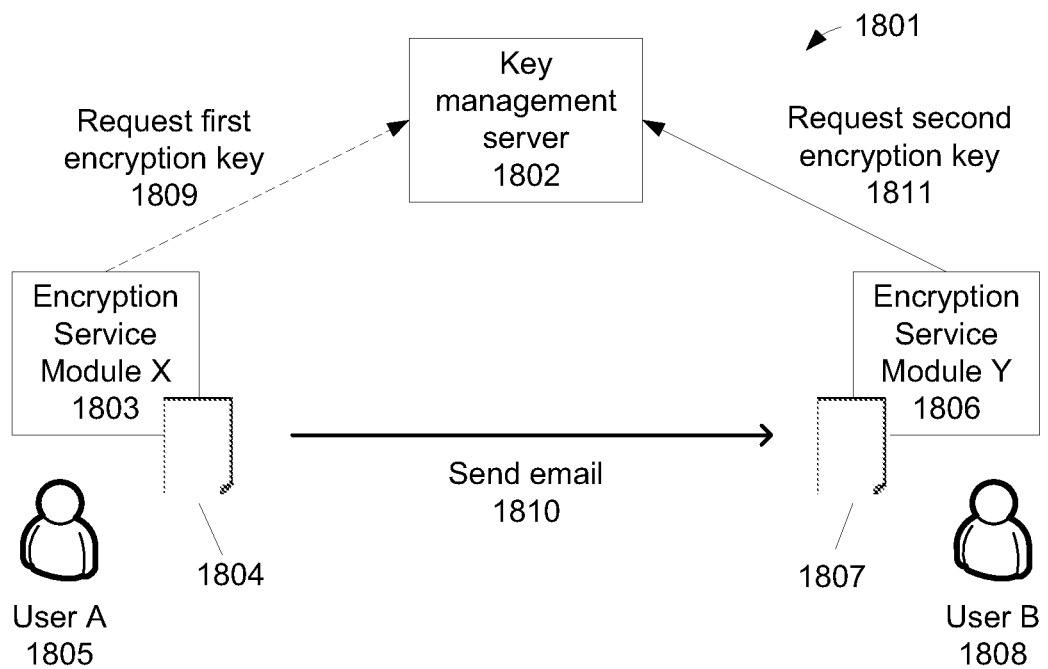
FIG. 18 shows a first user sending an encrypted document in an email message to a second user in the same organization and the second user attempting to decrypt the encrypted document.

Referring to FIG. 18, a first user User A 1805 in an organization sends an encrypted document in an email message to a second user User B 1808 in the organization and the second user attempts to decrypt the encrypted document. The organization has a key management server 1802, encryption service modules Encryption Service Module X 1803 and Encryption Service Module Y 1806. The encryption service modules request encryption keys from the key management server.

User A encrypts a confidential document with Encryption Service Module X to create an encrypted document 1804. To encrypt the confidential document, Encryption Service Module X requests a first encryption key from the key management server 1809. Encryption Service Module X provides a user identifier of User A and a document identifier of the confidential document in the first encryption key request.

The key management server receives the first encryption key requests and creates a first encryption key with the user identifier, the document identifier, optionally other key creation factors and one or more secrets maintained by the key management server. The key management server returns the first encryption key to Encryption Service Module X.

Encryption Service Module X encrypts the confidential document with the first encryption key to create the encrypted document.

User A sends the encrypted document to User B in an email message 1810.

User B receives the email message and attempts to open the encrypted document in an application program. A file open operation is detected by Encryption Service Module Y. To decrypt the encrypted document, Encryption Service Module Y requests a second encryption key from the key management server 1811. Encryption Service Module Y retrieves the document identifier, the user identifier and optionally the other key creation factors from the encrypted document. Encryption Service Module Y provides the document identifier, the user identifier and optionally the other key creation factors in the second encryption key request.

The key management server receives the second encryption key requests and creates a second encryption key with the user identifier, the document identifier, optionally the other key creation factors and the one or more secrets maintained by the key management server. The key management server returns the second encryption key to Encryption Service Module Y.

Encryption Service Module Y decrypts the encrypted document with the second encryption key to create unencrypted content. The unencrypted content is provided to the application program and User B is able to read the encrypted document.

Figure 19:
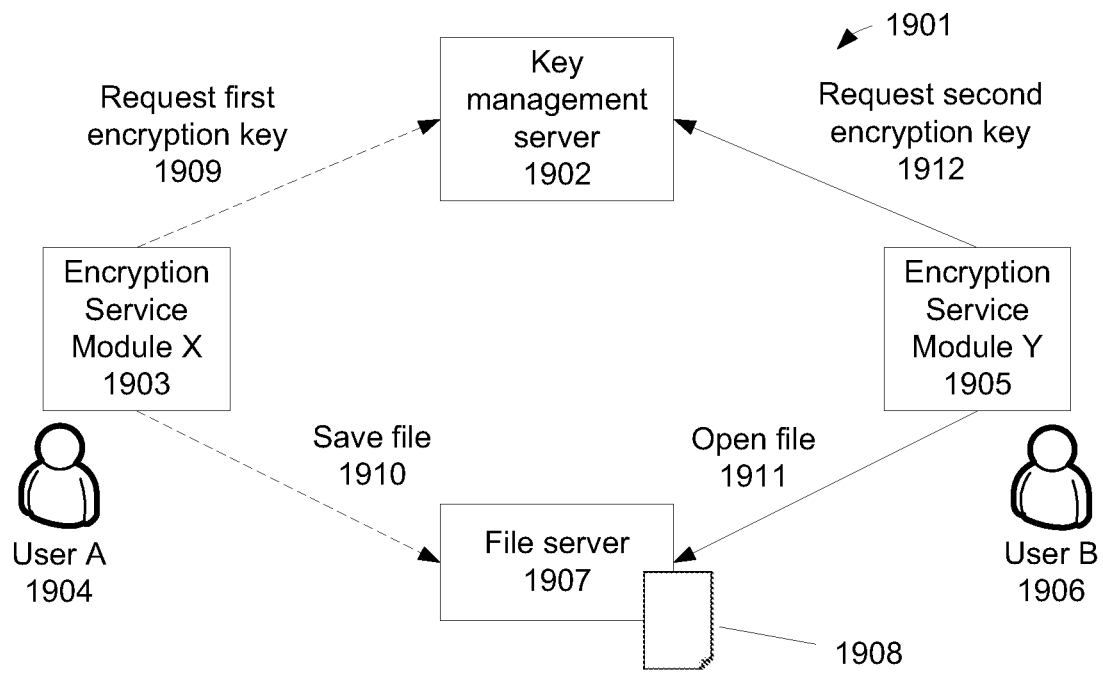
FIG. 19 shows a first user saving an encrypted document on a file server and a second user opening the encrypted document where the first user and the second user are in the same organization.

Referring to FIG. 19, a first user User A 1904 in an organization saves an encrypted document on a file server and a second user User B 1906 in the organization opens the encrypted document. The organization has a key management server 1902, a file server 1907, encryption service modules Encryption Service Module X 1903 and Encryption Service Module Y 1905. The encryption service modules request encryption keys from the key management server.

At a time T1, User A encrypts a confidential document with Encryption Service Module X to create an encrypted document 1908. To encrypt the confidential document, Encryption Service Module X requests a first encryption key from the key management server 1909. Encryption Service Module X provides a user identifier of User A and a document identifier of the confidential document in the first encryption key request.

The key management server receives the first encryption key requests and creates a first encryption key with the user identifier, the document identifier, optionally other key creation factors and one or more secrets maintained by the key management server. The key management server returns the first encryption key to Encryption Service Module X.

Encryption Service Module X encrypts the confidential document with the first encryption key to create the encrypted document. Encryption Service Module X saves the encrypted document on the file server 1910.

At a time T2, User B attempts to open the encrypted document in an application program. T2 happens sometime after the encrypted document is created. A file open operation is detected by Encryption Service Module Y. To decrypt the encrypted document, Encryption Service Module Y requests a second encryption key from the key management server 1912. Encryption Service Module Y retrieves the document identifier, the user identifier and optionally the other key creation factors from the encrypted document. Encryption Service Module Y provides the document identifier, the user identifier and optionally the other key creation factors in the second encryption key request.

The key management server receives the second encryption key requests and creates a second encryption key with the user identifier, the document identifier, optionally the other key creation factors and the one or more secrets maintained by the key management server. The key management server returns the second encryption key to Encryption Service Module Y.

Encryption Service Module Y decrypts the encrypted document with the second encryption key to create unencrypted content. The unencrypted content is provided to the application program and User B is able to read the encrypted document.

Figure 20:
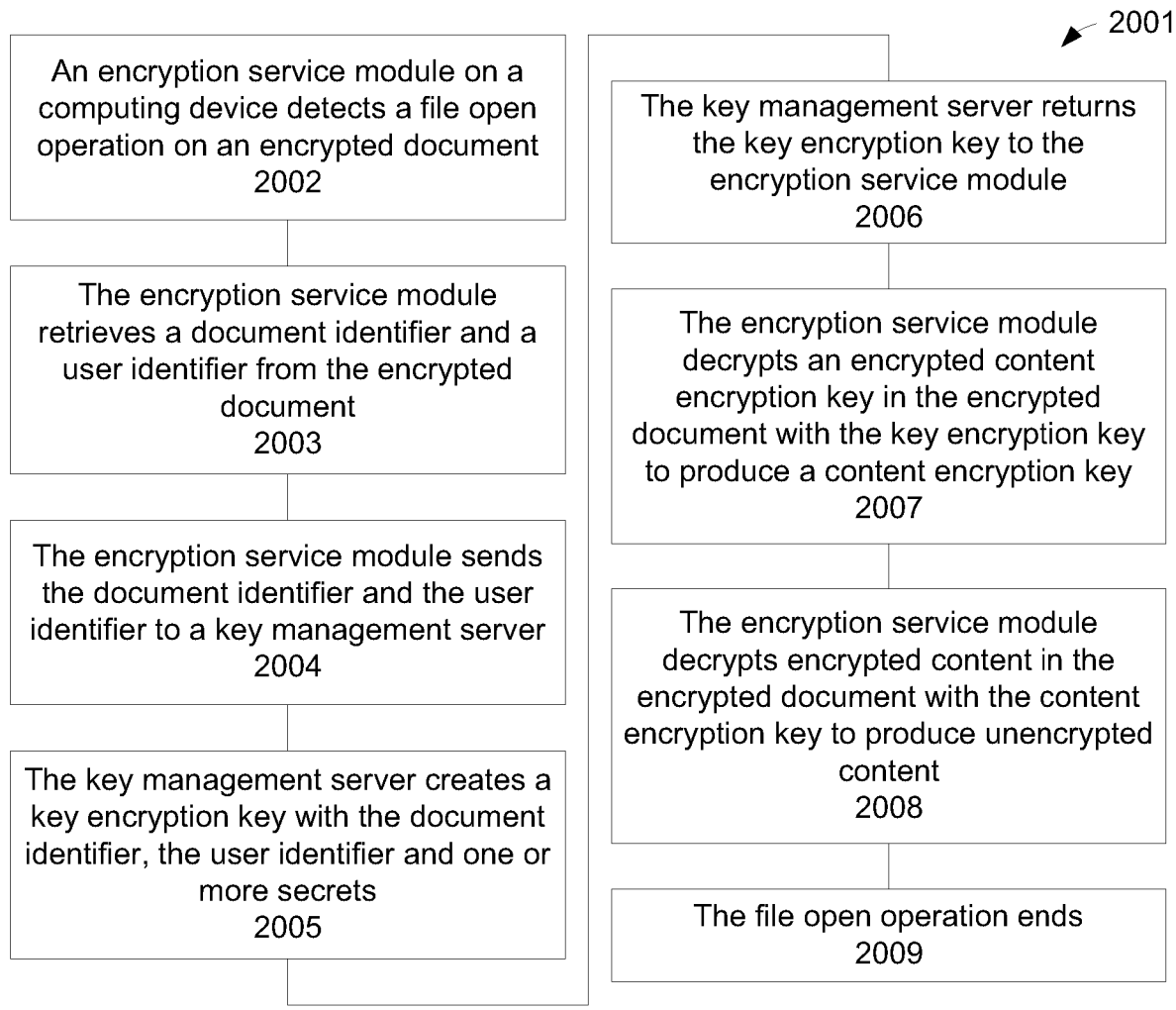
FIG. 20 shows a flow diagram of a second user decrypting an encrypted document created by a first user where the first user and the second user are in the same organization.

Referring to FIG. 20, a flow diagram 2001 shows a second user User B 1808 or 1906 decrypts an encrypted document created by a first user User A 1805 or 1904 where the first user and the second user are in the same organization. In step 2002, an encryption service module 1806 or 1905 on a computing device detects a file open operation on an encrypted document 1807 or 1908. In step 2003, the encryption service module retrieves a document identifier, a user identifier and optionally other key creation factors from the encrypted document. In step 2004, the encryption service module sends the document identifier, the user identifier and optionally the other key creation factors to a key management server 1802 or 1902 and requests a key encryption key to decrypt the encrypted document.

In step 2005, the key management server creates a key encryption key with the document identifier, the user identifier, optionally the other key creation factors and one or more secrets maintained by the key management server. In step 2006, the key management server returns the key encryption key to the encryption service module.

In step 2007, the encryption service module decrypts an encrypted content encryption key in the encrypted document with the key encryption key to produce a content encryption key. In step 2008, the encryption service module decrypts encrypted content in the encrypted document with the content encryption key to produce unencrypted content.

In step 2009, the file open operation ends.

In an example, two key management servers collaborate to handle an encryption key request using peer-to-peer communication. A first user in a first organization encrypts a document with a first encryption service module and a first encryption key obtained from a first key management server to produce an encrypted document. The first user shares the encrypted document with a second user in a second organization. Sharing may be done via email (e.g., attaching an encrypted document to an email message), uploading an encrypted document to a website, copying an encrypted document to a removable device, or more.

The second user attempts to decrypt the encrypted document with a second encryption service module. The second encryption service module requests a second encryption key from a second key management server to decrypt the encrypted document. The second key management server is not able to satisfy the second encryption key request; therefore, the second key management server forwards the second encryption key request to the first key management server via peer-to-peer communication. The first key management server returns a second encryption key to the second key management server. The second key management server returns the second encryption key to the second encryption service module. The second encryption service module decrypts the encrypted document with the second encryption key to produce unencrypted content.

Figure 21:
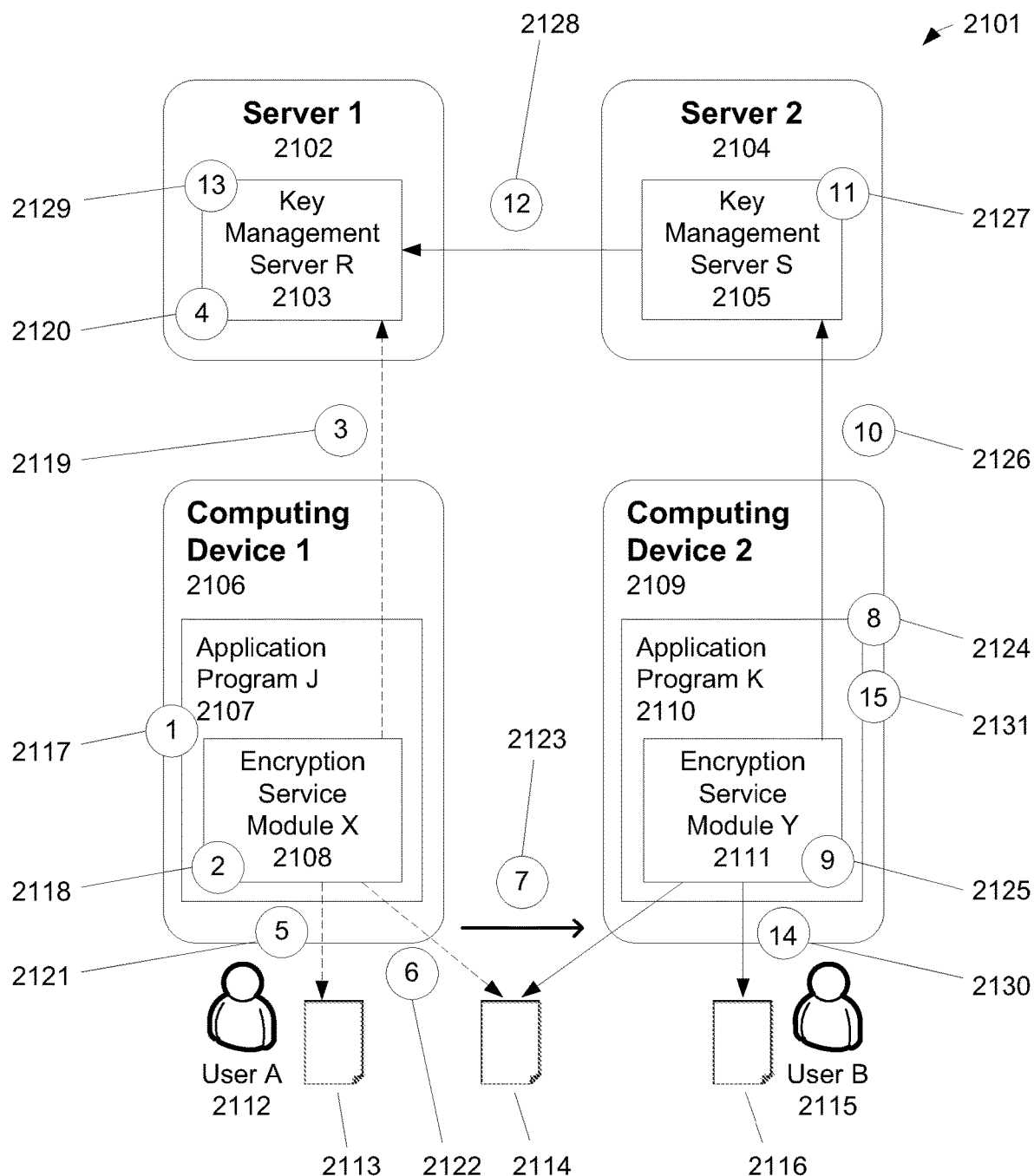
FIG. 21 shows an execution flow of encryption and decryption with encryption key requests routed between two key management servers in peer-to-peer configuration.

Referring to FIG. 21, an execution flow 2101 showing encryption and decryption with encryption key requests routed between two key management servers in peer-to-peer configuration. A first organization having a computing server Server 1 2102 and a computing device Computing Device 1 2106 and a second organization having a computing server Server 2 2104 and a computing device Computing Device 2 2109. Both organizations each having a key management server where Key Management Server R 2103 is running on Server 1 and Key Management Server S 2105 is running on Server 2. Key Management Server R and Key Management Server S are configured to communicate with each other using peer-to-peer communication. Computing Device 1 has an encryption service module Encryption Service Module X 2108 installed and Encryption Service Module X requests encryption keys from Key Management Server R. Computing Device 2 has an encryption service module Encryption Service Module Y 2111 installed and Encryption Service Module Y requests encryption keys from Key Management Server S. A user User A 2112 of the first organization has access to an application program Application Program J 2107 running on Computing Device 1, whereas a user User B 2115 has access to an application program Application Program K 2110 running on Computing Device 2.

In step (1) 2117, User A saves a document 2113 opened in Application Program J. In step (2) 2118, Encryption Service Module X detects a file save operation on Computing Device 1. Encryption Service Module X retrieves a user identifier of User A. In step (3) 2119, Encryption Service Module X sends a first encryption key request with the user identifier and optionally other key creation factors to Key Management Server R to request a first encryption key to encrypt the document.

In step (4) 2120, Key Management Server R receives the first encryption key request and creates a document identifier. The document identifier is a UUID. Key Management Server R creates a first encryption key with the document identifier, the user identifier, optionally the other key creation factors and one or more secrets maintained by Key Management Server R. The first encryption key is created with one or more cryptographic techniques. Key Management Server R returns the document identifier and the first encryption key to Encryption Service Module X.

In step (5) 2121, Encryption Service Module X creates a first content encryption key. The first content encryption key is a symmetric key. Encryption Service Module X encrypts the document with the first content encryption key to produce encrypted content. Encryption Service Module X encrypts the first content encryption key with the first encryption key to produce an encrypted content encryption key. In step (6) 2122, Encryption Service Module X stores the document identifier, the user identifier, optionally a key management server identifier identifying Key Management Server R, optionally the other key creation factors, the encrypted content encryption key and the encrypted content in an encrypted document 2114.

In step (7) 2123, User A attaches the encrypted document in an email message and sends the email message to User B.

In step (8) 2124, User B receives the email message and attempts to open the encrypted document attached to the email message with Application Program K.

In step (9) 2125, Encryption Service Module Y detects a file open operation on Computing Device 2. Encryption Service Module Y retrieves the document identifier, the user identifier, optionally the key management server identifier and optionally the other key creation factors from the encrypted document. In step (10) 2126, Encryption Service Module Y sends a second encryption key request with the document identifier, the user identifier, optionally the key management server identifier and optionally the other key creation factors to Key Management Server S to request a second encryption key to decrypt the encrypted document.

In step (11) 2127, Key Management Server S receives the second encryption key request and determines that it needs to be handled by Key Management Server R. In step (12) 2128, Key Management Server S forwards the second encryption key request to Key Management Server R.

In step (13) 2129, Key Management Server R creates a second encryption key with the document identifier, the user identifier, optionally the other key creation factors and the one or more secrets maintained by Key Management Server R. Key Management Server R returns the second encryption key to Key Management Server S. Key Management Server S returns the second encryption key to Encryption Service Module Y.

In step (14) 2130, Encryption Service Module Y decrypts the encrypted content encryption key in the encrypted document to produce a second content encryption key. Encryption Service Module Y decrypts the encrypted content in the encrypted document with the second content encryption key to produce unencrypted content 2116.

In step (15) 2131, Application Program K opens the encrypted document successfully. Application Program K has access to the unencrypted content.

Figure 22A:
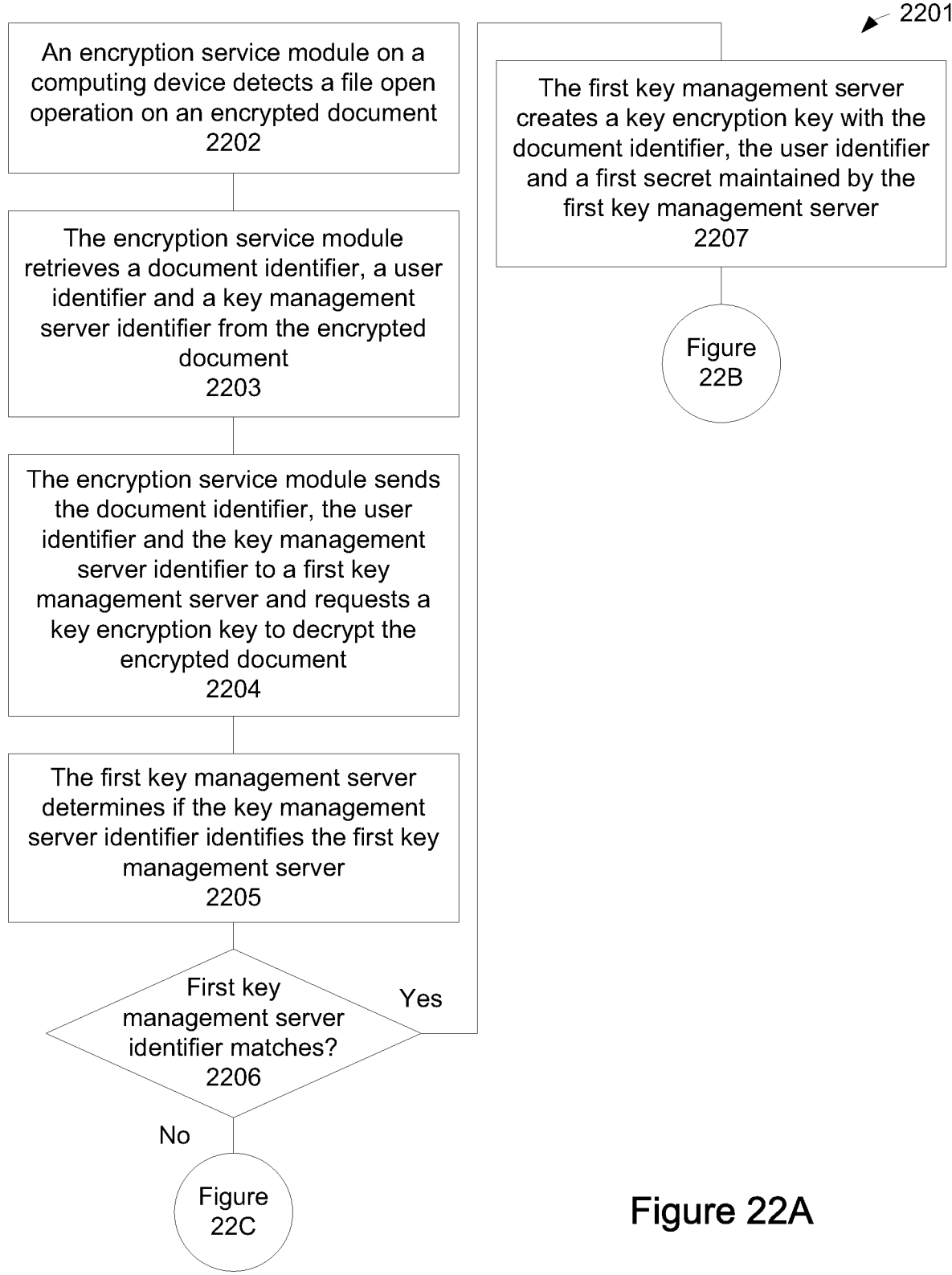
Figure 22B:
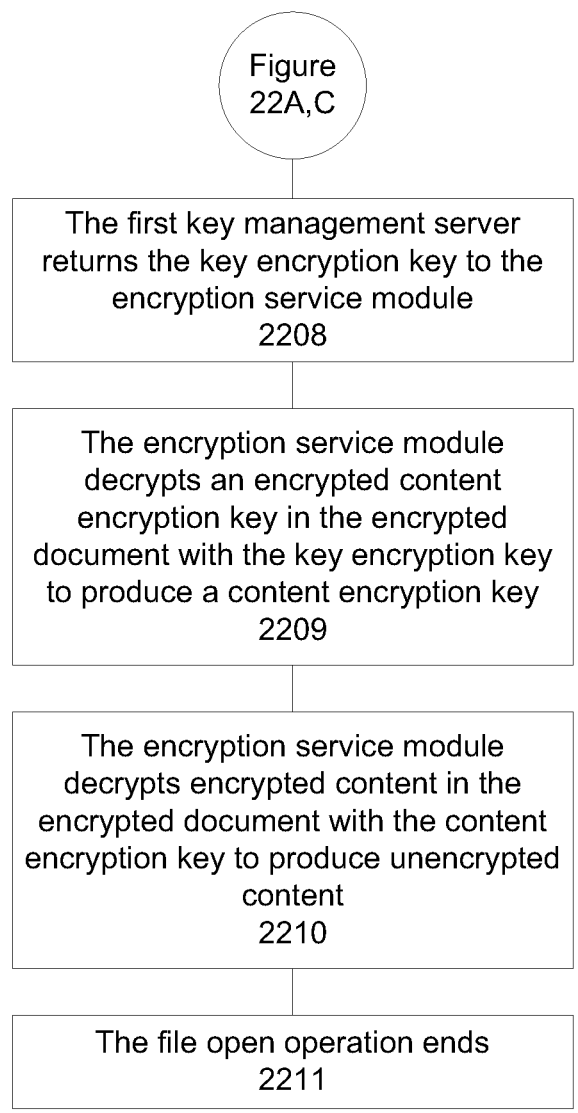

Referring to FIGS. 22A-22C, a flow diagram 2201 shows decryption of an encrypted document with an encryption key request routed between two key management servers 2103 and 2105 in peer-to-peer configuration. In step 2202, an encryption service module 2111 on a computing device 2109 detects a file open operation on an encrypted document 2114. In step 2203, the encryption service module retrieves a document identifier, a user identifier, a key management server identifier and optionally other key creation factors from the encrypted document. In step 2204, the encryption service module sends the document identifier, the user identifier, the key management server identifier and optionally the other key creation factors to a first key management server 2105 and requests a key encryption key to decrypt the encrypted document.

In step 2205, the first key management server determines if the key management server identifier identifies the first key management server. If the key management server identifier identifies the first key management server, processing continues in step 2207. If the key management server identifier does not identify the first key management server, processing continues in step 2212.

In step 2207, the first key management server creates a key encryption key with the document identifier, the user identifier, optionally the other key creation factors and a first secret maintained by the first key management server. In step 2208, the first key management server returns the key encryption key to the encryption service module.

In step 2209, the encryption service module decrypts an encrypted content encryption key in the encrypted document with the key encryption key to produce a content encryption key. In step 2210, the encryption service module decrypts encrypted content in the encrypted document with the content encryption key to produce unencrypted content.

In step 2211, the file open operation ends.

In step 2212, the first key management server locates a second key management server with the key management server identified. In step 2213, the first key management server forwards the document identifier, the user identifier, the key management server identifier and optionally the other key creation factors to a second key management server and requests a key encryption key.

In step 2214, the second key management server creates a key encryption key with the document identifier, the user identifier, optionally the other key creation factors and a second secret maintained by the second key management server. In step 2215, the second key management server returns the key encryption key to the first key management server.

Processing continues in step 2208.

In an example, two key management servers collaborate to handle an encryption key request by communicating through a key message routing server. A first user in a first organization encrypts a document with a first encryption service module and a first encryption key obtained from a first key management server to produce an encrypted document. The first user shares the encrypted document with a second user in a second organization. Sharing may be done via email, uploading a file to cloud storage, uploading an encrypted document to a website, transferring a file to a server using file transfer protocol, copying a file to a file server, copying an encrypted document to a removable device, or more.

The second user attempts to decrypt the encrypted document with a second encryption service module. The second encryption service module requests a second encryption key from a second key management server to decrypt the encrypted document. The second key management server is not able to satisfy the second encryption key request. Therefore, the second key management server forwards the second encryption key request to the first key management server by routing the second encryption key request through a key message routing server. The first key management server returns a second encryption key to the second key management server though the key message routing server. The second key management server returns the second encryption key to the second encryption service module. The second encryption service module decrypts the encrypted document with the second encryption key to produce unencrypted content.

Figure 23:
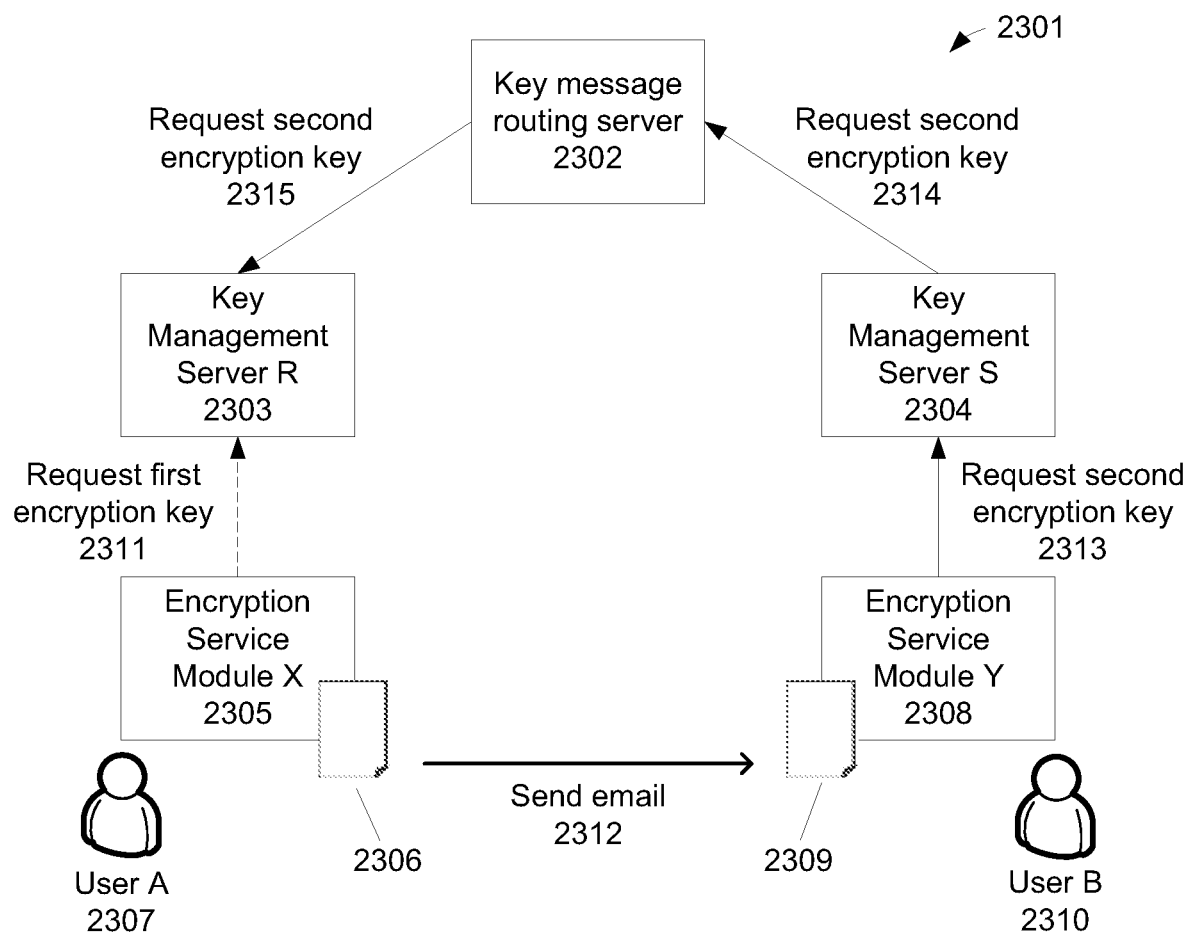
FIG. 23 shows a first user of a first organization sending an encrypted document in an email message to a second user of a second organization and the second user attempting to decrypt the encrypted document.

Referring to FIG. 23, a first user User A 2307 of a first organization sends an encrypted document 2306 in an email message to a second user User B 2310 of a second organization and the second user attempts to decrypt the encrypted document 2309. A first organization having a key management server Key Management Server R 2303 and an encryption service module Encryption Service Module X 2305 where Encryption Service Module X requests encryption keys from Key Management Server R. A second organization having a key management server Key Management Server S 2304 and an encryption service module Encryption Service Module Y 2308 where Encryption Service Module Y requests encryption keys from Key Management Server S. Both Key Management Server R and Key Management Server S communicate with a key message routing server 2302.

User A encrypts a confidential document with Encryption Service Module X to create an encrypted document 2306. Encryption Service Module X sends a first encryption key request with a user identifier of User A, a document identifier of the confidential document and optionally other key creation factors to Key Management Server R to request a first encryption key 2311.

Key Management Server R receives the first encryption key requests and creates a first encryption key with the user identifier, the document identifier, a seed token associates with the user identifier, optionally the other key creation factors and one or more secrets maintained by Key Management Server R. Key Management Server R returns the first encryption key and the seed token to Encryption Service Module X.

Encryption Service Module X encrypts the confidential document with the first encryption key to create the encrypted document. Data such as the user identifier, the document identifier, the seed token, optionally a key management server identifier identifying Key Management Server R and optionally the other key creation factors are also stored in the encrypt document to facilitate decryption.

User A sends the encrypted document to User B in an email message 2312.

User B receives the email message and attempts to open the encrypted document in an application program. A file open operation is detected by Encryption Service Module Y. To decrypt the encrypted document, Encryption Service Module Y requests a second encryption key from Key Management Server S 2313. Encryption Service Module Y retrieves the document identifier, the user identifier, the seed token, optionally the key management server identifier and optionally the other key creation factors from the encrypted document. Encryption Service Module Y provides the document identifier, the user identifier, the seed token, optionally the key management server identifier and optionally the other key creation factors in the second encryption key request.

Key Management Server S receives the second encryption key requests and determines that it is not able to handle the second encryption key request. Key Management Server S forwards the second encryption key request to the key message routing server 2314. Key Management Server S may find a key management server identifier in the second encryption key request. If the second encryption key request does not contain a key management server identifier, Key Management Server S may retrieve a key management server identifier using the user identifier. Key Management Server S uses the key management server identifier to determine if it may handle the second encryption key request.

The key message routing server examines (or inspects) the second encryption key request and determines it may be handled by Key Management Server R. The key message routing server forwards the second encryption key request to Key Management Server R 2315.

Key Management Server R receives the second encryption key requests and creates a second encryption key with the user identifier, the document identifier, the seed token, optionally the other key creation factors and optionally the one or more secrets maintained by Key Management Server R. Key Management Server R returns the second encryption key to the key message routing server. The key message routing server returns the second encryption key to Key Management Server S. Key Management Server S returns the second encryption key to Encryption Service Module Y.

Encryption Service Module Y decrypts the encrypted document with the second encryption key to create unencrypted content. The unencrypted content is provided to the application program and User B is able to read the encrypted document.

Figure 24:
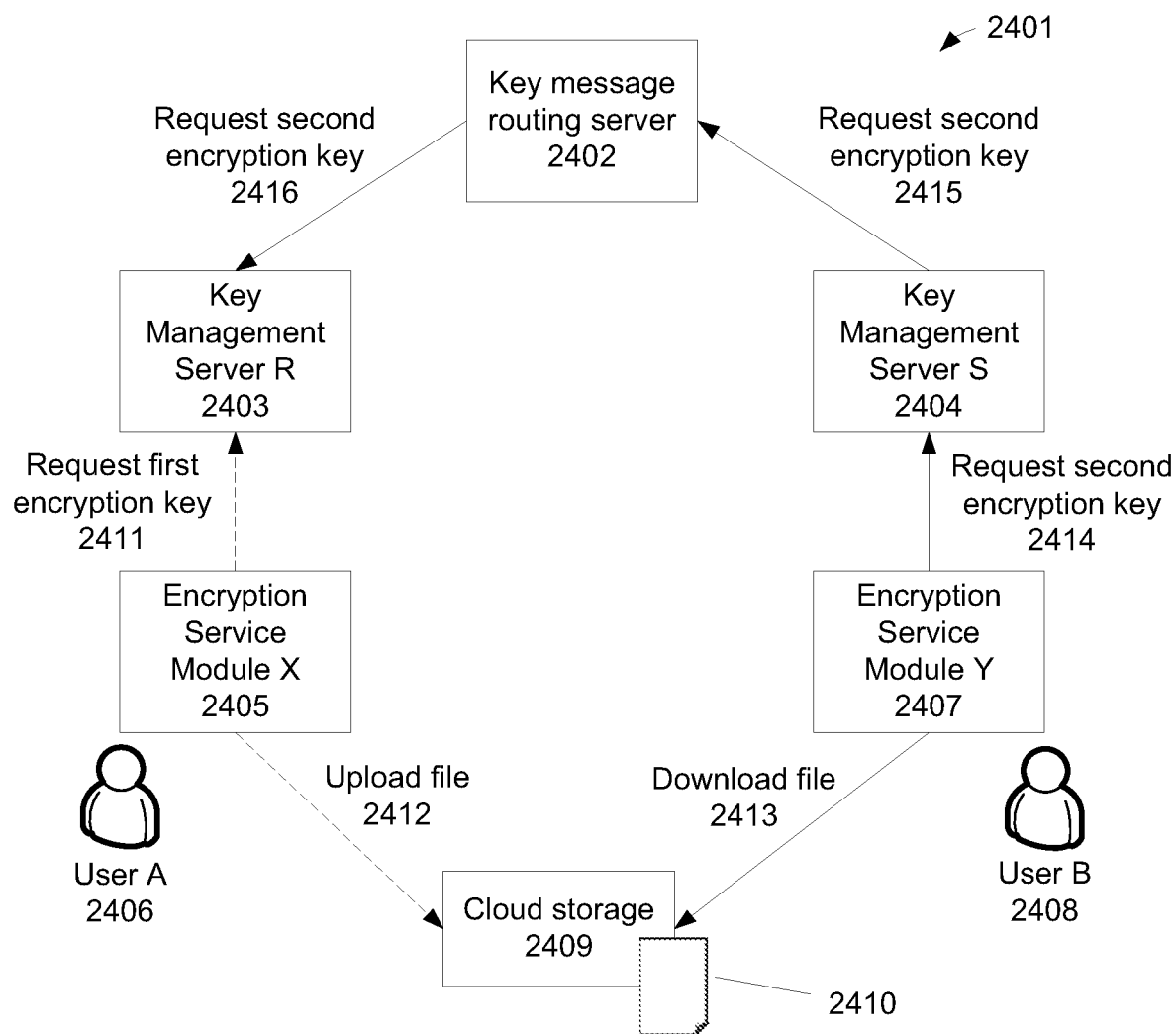
FIG. 24 shows a first user of a first organization uploading an encrypted document to a cloud storage and a second user of a second organization downloading the encrypted document and attempting to decrypt the encrypted document.

Referring to FIG. 24, a first user User A 2406 in a first organization uploads an encrypted document to a cloud storage and a second user User B 2408 in a second organization downloads the encrypted document and attempts to decrypt the encrypted document. The first organization has a key management server Key Management Server R 2403 and an encryption service module Encryption Service Module X 2405 where Encryption Service Module X requests encryption keys from Key Management Server R. The second organization has a key management server Key Management Server S 2404 and an encryption service module Encryption Service Module Y 2407 where Encryption Service Module Y requests encryption keys from Key Management Server S. Both Key Management Server R and Key Management Server S communicate with a key message routing server 2402. Both User A and User B are able to upload documents to or download documents from a cloud storage Apple iCloud Drive® 2409.

At a time T1, User A encrypts a confidential document with Encryption Service Module X to create an encrypted document 2410. Encryption Service Module X sends a first encryption key request with a user identifier of User A, a document identifier of the confidential document and optionally other key creation factors to Key Management Server R to request a first encryption key 2411.

Key Management Server R receives the first encryption key requests and creates a first encryption key with the user identifier, the document identifier, optionally the other key creation factors and one or more secrets maintained by Key Management Server R. Key Management Server R returns the first encryption key to Encryption Service Module X.

Encryption Service Module X encrypts the confidential document with the first encryption key to create the encrypted document. Data such as the user identifier, the document identifier, optionally a key management server identifier identifying Key Management Server R and optionally the other key creation factors are also stored in the encrypt document to facilitate decryption.

User A uploads the encrypted document to the cloud storage.

At a time T2, User B downloads the encrypted document from the cloud storage and attempts to open the encrypted document in an application program. T2 happens sometime after the encrypted document is created. A file open operation is detected by Encryption Service Module Y. To decrypt the encrypted document, Encryption Service Module Y requests a second encryption key from Key Management Server S 2414. Encryption Service Module Y retrieves the document identifier, the user identifier, optionally the key management server identifier and optionally the other key creation factors from the encrypted document. Encryption Service Module Y provides the document identifier, the user identifier, optionally the key management server identifier and optionally the other key creation factors in the second encryption key request.

Key Management Server S receives the second encryption key requests and determines that it is not able to handle the second encryption key request. Key Management Server S forwards the second encryption key request to the key message routing server 2415. Key Management Server S may find a key management server identifier in the second encryption key request. If the second encryption key request does not contain a key management server identifier, Key Management Server S may retrieve a key management server identifier using the user identifier. Key Management Server S uses the key management server identifier to determine if it may handle the second encryption key request.

The key message routing server examines (or inspects) the second encryption key request and determines it may be handled by Key Management Server R. The key message routing server forwards the second encryption key request to Key Management Server R 2416.

Key Management Server R receives the second encryption key requests and creates a second encryption key with the user identifier, the document identifier, optionally the other key creation factors and the one or more secrets maintained by Key Management Server R. Key Management Server R returns the second encryption key to the key message routing server. The key message routing server returns the second encryption key to Key Management Server S. Key Management Server S returns the second encryption key to Encryption Service Module Y.

Encryption Service Module Y decrypts the encrypted document with the second encryption key to create unencrypted content. The unencrypted content is provided to the application program and User B is able to read the encrypted document.

Figure 25:
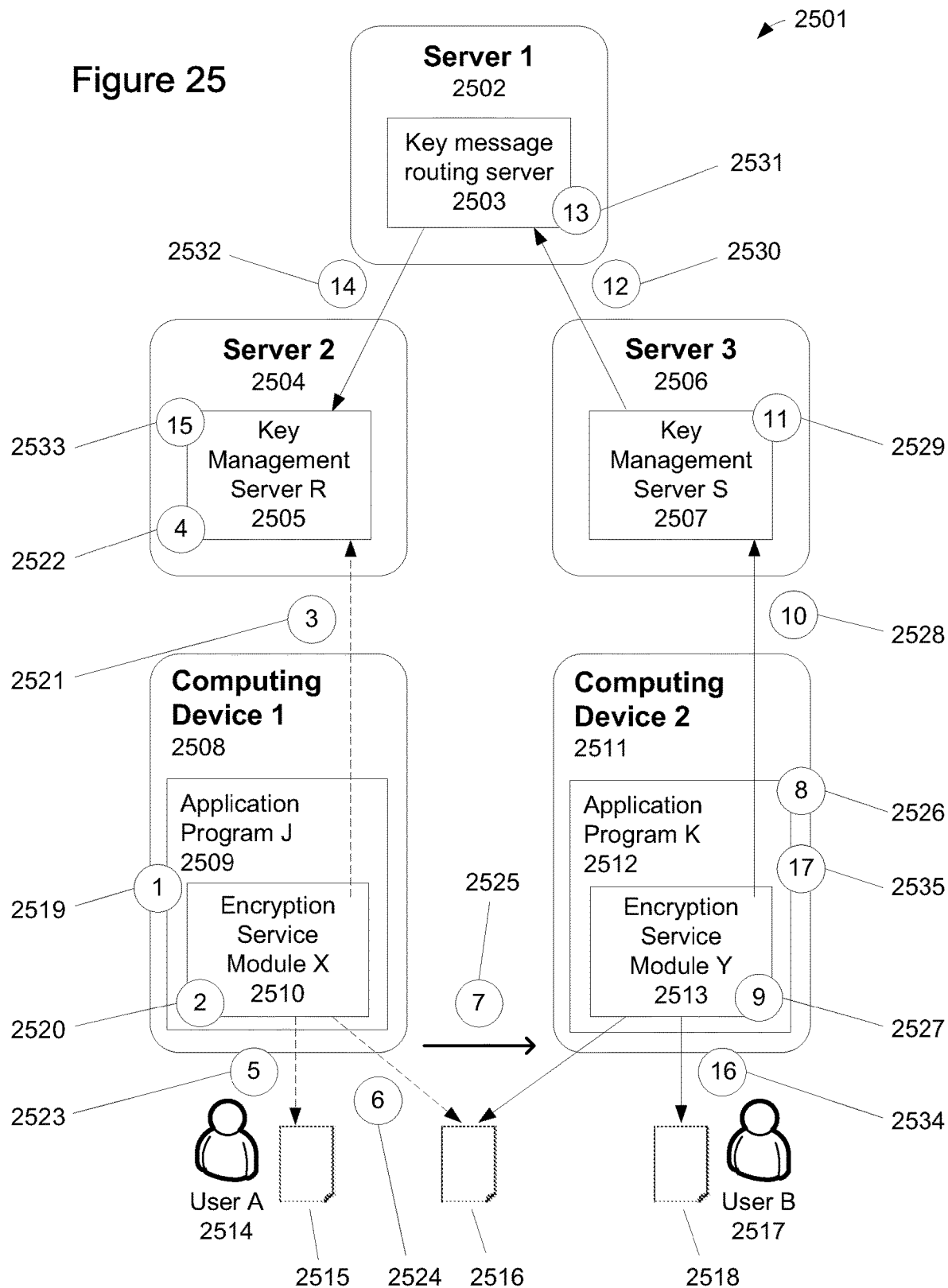
FIG. 25 shows an execution flow of encryption and decryption with encryption key requests routed through a key message routing server.

Referring to FIG. 25, an execution flow 2501 showing encryption and decryption with encryption key requests routed through a key message routing server. A first organization having a key management server Key Management Server R 2505 running on a computing server Server 2 2504 and an encryption service module Encryption Service Module X 2510 installed on a computing device Computing Device 1 2508. A second organization having a key management server Key Management Server S 2507 running on a computing server Server 3 2506 and an encryption service module Encryption Service Module Y 2513 installed on a computing device Computing Device 2 2511.

Key Management Server R and Key Management Server S are configured to communicate with a key message routing server 2503 running in computing server Server 1 2502. Communication between Key Management Server R and Key Management Server S is routed through the key message routing server. Encryption Service Module X requests encryption keys from Key Management Server R and Encryption Service Module Y requests encryption keys from Key Management Server S.

A user User A 2514 of the first organization has access to an application program Application Program J 2509 running on Computing Device 1, whereas a user User B 2517 has access to an application program Application Program K 2512 running on Computing Device 2.

In step (1) 2519, User A saves a document 2515 opened in Application Program J. In step (2) 2520, Encryption Service Module X detects a file save operation on Computing Device 1. Encryption Service Module X retrieves a user identifier of User A. The user identifier is a digital certificate. In step (3) 2521, Encryption Service Module X sends a first encryption key request with the user identifier and optionally other key creation factors to Key Management Server R to request a first encryption key to encrypt the document.

In step (4) 2522, Key Management Server R receives the first encryption key request and creates a document identifier. The document identifier is a UUID. Key Management Server R retrieves a seed token associated with the user identifier. Key Management Server R creates a first encryption key with the document identifier, the user identifier, the seed token, optionally the other key creation factors and one or more secrets maintained by Key Management Server R. The first encryption key is created with one or more cryptographic techniques. Key Management Server R returns the document identifier, the seed token and the first encryption key to Encryption Service Module X.

In step (5) 2523, Encryption Service Module X creates a content encryption key. The content encryption key is a symmetric key. Encryption Service Module X encrypts the document with the content encryption key to produce encrypted content. Encryption Service Module X encrypts the content encryption key with the first encryption key to produce an encrypted content encryption key. In step (6) 2524, Encryption Service Module X stores the document identifier, the user identifier, the seed token, optionally a key management server identifier identifying Key Management Server R, optionally the other key creation factors, the encrypted content encryption key and the encrypted content in an encrypted document 2516.

In step (7) 2525, User A uploads the encrypted document a cloud storage Microsoft OneDrive®.

In step (8) 2526, User B downloads the encrypted document from the cloud storage and attempts to open the encrypted document with Application Program K.

In step (9) 2527, Encryption Service Module Y detects a file open operation on Computing Device 2. Encryption Service Module Y retrieves the document identifier, the user identifier, the seed token, optionally the key management server identifier and optionally the other key creation factors from the encrypted document. In step (10) 2528, Encryption Service Module Y sends a second encryption key request with the document identifier, the user identifier, the seed token, optionally the key management server identifier and optionally the other key creation factors to Key Management Server S to request a second encryption key to decrypt the encrypted document.

In step (11) 2529, Key Management Server S receives the second encryption key request and determines that it needs to be handled by Key Management Server R. A key management server identifier may be found in the second encryption key request and used to identify the target key management server. If the second encryption key request does not contain a key management server identifier, Key Management Server S may retrieve a key management server identifier using the user identifier. Key Management Server S uses the key management server identifier to determine if it may handle the second encryption key request. In step (12) 2530, Key Management Server S forwards the second encryption key request to the key message routing server.

In step (13) 2531, the key message routing server examines (or inspects) the second encryption key request and determines the second encryption key request needs to be forwarded to Key Management Server R. In step (14) 2532, the key message routing server forwards the second encryption key request to Key Management Server R.

In step (15) 2533, Key Management Server R creates a second encryption key with the document identifier, the user identifier, the seed token, optionally the other key creation factors and the one or more secrets maintained by Key Management Server R. Key Management Server R returns the second encryption key to the key message routing server. The key message routing server returns the second encryption key to Key Management Server S. Key Management Server S returns the second encryption key to Encryption Service Module Y.

In step (16) 2534, Encryption Service Module Y decrypts the encrypted content encryption key in the encrypted document to produce a content encryption key. Encryption Service Module Y decrypts the encrypted content in the encrypted document with the content encryption key to produce unencrypted content 2518 (i.e., a copy of the document).

In step (17) 2535, Application Program K opens the encrypted document successfully. Application Program K has access to the unencrypted content.

Figure 26A:
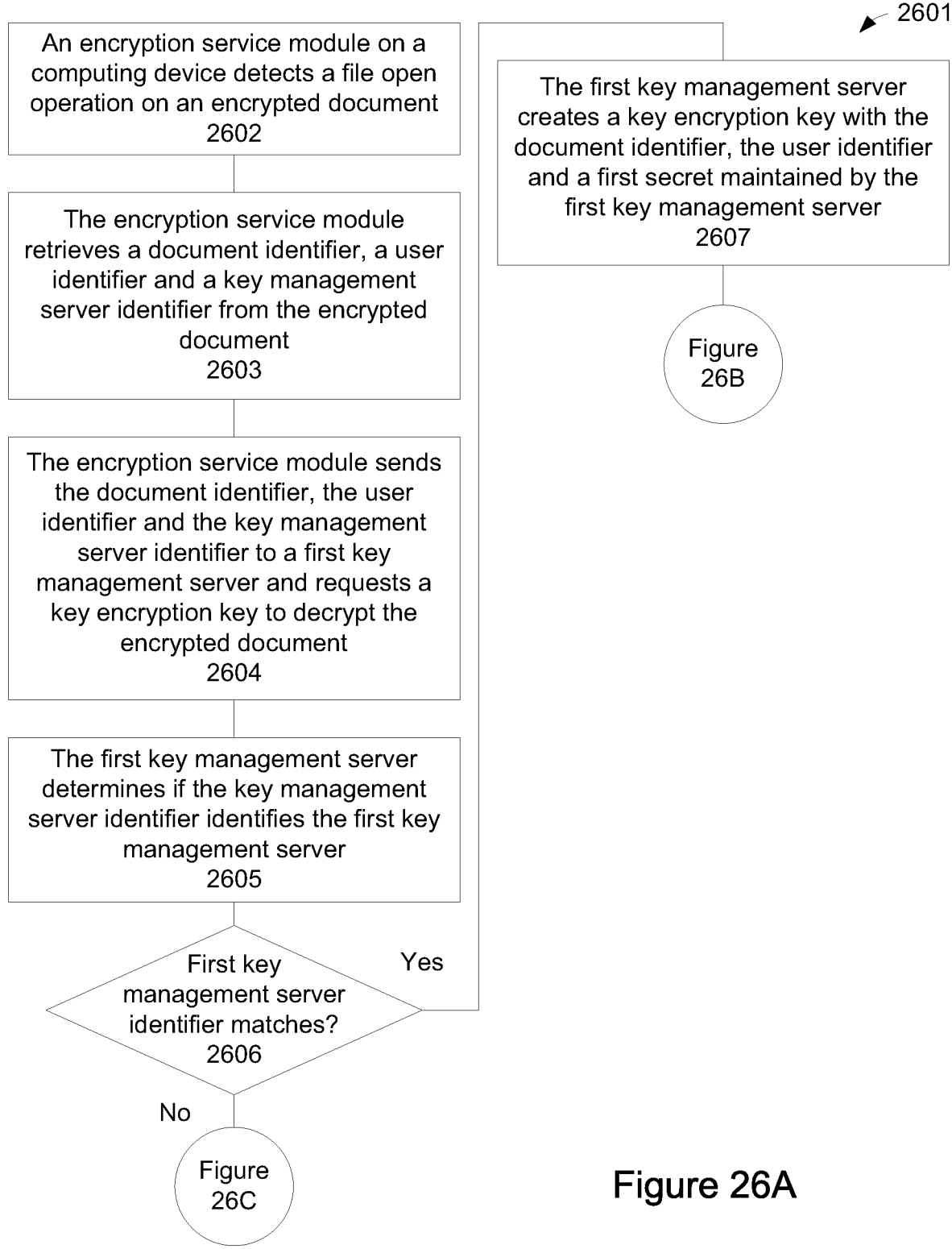
FIGS. 26A-26C show a flow diagram of decrypting an encrypted document with an encryption key request routed through a key message routing server.
Figure 26B:
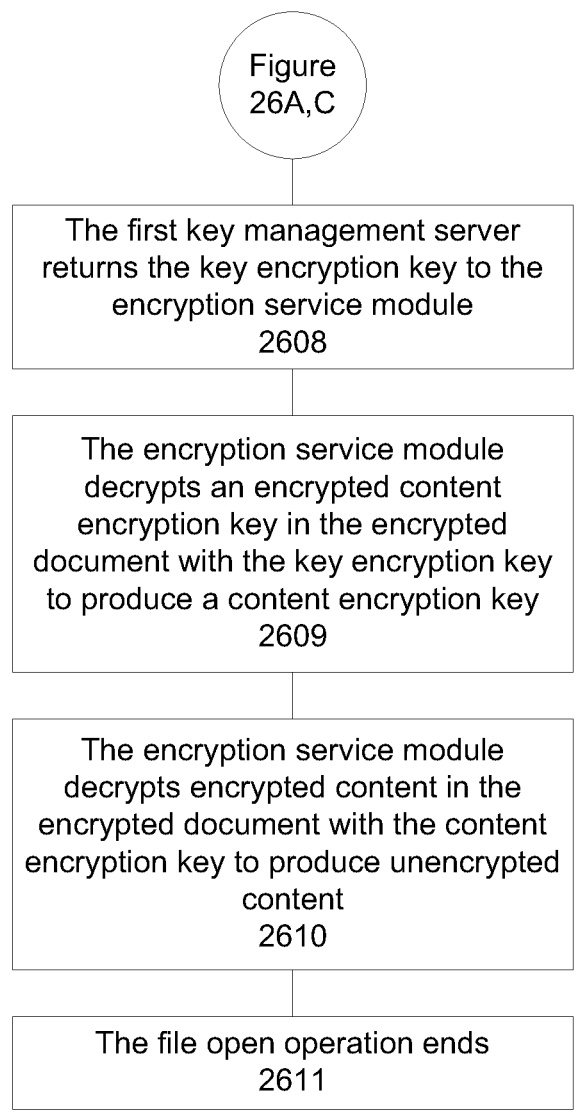
Figure 26C:
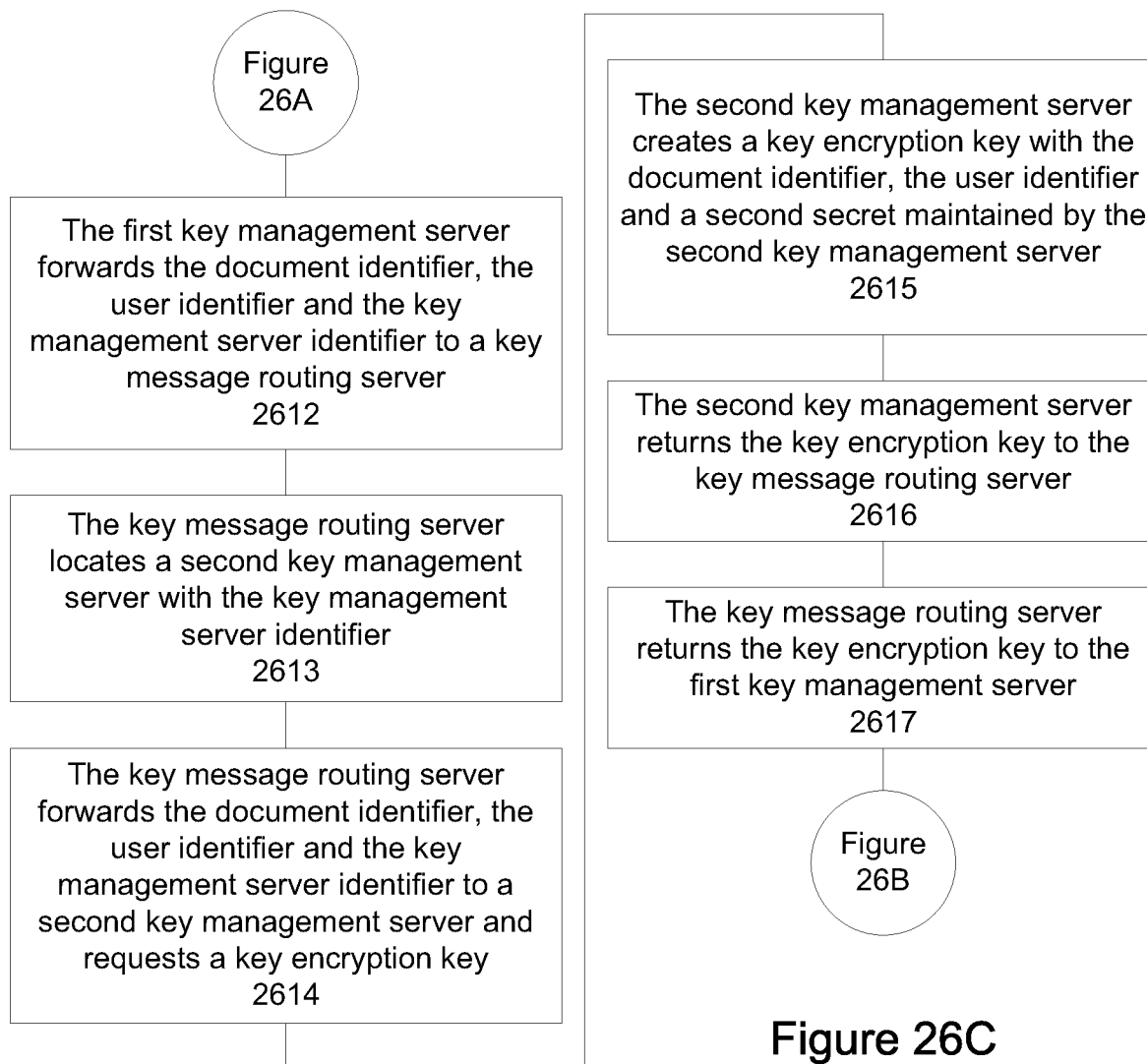

Referring to FIGS. 26A-26C, a flow diagram 2601 shows decryption of an encrypted document with an encryption key request routed through a key message routing server 2503. In step 2602, an encryption service module 2513 on a computing device 2511 detects a file open operation on an encrypted document 2516. In step 2603, the encryption service module retrieves a document identifier, a user identifier, a key management server identifier and optionally other key creation factors from the encrypted document. In step 2604, the encryption service module sends the document identifier, the user identifier, the key management server identifier and optionally the other key creation factors to a first key management server 2507 and requests a key encryption key to decrypt the encrypted document.

In step 2605, the first key management server determines if the key management server identifier identifies the first key management server. If the key management server identifier identifies the first key management server, processing continues in step 2607. If the key management server identifier does not identify the first key management server, processing continues in step 2612.

In step 2607, the first key management server creates a key encryption key with the document identifier, the user identifier, optionally the other key creation factors and a first secret maintained by the first key management server. In step 2608, the first key management server returns the key encryption key to the encryption service module.

In step 2609, the encryption service module decrypts an encrypted content encryption key in the encrypted document with the key encryption key to produce a content encryption key. In step 2610, the encryption service module decrypts encrypted content in the encrypted document with the content encryption key to produce unencrypted content.

In step 2611, the file open operation ends.

In step 2612, the first key management server forwards the document identifier, the user identifier, the key management server identifier and optionally the other key creation factors to a key message routing server.

In step 2613, the key message routing server locates a second key management server 2505 with the key management server identifier. In step 2614, the key message routing server forwards the document identifier, the user identifier, the key management server identifier and optionally the other key creation factors to the second key management server and requests a key encryption key.

In step 2615, the second key management server creates a key encryption key with the document identifier, the user identifier, optionally the other key creation factors and a second secret maintained by the second key management server. In step 2616, the second key management server returns the key encryption key to the key message routing server. In step 2617, the key message routing server returns the key encryption key to the first key management server.

Processing continues in step 2608.

While encryption is effective in protecting documents whether they are at rest or in motion, its ability to control access to an encrypted document and use of information in an encrypted document is quite limited. Encryption provides basic access control by controlling access to encryption keys. Once an encrypted document is decrypted, encryption does not provide protection to the decrypted content. When flexible or fine-grained access or use control is necessary, coupling policy-based authorization with encryption service offers a more effective solution. Policy-based access, use or rights control authorizes access or use on application program operations. When an application program operation on an encrypted document is authorized, the encrypted document is decrypted to produce unencrypted content. Techniques of protecting information (e.g., documents) in an information management system are described in detail in U.S. patent application Ser. No. 11/615,477, filed Dec. 22, 2006 and U.S. patent applications aforementioned and incorporated by reference.

In an example, when a user opens an encrypted document, a policy-based access and use control subsystem of an information management system detects a file open operation and makes decision on the file open operation based on a plurality of policies. If the decision does not allow the file open operation, the file open operation is blocked (e.g., returns an error). If the decision allows the file open operation, the file open operation continues. Subsequently, an encryption service subsystem of the information management system detects the file open operation and requests an encryption key from a key management server with information stored in the encrypted document. The key management server creates an encryption key based in part on the information provided. Since the encryption key is created dynamically according to the request, it is not necessary to store the encryption key on the key management server for retrieval later. The encryption service subsystem decrypts the encrypted document with the encryption key and provides unencrypted content to the file open operation.

With policy-based access and use control, a policy may grant access to an encrypted document to a user or a group of users. Another policy may revoke access to an encrypted document from a user or a group of users. As such, granting access to an encrypted document to a group is just a matter of writing a policy. Policies may be modified independent of encryption and key management.

In an embodiment, an information management system employs a plurality of policies, a policy server, a plurality of key management servers, a key message routing server, a plurality of policy enforcers, a plurality of encryption service modules, or any combination thereof to protect a plurality of documents from unauthorized access and use.

A policy that is used to control access to and use of a document may be defined (or created) independent of a user or a document. A policy may control access to or use of a plurality of documents. A policy may be defined before a user who is affected by the policy is added to an information management system. A policy may be defined in an information management system before a document is created, yet access to the document is controlled by the policy. A new policy may be defined or an existing policy may be updated after a document is created. The new or existing policy will be applied to control access to or use of the document once it is deployed. In another word, policies in an information management system are not static; which is unlike how policies work in many digital rights management systems.

Control and protection functions of documents may be achieved either through one policy or multiple policies defined centrally. A policy server is an intelligent system that has the ability to decide if a single or multiple policies or subset of policies are applicable to a policy enforcer (described below). A plurality of policies is stored in a policy database accessible by a policy server. The plurality of policies or a subset of the plurality of policies may be distributed to one or more policy enforcers. Typically, a subset of all policies defined in an information management system is distributed to a policy enforcer.

Controlling access to documents includes allowing or denying opening a file, renaming a file, deleting a file, opening an attachment in an email message, opening a web page, or others. Controlling use of documents includes allowing or denying copying content of a document, printing a document, saving a document into a different file, copying a file, attaching a file to an e-mail message, adding a file to an archive such as a zip file, stored a file into a document, merging two documents, sending an e-mail message with a document attached to a recipient, sending a document as a chat message, uploading a file to a website, or others.

Controlling access to and use of and documents may be implemented using access control policies (which sometimes referred to as access policies), use control policies (which sometimes referred to as usage policies), rights control policies (which sometimes referred to as rights policies or digital rights policies), or any combination thereof.

A policy enforcer controls access to and use of documents by attaching itself to (or instrumenting) an application program that accesses documents. The policy enforcer intercepts (or detects, or senses) one or more application program operations in the application program and effects the one or more application program operations. When the policy enforcer intercepts an application program operation, it sends the application program operation along with information relevant to the application program operation to a policy engine (described further below) to perform policy evaluation. The policy engine selects and evaluates one or more policies (or rules) relevant to the application program operation to determine if the application program operation should be carried out. For an access, use or rights control policy, a decision from policy evaluation includes policy effect allow or deny. In addition to policy effect, policy evaluation may produce a policy obligation (described further below), optionally. A policy enforcer enforces a policy effect of policy evaluation and implements one or more policy obligations. If a policy effect is allow, an enforcement action is to do nothing, thereby allowing an application program operation to be carried out to completion. If a policy effect is deny, an enforcement action is to block an application program operation.

Examples of application programs include word processor (e.g., Microsoft® Word or Apple Pages®), spreadsheet (e.g., Microsoft Excel® or Apple Numbers®), presentation program (e.g., Microsoft PowerPoint® or Apple Keynote®), document viewer (e.g., Adobe Reader®), web browser (e.g., Microsoft Internet Explorer®, Mozilla Firefox®, Apple Safari®, Google Chrome™ or Microsoft® Edge), e-mail client (e.g., Microsoft Outlook® or Apple® Mail), instant messenger or chat application (e.g., Facebook WhatApp™, Facebook Messenger™, Snap SnapChat™, Microsoft® Office Communicator, Microsoft Skype®), and many others.

Examples of application program operations include opening a file, copy a file, moving a file, renaming a file, deleting a file, printing a document, copying content of a document, changing document classification, saving a document into a different file, uploading a file to a website, opening a web page, sending a document in an e-mail message, attaching a file to an e-mail message, sending a document in an instant messenger or chat application, and many others.

A typical access or use control policy specifies one or more actions that the policy may be applied. An access or use control policy specifies what action (e.g., open, save or send) a user may perform or not perform (e.g., allow or deny) on a resource (e.g., document). On the other hand, a rights control policy specifies what rights (e.g., view, save or copy) a user may have or not have (e.g., grant or revoke) on a resource. Many policy objectives may be achieved using either access, use or rights control policies. In fact, a particular policy objective may be implemented using access control policies, use control policies, rights control policies, or a combination of two or more types of policies. Access or use control policies are described in detail in U.S. patent application Ser. No. 11/615,477, filed Dec. 22, 2006 and U.S. patent applications aforementioned and incorporated by reference. Rights control policies are described in detail in U.S. patent application 62/220,104, filed Sep. 17, 2015, which is incorporated by reference.

A policy language of the information management system of the present invention may include policies and policy abstractions. Policies may also be referred to as rules or policy object, and policy abstractions may also be referred to as abstractions, abstraction objects or variables. There may be any number of policies, abstractions, or both. Typically, an information management system has hundreds, thousands, millions, or greater number of rules. Because many rules are needed typically to manage information in a company effectively, abstractions may be used to simplify maintenance of the rules and there should be a system to effectively managing the policies and abstractions.

In an embodiment, a policy (or rule) includes an expression. A premise may be an expression or statement. More specifically, a premise may contain an expression, and an expression may be a statement. An expression may be "a=true and b=c." An expression may also include a comma delimited list. For example, one may check whether an action is one of the actions listed in a comma delimited list. A statement may be "FOR expression ON expression BY expression DO statement," or any non-logical or mathematical expression. A statement includes expressions, potentially multiple expressions, each of which may be nested. A statement may also include nested statements.
policy:=premise+consequence+directives An access or use control policy may be used to permit or block an application program operation access to or use of a resource. A resource includes a document described above. The general form of an access or use control policy includes at least one resource, one action (e.g., open or edit), one user, one effect (e.g., allow or deny) and optionally a condition. For example, an access policy may specify only a user in a group Executive may open a document classified as Financial and Confidential when a computer is connected to a network in the office. A use control policy may specify all users may not send a document classified as "top secret" in an e-mail message. Access or use control policies including their syntax, applications, deployment and evaluation are described in detail in U.S. patent application Ser. No. 11/615,477, filed Dec. 22, 2006 and U.S. patent applications aforementioned and incorporated by reference.

In an implementation, access or use control policies share the same syntax. An access control policy may be used to allow or deny access by one or more users to one or more resources. A use control policy may be used to allow or deny an action by one or more users on one or more resources. The access or use control policy syntax is:

```
FOR <resource>
ON <action>
BY <user>
[WHERE <condition>]
DO ALLOW|DENY [, <obligation>]
```

A resource includes a document described above. A resource may include a named resource, a resource where its attribute matching a pattern, a resource abstraction, or others. An action often maps to an application program operation. Sometimes, an action translates to a sequence of application program operations. Some examples of actions include open, save, print, edit, copy, upload, delete, send, change attribute, classify, or others. A user may include a named user, a named user group, a user abstraction, a user where the user's attribute matching a pattern, or others. A condition may specify a location, time, time range, connection type, application program, device type, computer, security level, if a particular software is install, if an antivirus definition is up-to-date, or others. An obligation is a task that should be performed. An obligation may be adopted when an effect is allow, deny, or both.

In an implementation, rights control policies adopt a syntax similar to access or use control policies. A rights control policy is different from an access or use control policy that a rights control policy specifies one or more rights a user may have on a resource whereas an access or use control policy specifies what actions a user is allowed (or denied) to perform on a resource. Rights control policies and access or use control policies have similar applications—controlling access to or use of a resource.

A rights control policy may be used to grant a right to a user or revoke a right granted to a user. The general form of a rights control policy includes at least one resource and at least one user. In addition, a rights control policy may also include one or more options specifying a condition such as a time, location, connectivity type, security level of a client computer, or others. For example, a rights control policy may describe granting one or more rights to one or more users on one or more resources; granting a right to a user on all resources under a condition; or revoking a right from a user on a resource. The rights control policy syntax is:

```
GRANT|REVOKE <rights> RIGHT|RIGHTS
TO|FROM <user>
ON <resource>
```

```
[WHERE <condition>]
[DO <obligation>]
```

The rights (or digital rights) in rights control policies and their definitions are specific to an information management system. Examples of rights that may be granted to or revoked from a user include view, edit, copy, extract, convert, print, send, decrypt, annotate, classify, assign, screen capture, CAD product and manufacturing information, or many others. The rights described herein are for illustration purpose only. An information system may enforce a different set of rights using the techniques described in this document. Variations such as naming of a right, adding a new right, deleting an existing right, or modifying definition of an existing right may be accommodated easily. For example, a send right may be modified to enforce uploading of a document to a website; an upload right may be added to enforce uploading of a document to a website; or a copy right may be renamed as a duplicate right.

The user, resource, condition and obligation in a rights control policy is the same as those of an access and use control policy.

The role of a policy enforcer is to protect sensitive or high-value documents from unauthorized access or misuse. A policy enforcer is a type of data protection client. A rights management client is another type of data protection client. Data protection client is described in detail in U.S. patent application 62/220,104, filed Sep. 17, 2015, which is incorporated by reference. Policy enforcer is described in detail in U.S. patent application Ser. Nos. 11/383,159, 11/383,161, and 11/383,164, filed May 12, 2006, Ser. No. 11/615,477, filed Dec. 22, 2006, Ser. No. 13/439,827, filed Apr. 4, 2012 and 62/220,104, filed Sep. 17, 2015, which are incorporated by reference. Rights management client is described in detail in U.S. patent application Ser. No. 13/439,827, filed Apr. 4, 2012, 62/220,104, filed Sep. 17, 2015 and 62/238,009, filed Oct. 6, 2015, which are incorporated by reference.

A policy enforcer may be deployed to protect a wide range of documents accessible from a computing device. A policy enforcer is a module or computer code, executing on a computing device that is used to protect documents by controlling access to, use of, or rights to the documents. Some example operations a policy enforcer controls are whether to allow open operations (e.g., whether a user may open a document with Microsoft® Word); or edit operation (e.g., whether a user may copy content of a document to another document, or whether a user may modify a Microsoft® Excel worksheet).

A rights management client is at a high-level a policy enforcer with an encryption service module add-on. A rights management client is optimized to control access and use through policies, and encrypt documents and decrypt encrypted documents transparently to make encryption available to most application programs on a computing device.

A policy enforcer or rights managed client describes in this document implements functions of a policy enforcement point such as in U.S. patent application Ser. Nos. 11/383,159, 11/383,161, and 11/383,164, filed May 12, 2006, and Ser. No. 11/615,477, filed Dec. 22, 2006, which are incorporated by reference. A policy enforcer or rights managed client may also implement functions of a policy decision point described in the same references. In addition, a policy enforcement point described in the references may be extended to support rights enforcement as described in U.S. patent application Ser. No. 15/291,653, filed Oct. 12, which is incorporated by reference.

In an implementation, the functions of a policy enforcer that supports access, use or rights policies include intercepting document access or use operations on a document; communicating an intercepted document access or use operation and associated context to a policy engine; making policy decision on an intercepted document access or use operation at the policy engine; enforcing policy decisions by allowing or denying an intercepted document access or use operation; and auditing (or logging) document access or use activities, policy decisions or policy enforcement activities.

A policy decision may be described by a policy effect allow, deny, or others. Enforcing a policy effect allow requires a policy enforcer to do nothing, thereby allowing an intercepted operation to execute to completion. Enforcing a policy effect deny includes blocking execution of program code.

A policy enforcer may effectuate document rights granted by allowing operations that are consistent with document rights granted and disallowing operations that are not consistent with document rights granted. Effectuating document rights granted may include modifying an application program's user interface to allow or disallow an operation. Techniques on effectuating document rights granted is described in detail in U.S. patent application 62/220,104, filed Sep. 17, 2015, which is incorporated by reference.

A policy enforcer may enforce a plurality of centralized policies, a plurality of discretionary policies, or both. A centralized policy is a policy administered centrally and distributed by a policy server to a policy enforcer. A discretionary policy is a policy stored in an encrypted document.

Intercepting document access or use operations, enforcing policy decisions and optionally effectuating document rights granted are functions of a policy enforcement point. A policy enforcer may include one or more policy enforcement points. Policy enforcement point is described further below.

Making policy decision on an intercepted document access or use operation and optionally determining rights granted to a document associated with an intercepted document access or use operation are functions of a policy engine. A policy engine is an execution unit that processes and executes policies or rules to produce policy decisions.

In an implementation, a policy enforcer instruments an application program, intercepts an operation of the application program, evaluates a subset of policies according to the operation, a document being accessed (e.g., opening of file) or used (e.g., copy content in a document), and a user or user account operating the application program to produce a policy decision, enforces the policy decision from policy evaluation by allowing or denying access to or use of the document, and optionally implements one or more policy obligations according to the policy decision.

An operation of an application program (sometimes referred to as application program operation) includes an event or a notification generated in the application program, or a function invoked in the application program. Examples of application program operations include opening of a file, copying content in a document, sending an e-mail message, sending a document as an attachment of an e-mail message, saving a document in a different document format, printing a document, or many others.

A policy obligation is a task to be performed by a policy enforcer when a policy specifying the policy obligation is in the subset of policies being evaluated and invocation condition of the policy obligation is satisfied. A policy obligation is an optional element of a policy. A policy evaluation may not produce a policy obligation. Some examples of policy obligations include a log policy obligation that logs data to a log server; an automatic tagging policy obligation that inserts one or more document attributes into a document; an interactive tagging policy obligation that queries a user to enter one or more document attributes and inserts the one or more document attributes into a document; a strip attachment policy obligation that removes an attachment from an e-mail message; an encryption obligation that encrypts a document and saves the encrypted document in an encrypted document; a security overlay obligation that renders a security marker on top of content of a document; or many others.

Figure 27:
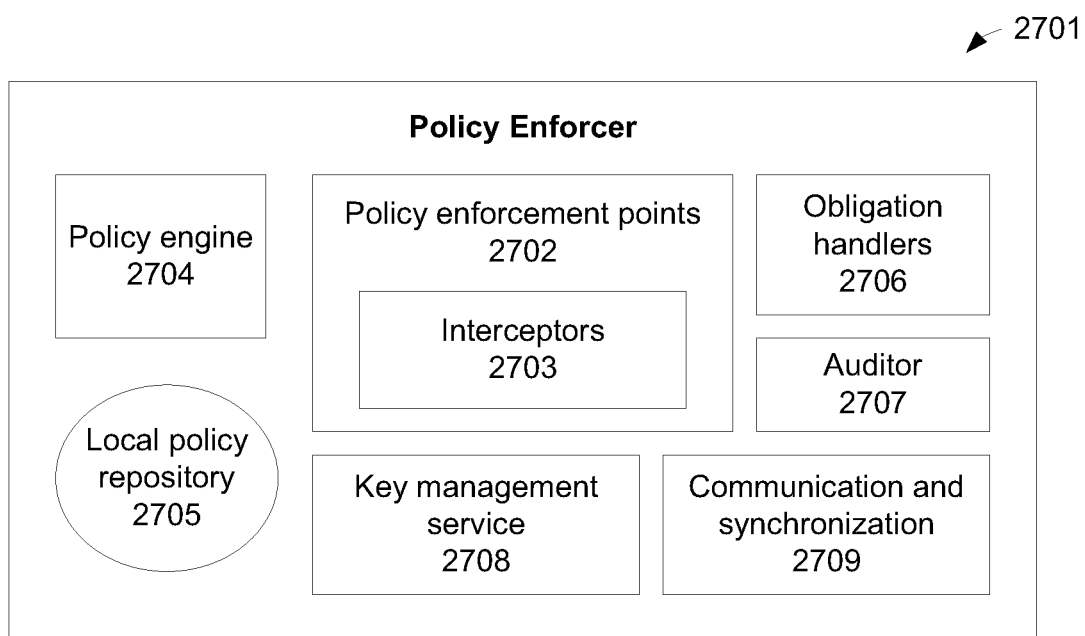
FIG. 27 shows a functional block diagram of a policy enforcer.

FIG. 27 shows a functional block diagram of a policy enforcer 2701. A policy enforcer may have one or more policy enforcement points (PEPs) 2702 which intercept application program or operating system operations and implement policy effects. A PEP may have one or more interceptors 2703. Typically, an interceptor runs in an application program instance (e.g., a process) or operating system kernel. When an interceptor of a PEP intercepts an application program or operating system operation, the PEP queries a policy engine 2704 with the intercepted operation and information relevant to the intercepted operation for a policy decision.

The policy engine selects a first subset of policies from a plurality of policies in a local policy repository 2705 that is relevant to the intercepted operation and evaluates the first subset of policies to produce a policy decision. The plurality of policies in the local policy repository is centralized policies distributed from a policy server. The policy engine may evaluate discretionary policies, optionally. Discretionary policies are stored in an encrypted document may be evaluated in additional to centralized policies to produce a policy decision. In an implementation, a policy engine evaluates centralized policies to produce a policy decision. In another implementation, a policy engine evaluates centralized and discretionary policies to produce a policy decision. In yet another implementation, a policy engine evaluates discretionary policies to produce a policy decision.

The policy decision includes a policy effect allow or deny, and optional policy obligations. A policy obligation is a task to be carried out by a policy enforcer and it is an optional element of a policy. If a policy effect is allow, the policy engine returns policy effect allow to the PEP. The PEP implements a policy effect allow by allowing the intercepted operation to execute to completion. If a policy effect is deny, the policy engine returns policy effect deny to the PEP. The PEP implements a policy effect deny by blocking the intercepted operation.

If the policy decision produces a policy obligation, a corresponding obligation handler is invoked to carry out the policy obligation. A policy enforcer may implement one or more obligation handlers 2706. Obligation handler is an optional component of a policy enforcer.

An auditor 2707 logs interceptions and policy evaluations at a policy enforcer. It also gathers additional information on computing environment that may be used in an audit, performance analysis or diagnosis. An auditor typically caches log data locally so that it may continue to operate while a client computer is offline. Log data is transmitted to a central log server (or report server) when a client computer is online. The log data collected in a log server may be used to analyze documents usage pattern, analyze policy effectiveness, identify threats, generate alerts, or produce reports.

An optional key management service (sometimes referred to as encryption key management service) 2708 manages encryption keys at a policy enforcer. Functions of a key management service include encryption key generation, encryption key request with a key management server, encryption key caching, or more. A key management service requests encryption keys from a key management server, caches encryption keys locally and releases encryption keys to an encryption service module. To determine if a process is to be trusted with decrypted document, a key management service checks a policy evaluation cache for a recent policy evaluation on the document by a user (i.e., a user the process is running under) where policy effect is allow. If a matching policy evaluation is found, the key management service trusts the process with decrypted document and releases an encryption key to an encryption service module to decrypt the document. Key management server is described in detail in U.S. patent application 61/368,408, filed Jul. 28, 2010, which is incorporated by reference. Alternatively, the functions of a key management service may be implemented in an encryption service module.

A communication and synchronization module 2709 is responsible for transmitting policy updates from a policy server to the local policy repository and log data from an auditor to a central log server.

To access encrypted documents, a policy enforcer may employ an encryption service module. An encryption service module provides a policy enforcer access to document attributes and discretionary policies stored in an encrypted document. An encryption service module also allows transparent access to a document stored in an encrypted document by an application program.

In an implementation, a policy enforcer controls access to encryption keys of encrypted documents. When a user accesses an encrypted document, a policy enforcer intercepts an open operation in an application program and queries a policy engine for a policy decision on the open operation. The policy engine selects a subset of policies from a plurality of policies distributed by a policy server (i.e., centralized policies) to determine if the open operation should be allowed. The policy engine selects the subset of policies based on the open operation, the user, and one or more attributes of the encrypted document. The subset of policies being evaluated is not specified in the encrypted document. The policy engine may evaluate discretionary policies in additional to centralized policies to produce a policy decision, optionally. If the open operation is allowed, the policy enforcer allows the open operation to continue. Subsequently, an encryption service module intercepts the open operation and request an encryption key from the policy enforcer. If the open operation is allowed, the policy enforcer releases an encryption key to the encryption service module to decrypt the encrypted document.

In another implementation, a policy enforcer does not control access to encryption keys of encrypted documents. When a user accesses an encrypted document, a policy enforcer intercepts an open operation in an application program and queries a policy engine for a policy decision on the open operation. The policy engine selects a subset of policies from a plurality of policies distributed by a policy server (i.e., centralized policies) to determine if the open operation should be allowed. The policy engine selects the subset of policies based on the open operation, the user, and one or more attributes of the encrypted document. The subset of policies being evaluated is not specified in the encrypted document. The policy engine may evaluate discretionary policies in additional to centralized policies to produce a policy decision, optionally. If the open operation is allowed, the policy enforcer allows the open operation to continue. Subsequently, an encryption service module intercepts the open operation and request an encryption key from a key management server. The key management server creates an encryption key and returns it to the encryption service module to decrypt the encrypted document.

A policy enforcer and an encryption service module may cooperate to provide flexible authorization and transparent encryption and decryption functions. When a user attempts to open an encrypted document in an application program, a policy enforcer provides access control functions based on policies. If access is allowed, an encryption service module provides decryption functions to provide access to encrypted content or encrypt new content. After unencrypted content is read by the application program, the policy enforcer provides use control functions based on policies to prevent unencrypted content being misused.

In an example, an access control policy in an information management system controls access to an encrypted document and release of an encryption key obtained from a key management server. When a user attempts to open an encrypted document with an application program on a computing device with a policy enforcer and an encryption service module installed, the policy enforcer enforces access control policies of the information management system. The policy enforcer intercepts a file open operation on the encrypted document in the application program and evaluates polices on the file open operation, the encrypted document and the current user to determine if the file open operation should be allowed.

If the file open operation is not allowed, the policy enforcer blocks the file open operation and the file open operation is blocked before reaching the encryption service module. As a result, the application program fails to open the encrypted document.

If the file open operation is allowed, the policy enforcer allows the file open operation to continue. In an implementation, the policy enforcer notifies the encryption service module that the file open operation is allowed. The encryption service module saves information regarding the file open operation in a policy effect cache. The policy enforcer allows the file open operation to continue. Subsequently, the encryption service module intercepts the file open operation on the encrypted document. The encryption service module checks the policy effect cache to determine if the file open operation is allowed. If the file open operation is allowed, the encryption service module requests an encryption key from the key management server to decrypt the encrypted document. If the file open operation is denied, the encryption service module does not decrypt the encrypted document.

In another implementation, the policy enforcer notifies the key management server that the file open operation is allowed. The key management server saves the file open operation in a policy effect cache. The policy enforcer allows the file open operation to continue. Subsequently, the encryption service module intercepts the file open operation on the encrypted document. The encryption service module requests an encryption key to decrypt the encrypted document from the key management server. The key management server checks the policy effect cache to determine if the file open operation should be allowed. If the file open operation is allowed, the key management server creates an encryption key and returns it to the encryption service module. If the file open operation is denied, the key management server returns an error to the encryption service module.

In yet another implementation, the policy enforcer saves policy effect of policy evaluation in a policy effect cache. Subsequently, the encryption service module intercepts the file open operation on the encrypted document. The encryption service module queries the policy enforcer on policy effect of policy evaluation on the file open operation before it requests an encryption key to decrypt the encrypted document. If the file open operation is allowed, the encryption service module requests an encryption key from the key management server to decrypt the encrypted document. If the file open operation is denied, the encryption service module does not decrypt the encrypted document.

In yet another implementation, the policy enforcer saves policy effect of policy evaluation in a policy effect cache. The policy enforcer allows the file open operation to continue. Subsequently, the encryption service module intercepts the file open operation on the encrypted document. The encryption service module requests an encryption key from the key management server to decrypt the document. The key management server queries the policy enforcer on policy effect of policy evaluation on the file open operation before it creates an encryption key for the encryption key request. If the file open operation is allowed, the key management server creates an encryption key and returns it to the encryption service module. If the file open operation is denied, the key management server returns an error to the encryption service module.

Upon receiving an encryption key from the key management server, the encryption service module decrypts the encrypted document to produce unencrypted content.

While the implementations in this example describe the encryption service module requests an encryption key from a key management server, alternatively, the encryption service module may request an encryption key from a policy enforcer that provides a key management service. The key management service may request an encryption key from a key management server when it is necessary.

In an embodiment, a first user shared an encrypted document with a second user. When the second user attempts to open the encrypted document, a policy enforcer intercepts a file open operation and evaluates one or more policies to determine if the file open operation is allowed. If the file open operation is allowed, an encryption service module creates an encryption key locally or requests an encryption key from a key management server based in part on one or more key creation factors stored in the encrypted document. The encryption service module decrypts the encrypted document with the encryption key to produce unencrypted content.

The encrypted document that the first user shares with the second user may be encrypted by the first user or another user. A user identifier stores in the encrypted document identifies the user who created (or produced) the encrypted document.

If an encryption key is requested from a key management server, the key management server determines if it is able to service the encryption key request. If the key management server is not able to service the encryption key request, it forwards the encryption key request either directly to another key management server or indirectly through a key message routing server. Some examples of an encryption key request that should be handled by another key management server include an encryption key request that is not addressed to current key management server, or current key management server does not maintain a secret necessary to create an encryption key.

A first user may share an encrypted document with a second user by: attaching an encrypted document to an email message; forwarding an email message containing an encrypted document; sending an encrypted document in a chat application; uploading an encrypted document to a cloud storage; uploading an encrypted document to a website; copying an encrypted document to a file server; copying an encrypted document to a removable storage device; transferring an encrypted document from one computing device to another computing device wirelessly (e.g., Apple AirDrop®); or others.

In an example, a first user shares an encrypted document 401 or 501 with a second user in a different organization via email. The first user on a first computing device sends an encrypted document in an email message to a second user. The encrypted document is encrypted with a first encryption key obtained from a first key management server 606 or 706 and the first encryption key is created based in part on a secret maintained by the first key management server.

The second user on a second computing device opens the encrypted document with a second encryption key. The second computing device has an encryption service module 604 or 705 that has access to a second key management server 606 or 706. The encryption service module intercepts a file open operation and sends an encryption key request to the second key management server. Since the first encryption key was created based in part on a secret not known to the second key management server, the second key management server forwards the encryption key request to the first key management server to have the second encryption key created. The first and second key management servers are not connected directly but are both connected to a key message routing server as shown in FIG. 11. The second key management server sends the encryption key request to the key message routing server and the key message routing server forwards the encryption key request to the first key management server. Subsequently, the second encryption key is created by the first key management server and delivered to the encryption service module. The encrypted document is decrypted with the second encryption key.

Figure 28A:
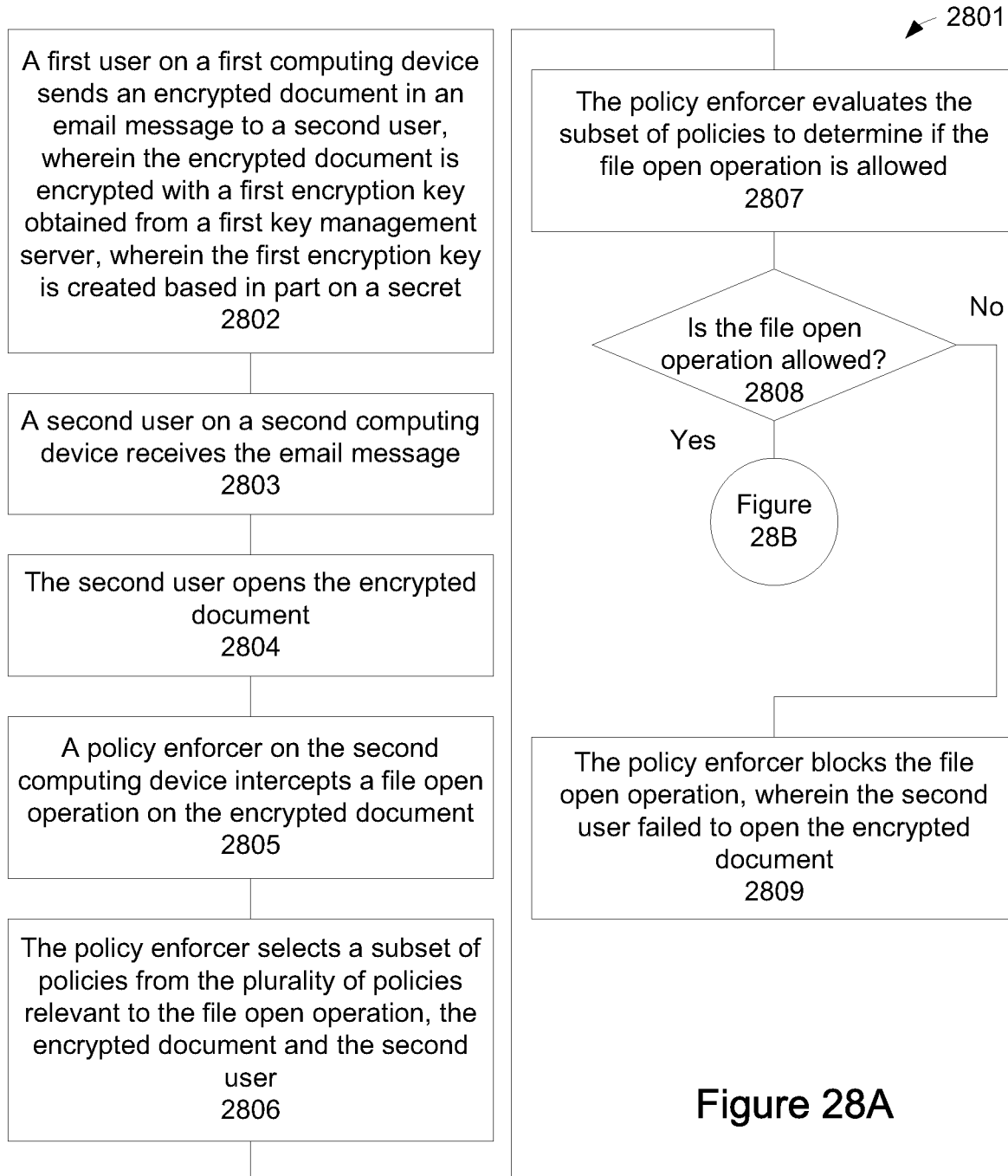

Referring to FIGS. 28A-28B, a flow diagram 2801 shows a first user shares an encrypted document with a second user via email and an encryption key request message is routed through a key message routing server. In step 2802, a first user on a first computing device sends an encrypted document in an email message to a second user. The encrypted document is encrypted with a first encryption key obtained from a first key management server. The first encryption key is created based in part on one or more secrets maintained by the first key management server. The encrypted document comprises a document identifier, a user identifier, a seed token, optionally other key creation factors, encrypted content, or more.

In step 2803, a second user on a second computing device receives the email message. In step 2804, the second user opens the encrypted document. In step 2805, a policy enforcer on the second computing device intercepts a file open operation on the encrypted document. In step 2806, the policy enforcer selects a subset of policies from the plurality of policies relevant to the file open operation, the encrypted document and the second user. In step 2807, the policy enforcer evaluates the subset of policies to determine if the file open operation is allowed. In step 2808, if the file open operation is allowed, processing continues in step 2810. If the file open operation is not allowed, processing continues in step 2809.

In step 2809, the policy enforcer blocks the file open operation. The second user failed to open the encrypted document.

In step 2810, the policy enforcer allows the file open operation to continue. In step 2811, an encryption service module on the second computing device intercepts a file open operation on the encrypted document. In step 2812, the encryption service module retrieves the document identifier, the user identifier, the seed token and optionally the other key creation factors from the encrypted document. In step 2813, the encryption service module sends the document identifier, the user identifier, the seed token and optionally the other key creation factors to a second key management server.

In step 2814, the second key management server determines that it does not have access to the one or more secrets to create an encryption key. It forwards the document identifier, the user identifier, the seed token and optionally the other key creation factors to a key message routing server. In step 2815, the key message routing server identifies the first key management server is capable of creating a second encryption key. In an implementation, the key message routing server identifies the first key management server by a key management server identifier stored in the encrypted document. In another implementation, the key message routing server identifies the first key management server based on the user identifier. In step 2816, the key message routing server forwards the document identifier, the user identifier, the seed token and optionally the other key creation factors to the first key management server.

In step 2817, the first key management server creates a second encryption key with the document identifier, the user identifier, the seed token, optionally the other key creation factors and the one or more secrets maintained by the first key management server. The first and second encryption keys are identical. The second encryption key does not exist before the encryption key request is received by the first key management server. In step 2818, the first key management server sends the second encryption key to the key message routing server. In step 2819, the key message routing server sends the second encryption key to the second key management server. In step 2820, the second key management server sends the second encryption key to the encryption service module.

In step 2821, the encryption service module decrypts the encrypted document with the second encryption key. The second user opens the encrypted document successfully.

In an example, a first user shares an encrypted document 401 or 501 with a second user by uploading the encrypted document to a cloud storage. The encrypted document is encrypted with a first encryption key obtained from a first key management server 606 or 706 and the first encryption key is created based in part on a secret maintained by the first key management server.

The second user on a second computing device opens the encrypted document with a second encryption key. The second computing device has an encryption service module 604 or 705 that has access to a second key management server 606 or 706. The encryption service module intercepts a file open operation and sends an encryption key request to the second key management server. Since the first encryption key was created based in part on a secret not known to the second key management server, the second key management server forwards the encryption key request to the first key management server to have the second encryption key created. The first and second key management servers are not connected directly but are both connected to a key message routing server as shown in FIG. 11. Subsequently, the second encryption key is created by the first key management server and delivered to the encryption service module. The encrypted document is decrypted with the second encryption key.

Figure 29A:
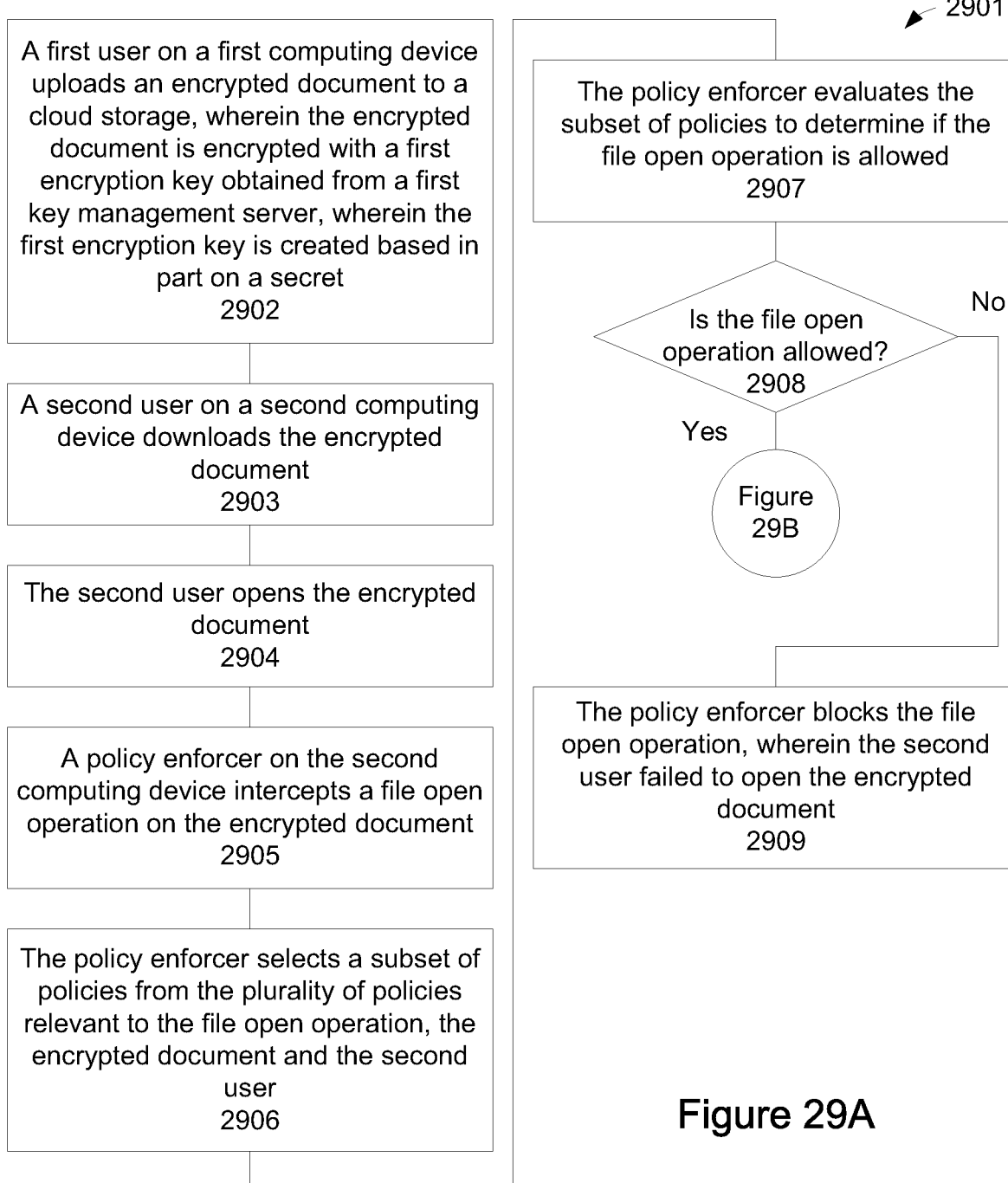

Referring to FIGS. 29A-29B, a flow diagram 2901 shows a first user shares an encrypted document with a second user via cloud storage and an encryption key request message is routed through a key message routing server. In step 2902, a first user on a first computing device uploads an encrypted document to a cloud storage. The encrypted document is encrypted with a first encryption key obtained from a first key management server. The first encryption key is created based in part on one or more secrets maintained by the first key management server. The encrypted document comprises a document identifier, a user identifier, a seed token, optionally other key creation factors, encrypted content, or more.

In step 2903, a second user on a second computing device downloads the encrypted document. Alternatively, a user may open an encrypted document on cloud storage without downloading the encrypted document, thereby skipping step 2903. In step 2904, the second user opens the encrypted document. In step 2905, a policy enforcer on the second computing device intercepts a file open operation on the encrypted document. In step 2906, the policy enforcer selects a subset of policies from the plurality of policies relevant to the file open operation, the encrypted document and the second user. In step 2907, the policy enforcer evaluates the subset of policies to determine if the file open operation is allowed. In step 2908, if the file open operation is allowed, processing continues in step 2910. If the file open operation is not allowed, processing continues in step 2909.

In step 2909, the policy enforcer blocks the file open operation. The second user failed to open the encrypted document.

In step 2910, the policy enforcer allows the file open operation to continue. In step 2911, an encryption service module on the second computing device intercepts a file open operation on the encrypted document. In step 2912, the encryption service module retrieves the document identifier, the user identifier, the seed token and optionally the other key creation factors from the encrypted document. In step 2913, the encryption service module sends the document identifier, the user identifier, the seed token and optionally the other key creation factors to a second key management server.

In step 2914, the second key management server determines it does not have access to the one or more secrets to create an encryption key. It forwards the document identifier, the user identifier, the seed token and optionally the other key creation factors to a key message routing server. In step 2915, the key message routing server identifies the first key management server is capable of creating a second encryption key. In an implementation, the key message routing server identifies the first key management server by a key management server identifier stored in the encrypted document. In another implementation, the key message routing server identifies the first key management server based on the user identifier. In step 2916, the key message routing server forwards the document identifier, the user identifier, the seed token and optionally the other key creation factors to the first key management server.

In step 2917, the first key management server creates a second encryption key with the document identifier, the user identifier, the seed token, optionally the other key creation factors and the one or more secrets maintained by the first key management server. The first and second encryption keys are identical. The second encryption key does not exist before the encryption key request is received by the first key management server. In step 2918, the first key management server sends the second encryption key to the key message routing server. In step 2919, the key message routing server sends the second encryption key to the second key management server. In step 2920, the second key management server sends the second encryption key to the encryption service module.

In step 2921, the encryption service module decrypts the encrypted document with the second encryption key. The second user opens the encrypted document successfully.

In an example, a first user shares an encrypted document 401 or 501 with a second user in the same organization via email. The first user on a first computing device sends an encrypted document in an email message to a second user. The encrypted document is encrypted with a first encryption key obtained from a first key management server 606 or 706 and the first encryption key is created based in part on a secret maintained by the first key management server.

The second user on a second computing device opens the encrypted document with a second encryption key. The second computing device has an encryption service module 604 or 705 that has access to a second key management server 606 or 706. The encryption service module intercepts a file open operation and sends an encryption key request to the second key management server. Since the first encryption key was created based in part on a secret not known to the second key management server, the second key management server forwards the encryption key request to the first key management server to have the second encryption key created. The first and second key management servers are connected directly as shown in FIG. 10. The second key management server sends the encryption key request to the first key management server. Subsequently, the second encryption key is created by the first key management server and delivered to the encryption service module. The encrypted document is decrypted with the second encryption key.

Figure 30A:
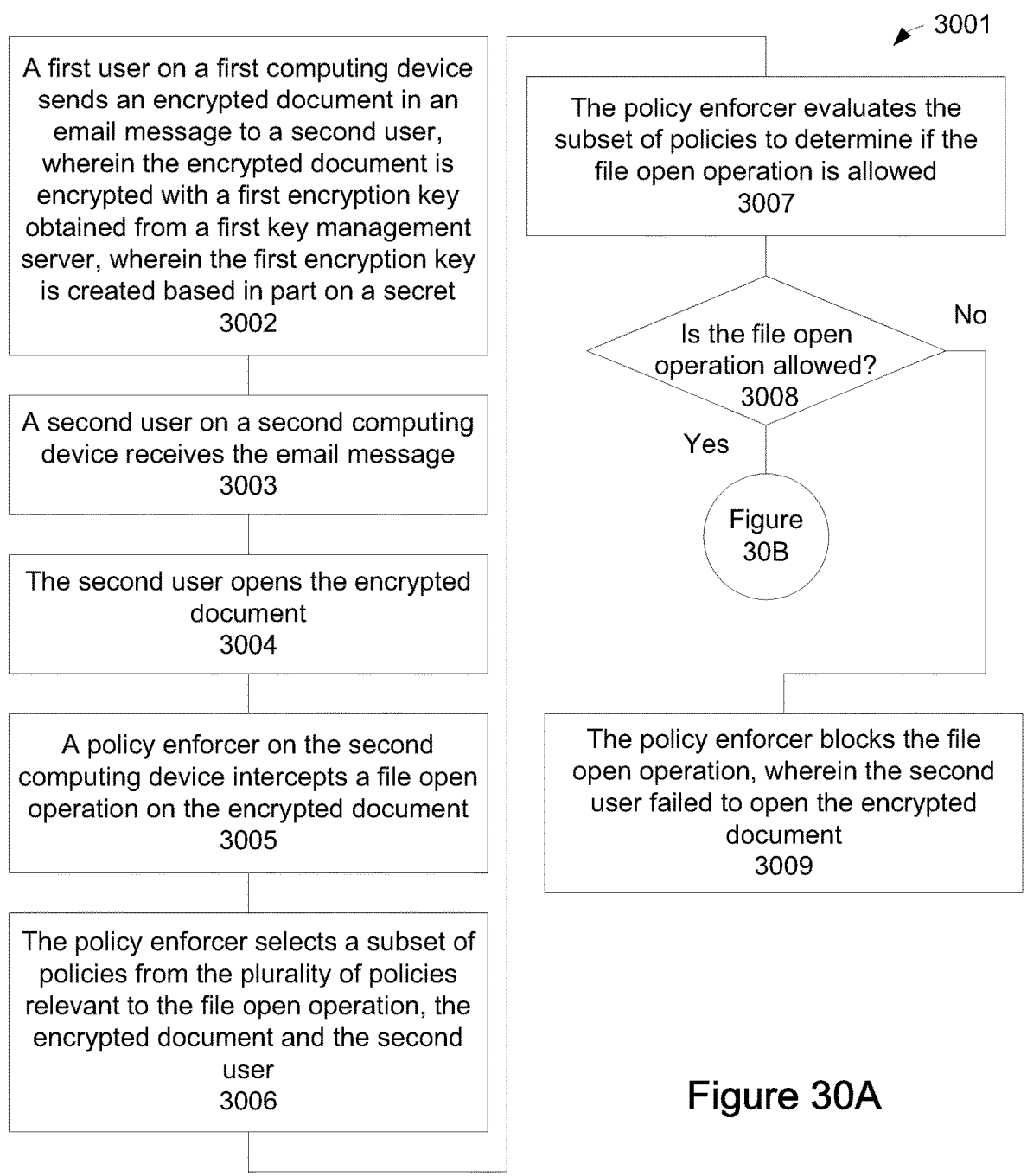
FIGS. 30A-30B show a flow diagram of a first user sharing an encrypted document with a second user via email and two key management servers are configured as peers.
Figure 30B:
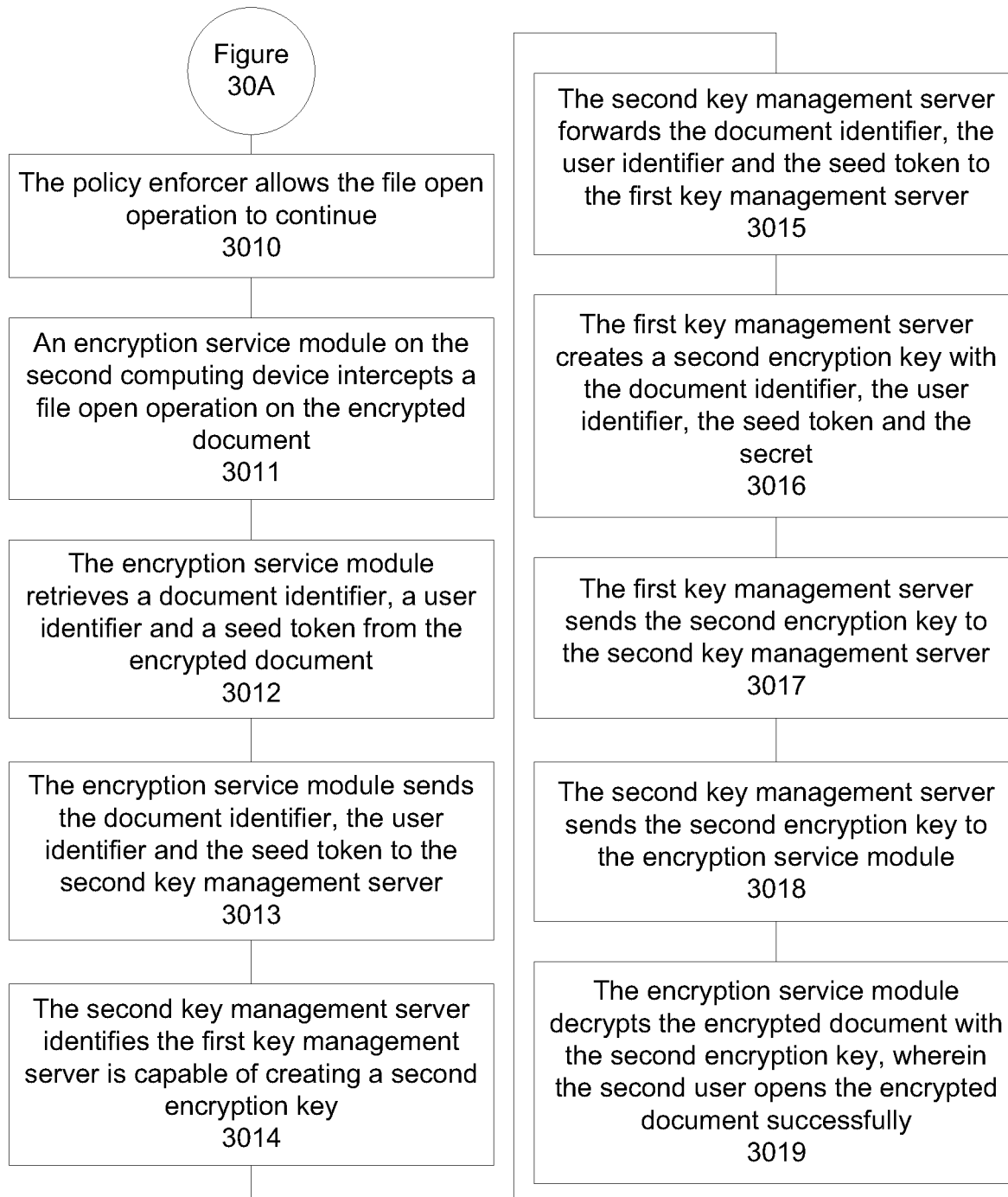

Referring to FIGS. 30A-30B, a flow diagram 3001 shows a first user shares an encrypted document with a second user via email and two key management servers are configured as peers. In step 3002, a first user on a first computing device sends an encrypted document in an email message to a second user. The encrypted document is encrypted with a first encryption key obtained from a first key management server. The first encryption key is created based in part on one or more secrets maintained by the first key management server.

The encrypted document comprises a document identifier, a user identifier, a seed token, optionally other key creation factors, encrypted content, or more.

In step 3003, a second user on a second computing device receives the email message. In step 3004, the second user opens the encrypted document. In step 3005, a policy enforcer on the second computing device intercepts a file open operation on the encrypted document. In step 3006, the policy enforcer selects a subset of policies from the plurality of policies relevant to the file open operation, the encrypted document and the second user. In step 3007, the policy enforcer evaluates the subset of policies to determine if the file open operation is allowed. In step 3008, if the file open operation is allowed, processing continues in step 3010. If the file open operation is not allowed, processing continues in step 3009.

In step 3009, the policy enforcer blocks the file open operation. The second user failed to open the encrypted document.

In step 3010, the policy enforcer allows the file open operation to continue. In step 3011, an encryption service module on the second computing device intercepts a file open operation on the encrypted document. In step 3012, the encryption service module retrieves the document identifier, the user identifier, the seed token and optionally the other key creation factors from the encrypted document. In step 3013, the encryption service module sends the document identifier, the user identifier, the seed token and optionally the other key creation factors to the second key management server.

In step 3014, the second key management server determines it does not have access to the one or more secrets to create an encryption key. It identifies the first key management server is capable of creating a second encryption key. In an implementation, the second key management server identifies the first key management server by a key management server identifier stored in the encrypted document. In another implementation, the second key management server identifies the first key management server based on the user identifier. In step 3015, the second key management server forwards the document identifier, the user identifier, the seed token and optionally the other key creation factors to the first key management server.

In step 3016, the first key management server creates a second encryption key with the document identifier, the user identifier, the seed token, optionally the other key creation factors and the one or more secrets maintained by the first key management server. The first and second encryption keys are identical. The second encryption key does not exist before the encryption key request is received by the first key management server. In step 3017, the first key management server sends the second encryption key to the second key management server. In step 3018, the second key management server sends the second encryption key to the encryption service module.

In step 3019, the encryption service module decrypts the encrypted document with the second encryption key. The second user opens the encrypted document successfully.

In an example, a first user shares an encrypted document 401 or 501 with a second user in the same organization via a file server. The first user on a first computing device copies (or saves) an encrypted document to a file server. The encrypted document is encrypted with a first encryption key obtained from a first key management server 606 or 706 and the first encryption key is created based in part on a secret maintained by the first key management server.

The second user on a second computing device opens the encrypted document with a second encryption key. The second computing device has an encryption service module 604 or 705 that has access to a second key management server 606 or 706. The encryption service module intercepts a file open operation and sends an encryption key request to the second key management server. Since the first encryption key was created based in part on a secret not known to the second key management server, the second key management server forwards the encryption key request to the first key management server to have the second encryption key created. The first and second key management servers are connected directly as shown in FIG. 10. The second key management server sends the encryption key request to the first key management server. Subsequently, the second encryption key is created by the first key management server and delivered to the encryption service module. The encrypted document is decrypted with the second encryption key.

Figure 31A:
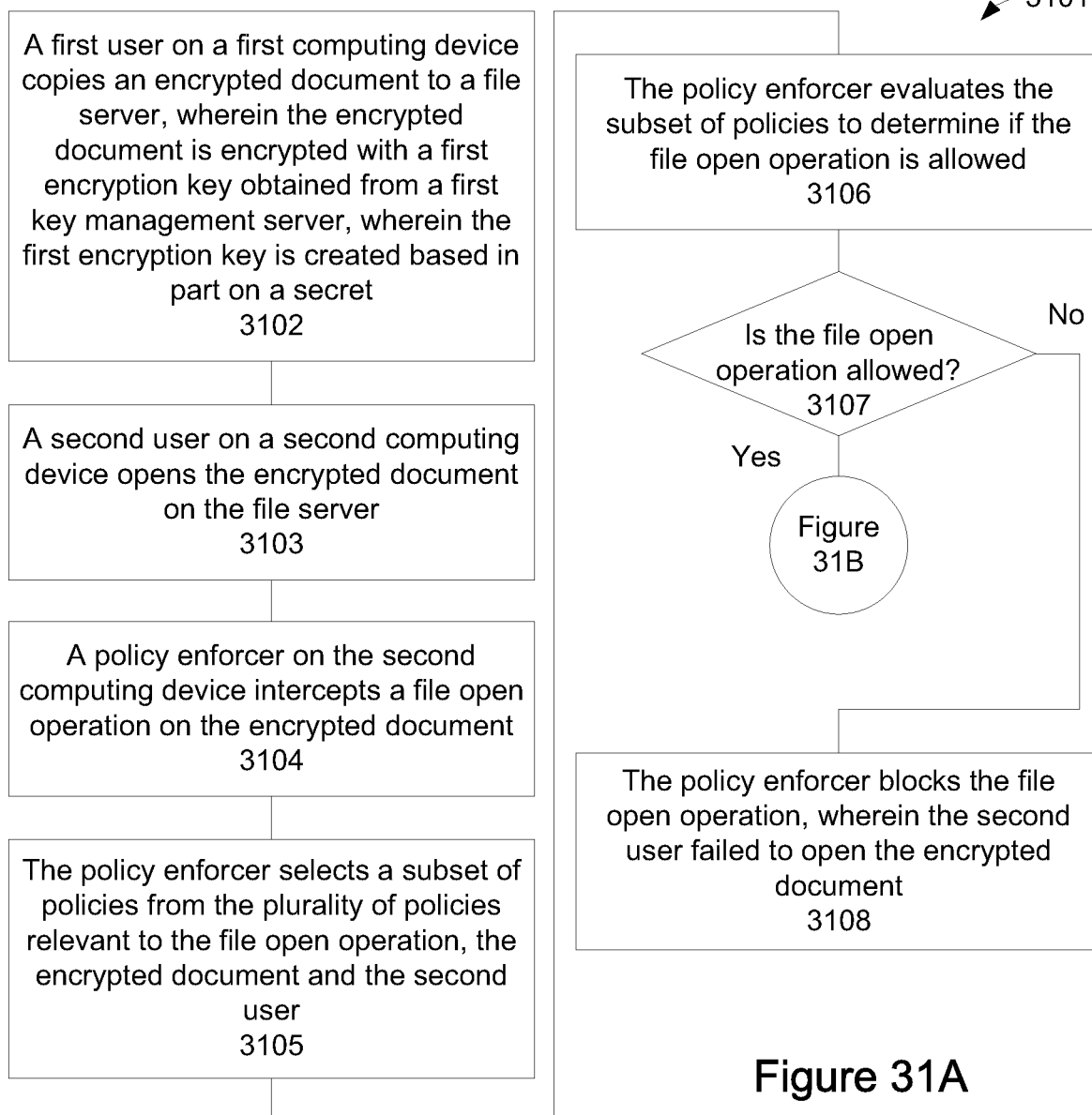
FIGS. 31A-31B show a flow diagram of a first user sharing an encrypted document with a second user via a file server and two key management servers are configured as peers.
Figure 31B:
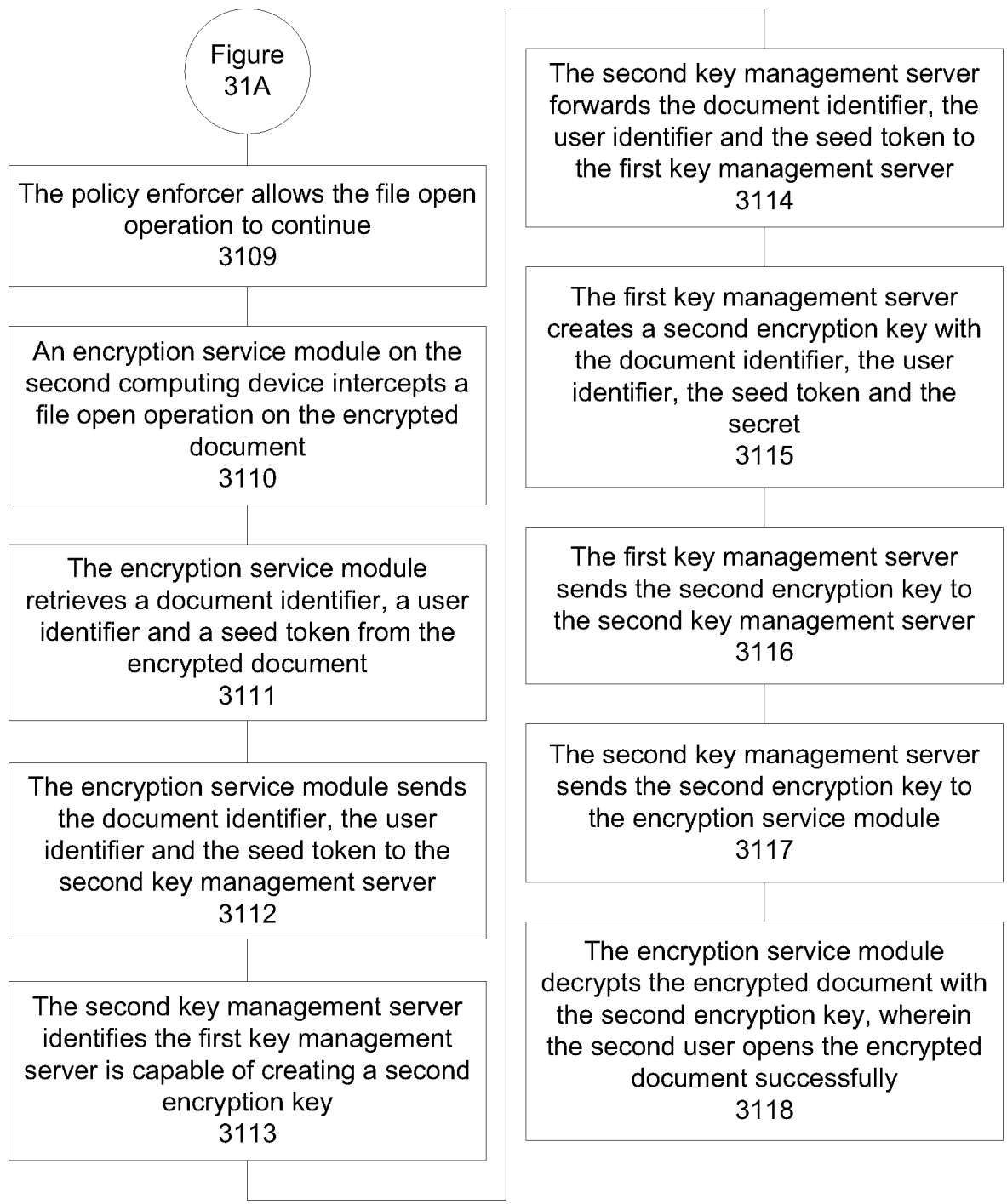

Referring to FIGS. 31A-31B, a flow diagram 3101 shows a first user shares an encrypted document with a second user via a file server and two key management servers are configured as peers. In step 3102, a first user on a first computing device copies (or saves) an encrypted document to a file server. The encrypted document is encrypted with a first encryption key obtained from a first key management server. The first encryption key is created based in part on one or more secrets maintained by the first key management server. The encrypted document comprises a document identifier, a user identifier, a seed token, optionally other key creation factors, encrypted content, or more.

In step 3103, a second user on a second computing device opens the encrypted document on the file server. In step 3104, a policy enforcer on the second computing device intercepts a file open operation on the encrypted document. In step 3105, the policy enforcer selects a subset of policies from the plurality of policies relevant to the file open operation, the encrypted document and the second user. In step 3106, the policy enforcer evaluates the subset of policies to determine if the file open operation is allowed. In step 3107, if the file open operation is allowed, processing continues in step 3109. If the file open operation is not allowed, processing continues in step 3108.

In step 3108, the policy enforcer blocks the file open operation. The second user failed to open the encrypted document.

In step 3109, the policy enforcer allows the file open operation to continue. In step 3110, an encryption service module on the second computing device intercepts a file open operation on the encrypted document. In step 3111, the encryption service module retrieves the document identifier, the user identifier, the seed token and optionally the other key creation factors from the encrypted document. In step 3112, the encryption service module sends the document identifier, the user identifier, the seed token and optionally the other key creation factors to the second key management server.

In step 3113, the second key management server determines it does not have access to the one or more secrets to create an encryption key. It identifies the first key management server is capable of creating a second encryption key. In an implementation, the second key management server identifies the first key management server by a key management server identifier stored in the encrypted document. In another implementation, the second key management server identifies the first key management server based on the user identifier. In step 3114, the second key management server forwards the document identifier, the user identifier, the seed token and optionally the other key creation factors to the first key management server.

In step 3115, the first key management server creates a second encryption key with the document identifier, the user identifier, the seed token, optionally the other key creation factors and the one or more secrets. The first and second encryption keys are identical. The second encryption key does not exist before the encryption key request is sent. In step 3116, the first key management server sends the second encryption key to the second key management server. In step 3117, the second key management server sends the second encryption key to the encryption service module.

In step 3118, the encryption service module decrypts the encrypted document with the second encryption key. The second user opens the encrypted document successfully.

In an example, a key management server 606, 706 or 805 enables encryption by servicing encryption key requests from encryption service modules 604 or 705. To enable encryption, a key management server services a first encryption key request by creating a first encryption key with a first one or more key creation factors and one or more secrets. The one or more secrets are maintained by the key management server. An encryption service module uses the first encryption key to encrypt a document to produce an encrypted document. To enable decryption, the key management server services a second encryption key request by creating a second encryption key with a second one or more key creation factors retrieved from the encrypted document and the one or more secrets. An encryption service module uses the second encryption key to decrypt an encrypted document to produce unencrypted content.

The key management server does not store the first encryption key for decryption purpose. Whereas the first encryption key does not exist before the first encryption key request is received by the key management server. Similarly, the second encryption key does not exist before the second encryption key request is received by the key management server. If the first and second one or more key creation factors are identical, the first and second encryption keys are also identical.

In an implementation, the one or more secrets maintained by the key management server is only available to the key management server, thereby encryption keys for encryption and decryption of a document must be created by the key management server.

In an implementation, the one or more secrets maintained by the key management server is maintained by another key management server, thereby encryption keys for encryption or decryption of a document may be serviced by the key management server or the another key management server.

In an implementation, an encryption key may be created by one or more key management servers having different one or more secrets. The key management servers cooperate among each other to construct seed tokens that enable them to create the same encryption key with different one or more secrets. A first key management server maintains a first one or more secrets, and a second key management server maintains a second one or more secrets. A first one or more key creation factors comprise a first seed token, and a second one or more key creation factors comprise a second seed token. The first key management server creates a first encryption key based in part on the first seed token and the first one or more secrets. The second key management server creates a second encryption key based in part on the second seed token and the second one or more secrets. The first and second encryption keys are identical.

Although this example shows encryption of the document and decryption of the encrypted document being performed by one encryption service module, encryption and decryption may be performed by different encryption service modules having access to the key management server.

Figure 32:
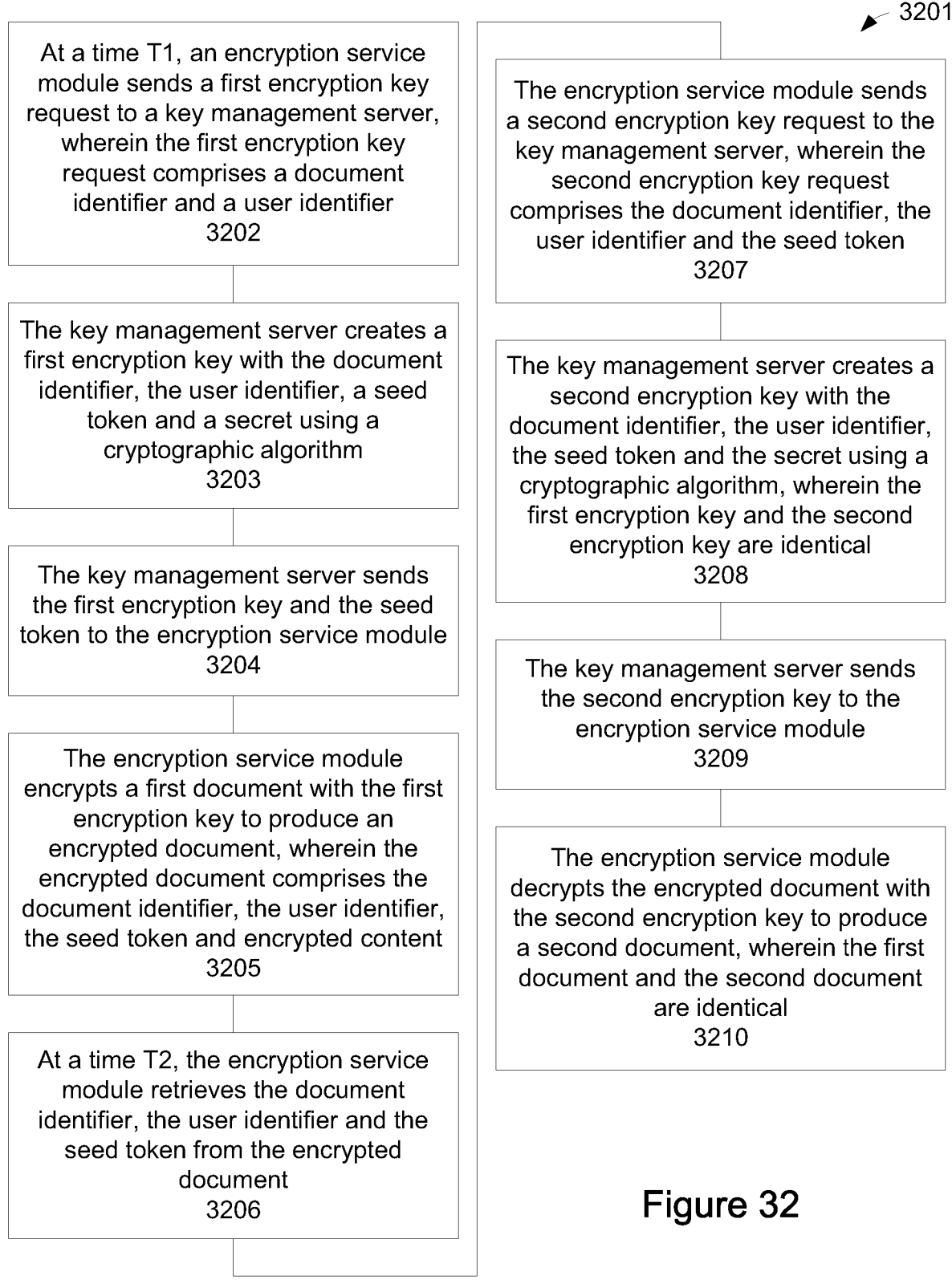
FIG. 32 shows a flow diagram of a key management server creating a first encryption key to encrypt a document and subsequently creating a second encryption key to decrypt the encrypted document where the first and second encryption keys are not stored on the key management server.

Referring to FIG. 32, a flow diagram 3201 shows a key management server creates a first encryption key to encrypt a document to produce an encrypted document and subsequently creates a second encryption key to decrypt the encrypted document where the first and second encryption keys are not stored on the key management server or in a database for decryption purpose. In step 3202, at a time T1, an encryption service module sends a first encryption key request to a key management server. The first encryption key request comprises a document identifier, a user identifier and optionally other key creation factors.

In step 3203, the key management server creates a first encryption key with the document identifier, the user identifier, optionally the other key creation factors, optionally a seed token maintained by the key management server, and a secret maintained by the key management server using a cryptographic algorithm. In step 3204, the key management server sends the first encryption key, optionally the seed token, and optionally the other key creation factors to the encryption service module. In step 3205, the encryption service module encrypts a first document with the first encryption key to produce an encrypted document. The encrypted document comprises the document identifier, the user identifier, optionally the seed token, optionally the other key creation factors, encrypted content, or more.

In step 3206, at a time T2, the encryption service module retrieves the document identifier, the user identifier, optionally the seed token and optionally the other key creation factors from the encrypted document. In step 3207, the encryption service module sends a second encryption key request to the key management server. The second encryption key request comprises the document identifier, the user identifier, optionally the seed token and optionally the other key creation factors.

In step 3208, the key management server creates a second encryption key with the document identifier, the user identifier, optionally the seed token, optionally the other key creation factors and the secret using a cryptographic algorithm. The first and second encryption keys are identical. In step 3209, the key management server sends the second encryption key to the encryption service module. In step 3210, the encryption service module decrypts the encrypted document with the second encryption key to produce a second document. The first and second documents are identical.

In an example, at a time T1, a first key management server 606, 706 or 805 having a first one or more secrets creates a first encryption key based in part on the first one or more secrets and a first seed token. The first encryption key is used to decrypt an encrypted document to produce a first document. In an implementation, the first seed token and a second seed token are stored in the encrypted document. In another implementation, the first seed token and a second seed token are stored in a central database and located using a user identifier stored in the encrypted document.

At a time T2, a second key management server 606, 706 or 805 having a second one or more secrets creates a second encryption key based in part on the second one or more secrets and the second seed token. The second encryption key is used to decrypt the encrypted document to produce a second document. The first and second one or more secrets are different. But the first and second encryption keys are identical, and the first and second documents are identical.

Figure 33B:
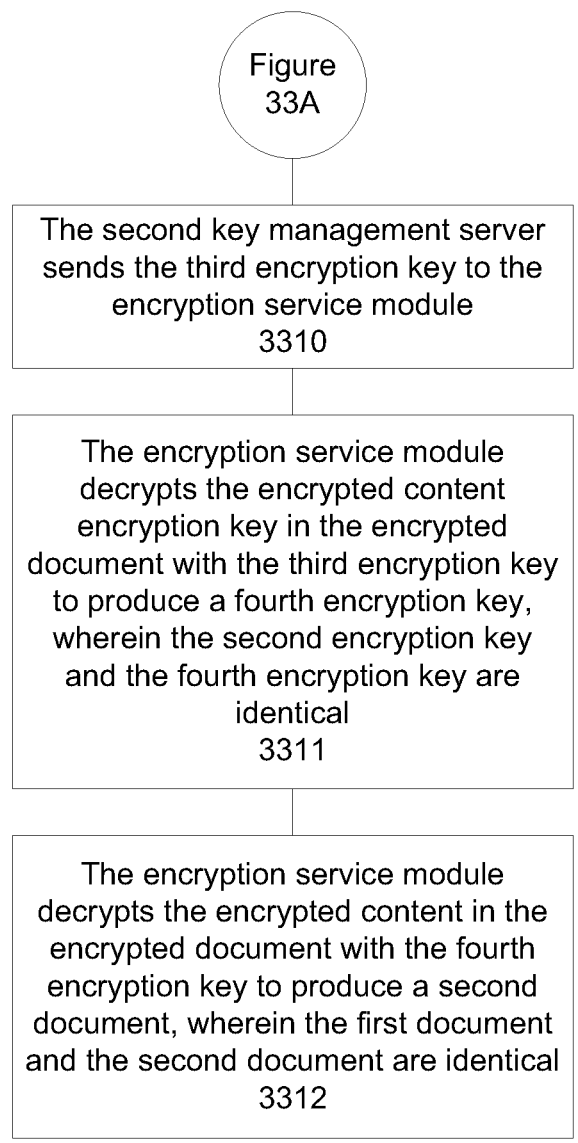

Referring to FIGS. 33A-33B, a flow diagram 3301 shows two key management servers having different secrets create encryption keys to decrypt an encrypted document. In step 3302, an encryption service module retrieves a document identifier, a first seed token, a second seed token and optionally other key creation factors from an encrypted document. In step 3303, at a time T1, the encryption service module sends a first encryption key request to a first key management server. The first encryption key request comprises the document identifier, the first seed token and optionally the other key creation factors retrieved from the encrypted document.

In step 3304, the first key management server creates a first encryption key with the document identifier, the first seed token, optionally the other key creation factors and a first secret maintained by the first key management server using a cryptographic algorithm. In step 3305, the first key management server sends the first encryption key to the encryption service module.

In step 3306, the encryption service module decrypts an encrypted content encryption key in the encrypted document with the first encryption key to produce a second encryption key. In step 3307, the encryption service module decrypts encrypted content in the encrypted document with the second encryption key to produce a first document. In an implementation where an encrypted document is encrypted using one encryption key, step 3306 is not required and in step 3307, the encryption service module decrypts encrypted content in the encrypted document with the first encryption key to produce a first document.

In step 3308, at a time T2, the encryption service module sends a second encryption key request to the second key management server. The second encryption key request comprises the document identifier, the second seed token and optionally the other key creation factors.

In step 3309, the second key management server creates a third encryption key with the document identifier, the second seed token, optionally the other key creation factors and a second secret maintained by the second key management server using a cryptographic algorithm. The first and third encryption keys are identical. In step 3310, the second key management server sends the third encryption key to the encryption service module.

In step 3311, the encryption service module decrypts the encrypted content encryption key in the encrypted document with the third encryption key to produce a fourth encryption key. The second and fourth encryption keys are identical. In step 3312, the encryption service module decrypts the encrypted content in the encrypted document with the fourth encryption key to produce a second document. The first and second documents are identical. In an implementation where an encrypted document is encrypted using one encryption key, step 3311 is not required and in step 3312, the encryption service module decrypts encrypted content in the encrypted document with the third encryption key to produce a second document.

In an example, a key management server creates an encryption key with a document identifier, an expiration date and one or more secrets maintained by the key management server. The document identifier and the expiration date are stored in an encrypted document. If the expiration date in the encrypted document is tampered, the encryption key created based in part on the expiration date will not decrypt the encrypted document successfully, whereby the present invention protects expiration date being tampered.

Figure 34:
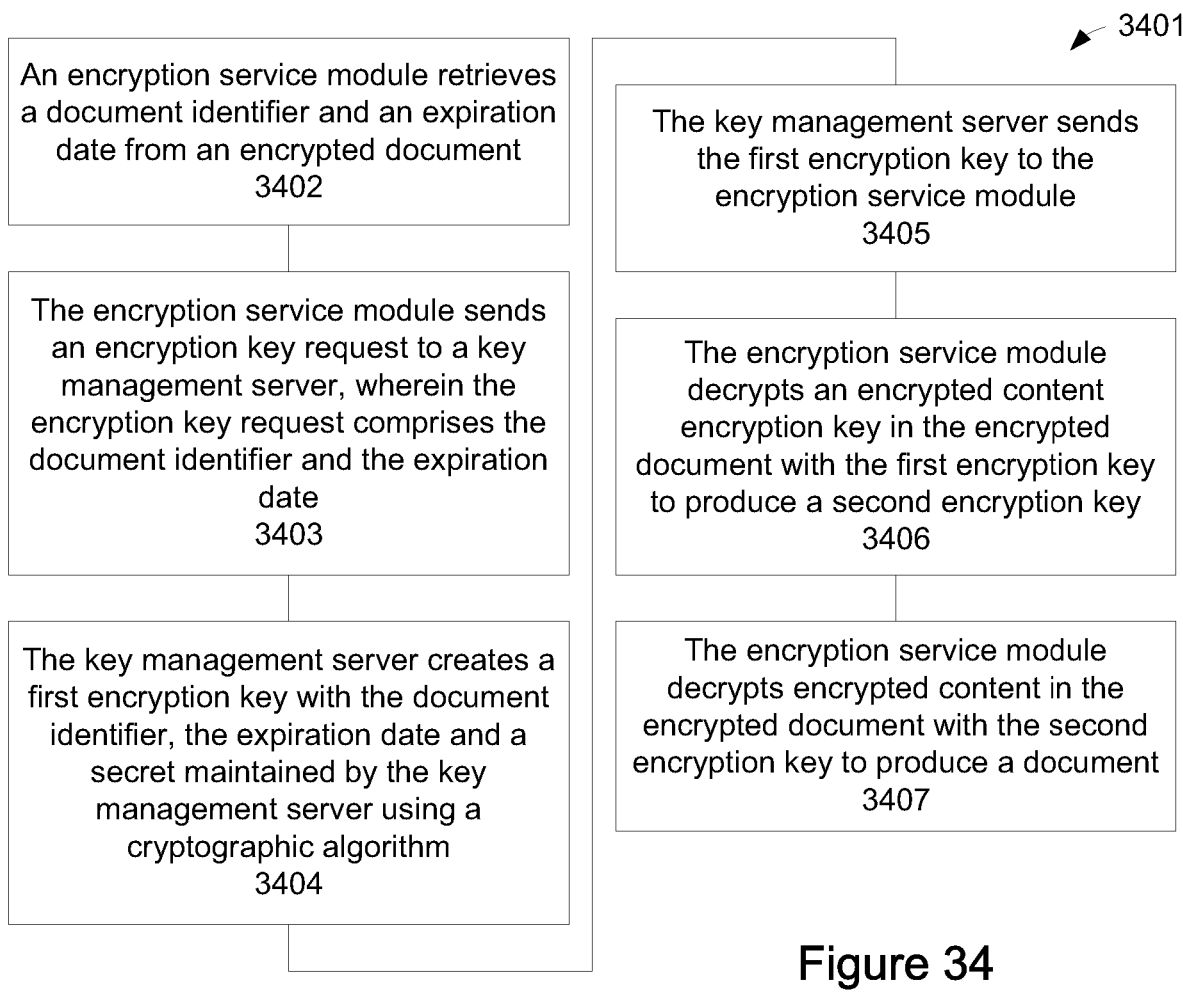
FIG. 34 shows a flow diagram of a key management server creating an encryption key based in part on a document identifier and an expiration date.

Referring to FIG. 34, a flow diagram 3401 shows a key management server creates an encryption key based in part on a document identifier and an expiration date. In step 3402, an encryption service module retrieves a document identifier, an expiration date and optionally other key creation factors from an encrypted document. In step 3403, the encryption service module sends an encryption key request to a key management server. The encryption key request comprises the document identifier, the expiration date and optionally the other key creation factors.

In step 3404, the key management server creates a first encryption key with the document identifier, the expiration date, optionally the other key creation factors and a secret maintained by the key management server using a cryptographic algorithm. In step 3405, the key management server sends the first encryption key to the encryption service module.

In step 3406, the encryption service module decrypts an encrypted content encryption key in the encrypted document with the first encryption key to produce a second encryption key. In step 3407, the encryption service module decrypts encrypted content in the encrypted document with the second encryption key to produce a document. In an implementation where an encrypted document is encrypted using one encryption key, step 3406 is not required and in step 3407, the encryption service module decrypts encrypted content in the encrypted document with the encryption key to produce a document.

Although the examples in this document illustrate application of encryption service module 604 or 705 in requesting encryption keys form a key management servers and performing encryption and decryption functions, the examples will work equally well with the encryption service modules substituted with managed application programs 803 that implements the same capabilities.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprises:
providing an information management system having a key management server and a computing device;
providing the computing device having an encryption service module;
providing the key management server having a secret, wherein the secret is not known to the encryption service module;
at the computing device at a time T1, saving a document opened in an application program by a user;
at the encryption service module, detecting a file save operation on the document;
at the encryption service module, collecting user information of the user;
at the encryption service module, sending the user information to the key management server;
at the key management server, creating a document identifier for the document;
at the key management server, creating a first encryption key with the document identifier, the user information and the secret;
at the encryption service module, receiving the document identifier and the first encryption key from the key management server;
at the encryption service module, creating a second encryption key;
at the encryption service module, encrypting the document with the second encryption key to produce encrypted content;
at the encryption service module, encrypting the second encryption key with the first encryption key to produce an encrypted second encryption key;
at the encryption service module, storing the document identifier, the user information, the encrypted second encryption key and the encrypted content in an encrypted document;

at the computing device at a time T2, opening the encrypted document in the application program by the user, wherein T2 happens some time after T1;
at the encryption service module, detecting a file open operation on the encrypted document;
at the encryption service module, retrieving the document identifier and the user information in the encrypted document;
at the encryption service module, sending the document identifier and the user information to the key management server;
at the key management server, creating a third encryption key with the document identifier, the user information and the secret;
at the encryption service module, receiving the third encryption key from the key management server;
at the encryption service module, decrypting the encrypted second encryption key in the encrypted document with the third encryption key to produce a fourth encryption key; and
at the encryption service module, decrypting the encrypted content in the encrypted document with the fourth encryption key to produce unencrypted content.

2. The method of claim 1 wherein the secret is a cryptographic key.

3. The method of claim 1 wherein the secret is a cryptographic hash.

4. The method of claim 1 wherein the detecting a file save operation on the document is performed using code injection.

5. The method of claim 1 wherein the detecting a file save operation on the document occurs in a process of the application program, wherein the application program invokes the file save operation.

6. The method of claim 1 wherein the detecting a file save operation on the document occurs in an operating system kernel.

7. The method of claim 1 wherein the user information comprises a user identifier.

8. The method of claim 1 wherein the user information comprises a user identifier and an organization identifier.

9. The method of claim 1 wherein the document identifier is a universally unique identifier.

10. The method of claim 1 wherein the first encryption key is a symmetric key.

11. The method of claim 1 wherein the first encryption key is a private key of a public private key pair.

12. The method of claim 1 wherein the first encryption key is not stored on the key management server.

13. The method of claim 1 wherein the second encryption key is a symmetric key.

14. The method of claim 1 wherein the detecting a file open operation on the encrypted document is performed using code injection.

15. The method of claim 1 wherein the detecting a file open operation on the encrypted document occurs in a process of the application program, wherein the application program invokes the file open operation.

16. The method of claim 1 wherein the detecting a file open operation on the encrypted document occurs in an operating system kernel.

17. The method of claim 10 wherein the first encryption key and the third encryption key are identical.

18. The method of claim 11 wherein the third encryption key is a public key of a public private key pair.

19. The method of claim 1 wherein the second encryption key and the fourth encryption key are identical.

20. The method of claim 1 wherein the third encryption key does not exist before T2.

21. A method comprises:
providing an information management system having a key management server and a computing device;
providing the computing device having an encryption service module;
providing the key management server having a secret, wherein the secret is not known to the encryption service module;
at the computing device at a time T1, saving a document opened in an application program by a user;
at the encryption service module, detecting a file save operation on the document;
at the encryption service module, collecting user information of the user;
at the encryption service module, creating a document identifier for the document;
at the encryption service module, sending the user information and the document identifier to the key management server;
at the key management server, creating a first encryption key with the document identifier, the user information and the secret;
at the encryption service module, receiving the first encryption key from the key management server;
at the encryption service module, creating a second encryption key;
at the encryption service module, encrypting the document with the second encryption key to produce encrypted content;
at the encryption service module, encrypting the second encryption key with the first encryption key to produce an encrypted second encryption key;
at the encryption service module, storing the document identifier, the user information, the encrypted second encryption key and the encrypted content in an encrypted document;
at the computing device at a time T2, opening the encrypted document in the application program by the user, wherein T2 happens some time after T1;
at the encryption service module, detecting a file open operation on the encrypted document;
at the encryption service module, retrieving the document identifier and the user information in the encrypted document;
at the encryption service module, sending the document identifier and the user information to the key management server;
at the key management server, creating a third encryption key with the document identifier, the user information and the secret;
at the encryption service module, receiving the third encryption key from the key management server;
at the encryption service module, decrypting the encrypted second encryption key in the encrypted document with the third encryption key to produce a fourth encryption key; and
at the encryption service module, decrypting the encrypted content in the encrypted document with the fourth encryption key to produce unencrypted content.

22. The method of claim 21 wherein the first encryption key is not stored on the key management server.

23. The method of claim 21 wherein the second encryption key and the fourth encryption key are identical.

24. The method of claim 21 wherein the third encryption key does not exist before T2.

25. A method comprises:
providing an information management system having a key management server, a first computing device and a second computing device;
providing the first computing device having a first encryption service module;
providing the second computing device having a second encryption service module;
providing the key management server having a secret, wherein the secret is not known to the first encryption service module and the second encryption service module;
at the first computing device at a time T1, saving a document opened in a first application program by a first user;
at the first encryption service module, detecting a file save operation on the document;
at the first encryption service module, collecting user information of the first user;
at the first encryption service module, sending the user information to the key management server;
at the key management server, creating a document identifier for the document;
at the key management server, creating a first encryption key with the document identifier, the user information and the secret;
at the first encryption service module, receiving the document identifier and the first encryption key from the key management server;
at the first encryption service module, creating a second encryption key;
at the first encryption service module, encrypting the document with the second encryption key to produce encrypted content;
at the first encryption service module, encrypting the second encryption key with the first encryption key to produce an encrypted second encryption key;
at the first encryption service module, storing the document identifier, the user information, the encrypted second encryption key and the encrypted content in an encrypted document;
at the second computing device at a time T2, opening the encrypted document in a second application program by a second user, wherein T2 happens some time after T1;
at the second encryption service module, detecting a file open operation on the encrypted document;
at the second encryption service module, retrieving the document identifier and the user information in the encrypted document;
at the second encryption service module, sending the document identifier and the user information to the key management server;
at the key management server, creating a third encryption key with the document identifier, the user information and the secret;
at the second encryption service module, receiving the third encryption key from the key management server;
at the second encryption service module, decrypting the encrypted second encryption key in the encrypted document with the third encryption key to produce a fourth encryption key; and
at the second encryption service module, decrypting the encrypted content in the encrypted document with the fourth encryption key to produce unencrypted content.

* * * * *